United States Patent
Zhang et al.

(10) Patent No.: US 9,516,306 B2
(45) Date of Patent: Dec. 6, 2016

(54) DEPTH CODING MODES SIGNALING OF DEPTH DATA FOR 3D-HEVC

(71) Applicant: QUALCOMM Incorporated, San Diego, CA (US)

(72) Inventors: Li Zhang, San Diego, CA (US); Ying Chen, San Diego, CA (US); Xin Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 14/225,985

(22) Filed: Mar. 26, 2014

(65) Prior Publication Data
US 2014/0294061 A1 Oct. 2, 2014

Related U.S. Application Data

(60) Provisional application No. 61/805,901, filed on Mar. 27, 2013, provisional application No. 61/805,922, (Continued)

(51) Int. Cl.
*H04N 19/11* (2014.01)
*H04N 19/597* (2014.01)
(Continued)

(52) U.S. Cl.
CPC ........ *H04N 19/00042* (2013.01); *H04N 19/11* (2014.11); *H04N 19/14* (2014.11);
(Continued)

(58) Field of Classification Search
CPC ............ H04N 19/00042; H04N 19/597; H04N 19/197; H04N 19/70; H04N 19/187; H04N 19/11; H04N 19/14; H04N 19/593
(Continued)

(56) References Cited

U.S. PATENT DOCUMENTS

2006/0256851 A1* 11/2006 Wang ............. H04N 21/234327 375/240.01
2009/0279612 A1* 11/2009 Pandit ................ H04N 19/597 375/240.25
(Continued)

FOREIGN PATENT DOCUMENTS

SE WO 2013154482 A1 * 10/2013 ....... H04N 19/00884

OTHER PUBLICATIONS

3D-HEVC TM-2, 3D-HEVE Test Mode 2, Oct. 19 2012.*
(Continued)

*Primary Examiner* — Shan Elahi
(74) *Attorney, Agent, or Firm* — Shumaker & Sieffert, P.A.

(57) ABSTRACT

Techniques are described for encoding and decoding depth data for three-dimensional (3D) video data represented in a multiview plus depth format using depth coding modes that are different than high-efficiency video coding (HEVC) coding modes. Examples of additional depth intra coding modes available in a 3D-HEVC process include at least two of a Depth Modeling Mode (DMM), a Simplified Depth Coding (SDC) mode, and a Chain Coding Mode (CCM). In addition, an example of an additional depth inter coding mode includes an Inter SDC mode. In one example, the techniques include signaling depth intra coding modes used to code depth data for 3D video data in a depth modeling table that is separate from the HEVC syntax. In another example, the techniques of this disclosure include unifying signaling of residual information of depth data for 3D video data across two or more of the depth coding modes.

44 Claims, 13 Drawing Sheets

US 9,516,306 B2
Page 2

Related U.S. Application Data filed on Mar. 27, 2013, provisional application No. 61/811,103, filed on Apr. 11, 2013, provisional application No. 61/890,629, filed on Oct. 14, 2013, provisional application No. 61/891,816, filed on Oct. 16, 2013.

(51) Int. Cl.

| | |
|---|---|
| *H04N 19/196* | (2014.01) |
| *H04N 19/70* | (2014.01) |
| *H04N 19/593* | (2014.01) |
| *H04N 19/14* | (2014.01) |
| *H04N 19/187* | (2014.01) |
| *H04N 19/463* | (2014.01) |
| *H04N 19/91* | (2014.01) |

(52) U.S. Cl.
CPC ......... *H04N 19/187* (2014.11); *H04N 19/197* (2014.11); *H04N 19/593* (2014.11); *H04N 19/597* (2014.11); *H04N 19/70* (2014.11); *H04N 19/463* (2014.11); *H04N 19/91* (2014.11)

(58) Field of Classification Search
USPC ...................................................... 375/240.02
See application file for complete search history.

(56) References Cited

U.S. PATENT DOCUMENTS

| | | | |
|---|---|---|---|
| 2010/0054615 A1 | 3/2010 | Choi et al. | |
| 2011/0038418 A1 | 2/2011 | Pandit et al. | |
| 2011/0122225 A1* | 5/2011 | Kim ..................... | H04N 19/597 348/42 |
| 2012/0044322 A1 | 2/2012 | Tian et al. | |
| 2012/0163471 A1* | 6/2012 | Karczewicz ......... | H04N 19/159 375/240.23 |
| 2012/0177118 A1* | 7/2012 | Karczewicz ......... | H04N 19/137 375/240.13 |
| 2012/0183066 A1 | 7/2012 | Oh et al. | |
| 2012/0189064 A1* | 7/2012 | Kossentini ........... | H04N 19/147 375/240.25 |
| 2012/0224774 A1* | 9/2012 | Lim ........................ | G06T 9/004 382/233 |
| 2012/0229602 A1 | 9/2012 | Chen et al. | |
| 2012/0230397 A1* | 9/2012 | Ouedraogo ............ | H04N 19/70 375/240.03 |
| 2012/0314766 A1 | 12/2012 | Chien et al. | |
| 2013/0022104 A1* | 1/2013 | Chen ..................... | H04N 19/70 375/240.02 |
| 2013/0038686 A1 | 2/2013 | Chen et al. | |
| 2013/0077684 A1 | 3/2013 | Chen et al. | |
| 2013/0114691 A1 | 5/2013 | Guo et al. | |
| 2013/0194384 A1* | 8/2013 | Hannuksela ........... | H04N 19/70 348/43 |
| 2013/0229485 A1 | 9/2013 | Rusanovskyy et al. | |
| 2013/0266060 A1* | 10/2013 | Budagavi ......... | H04N 19/00066 375/240.02 |
| 2014/0002594 A1 | 1/2014 | Chan et al. | |
| 2014/0211841 A1* | 7/2014 | Samuelsson ..... | H04N 19/00884 375/240.02 |
| 2014/0301454 A1 | 10/2014 | Zhang et al. | |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.264, Series H: Audiovisual and Multimedia Systems, Infrastructure of audiovisual services—Coding of moving video, Advanced video coding for generic audiovisual services, Mar. 2010, 674 pp.

Jager "3D-CE6.h Results on Simplified Depth Coding with an optional Depth Lookup Table", JCT-3V Meeting; 102. MPEG Meeting; Oct. 13-19, 2012; Shanghai; (The Joint Collaborative Team on 3D Video Coding Extension Development of ISO/IEC JTC1/SC29/WG11 and ITU-T SG.16 ); URL: http://phenix.int-evry.fr/JCT2/, No. JCT3V-B0036, XP030130217, 16 pp.

Lee, et al., "3D-CE5: DMM simplification and signalling", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/JCT2/, No. JCT3V-E0146, XP030131170, 5 pp.

Lu, et al., "CE5 related: Results on Simplified Binarization for depth intra mode", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG:16 ); URL: http://phenix.int-evry.fr/JCT21, No. JCT3V-E0204-v4, XP030131246, 4 pp.

Schwarz, et al., "Description of 3D Video Coding Technology Proposal by Fraunhofer HHI (HEVC compatible; configuration A)", MPEG Meeting; Geneva; (Motion Picture Expert Group or ISO/IEC JTC1/SC29/WG11), No. m22570, Nov. 22, 2011 (Nov. 22, 2011), XP030051133, 46 pp.

Schwarz, et al., "Description of 3D Video Technology Proposal by Fraunhofer HHI (HEVC compatible, configuration B)", MPEG Meeting; Geneva; (Motion Picture Expert Group or ISO/IEC JTC1/SC29/WG11), No. m22571, Nov. 22, 2011, XP030051134; 46 pp.

Tech, et al., "3D-HEVC Draft Text 1", JCT-3V Meeting; MPEG Meeting; Jul. 27-Aug. 2, 2013; (The Joint Collaborative Team on 3D Video Coding Extension Development of ISO/IEC JTC1/SC29/WG11 and ITU-T SG.16); No. JCT3V-E1001_v3, XP030130664, 89 pp.

(56) References Cited

OTHER PUBLICATIONS

Tech, et al., "3D-HEVC Test Model 2," Joint Collaborative Team on 3D Video Coding Extension Development of ITU-T SG 16 WP 3 and ISO/IEC JTC1/SC 29/WG 11, Document: JCT3V- B1005_d0, 2nd Meeting: Shanghai, CN, XP030130414, Oct. 13-19, 2012, 118 pp.

Tech, et al., "3D-HEVC Test Model 3", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16); URL: http://phenix.int-evry.fr/JCT2/, No. JCT3V-C1005, XP030130664, 52 pp.

Wang, et al., "CE6.h results on SimplificationofDepth Modeling Mode 3," Jan. 17-23, 2013, (The Jointcollaborative Team on 3D Video Coding Extension Development of ISO/IEC JTC1/SC29/WG11and ITU-T SG.16); No. JCT3V-00044, 10 pp.

Wu, et al., "A Content-Adaptive Distortion-Quantization Model for Intra Coding in H.264/AVC", Computer Communications and Networks (ICCCN), Jul. 2011 Proceedings of 20th International Conference on, IEEE, XP032049192, 6 pp.

Yu, et al., "CE6.h related: Unification of new intra modes in 3D-HEVC", MPEG Meeting; Apr. 20-26, 2013; Incheon; (Motion Picture Expert Group or ISO/IEC JTC1/SC29/WG11), No. m29026, XP030057559, 22 pp.

Zhang, et al., "3D-HEVC Test Model 5", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/JCT2/, No. JCT3V-E1005, XP030131385, 50 pp.

Zhang, et al., "Test Model 6 of 3D-HEVC and MV-HEVC", JCT-3V Meeting; Oct. 25-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/JCT2/, No. JCT3V-F1005, XP030131735, 52 pp.

Zhao, et al., "CE5 related: Unification of delta DC coding for depth intra modes", JCT-3V Meeting; Oct. 25- Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/JCT2/, No. JCT3V-F0132, XP030131558, 8 pp.

Heo, et al., "CE6.h Region Boundary Chain Coding for Depth-map," Jul. 16-20, 2012, (The Joint Collaborative Team on 3D Video Coding Extension Development of ISO/IEC JTC1/SC29/WG11 and ITU-T SG.16); No. JCT2-A0070, 4 pp.

International Search Report and Written Opinion from International Application No. PCT/US2014/032047, dated Jun. 25, 2014, 12 pp.

Second Written Opinion from International Application No. PCT/IS2014/032047, dated Feb. 4, 2015, 7 pp.

International Preliminary Report on Patentability from International Application No. PCT/US2014/032047, dated Jun. 23, 2015, 10 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

* cited by examiner

Values of *V* and *H* for angular intra prediction modes

| Intra Mode Index | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| H | 32 | 32 | 32 | 32 | 32 | 32 | 32 | 32 | 32 | 32 | 32 | 32 | 32 | 32 | 32 | 32 | 32 |
| V | 32 | 26 | 21 | 17 | 13 | 9 | 5 | 2 | 0 | -2 | -5 | -9 | -13 | -17 | -21 | -26 | -32 |
| Intra Mode Index | 19 | 20 | 21 | 22 | 23 | 24 | 25 | 26 | 27 | 28 | 29 | 30 | 31 | 32 | 33 | 34 | |
| H | 26 | 21 | 17 | 13 | 9 | 5 | 2 | 0 | -2 | 5 | 9 | 13 | 17 | 21 | 26 | 32 | |
| V | -32 | -32 | -32 | -32 | -32 | -32 | -32 | 32 | 32 | 32 | 32 | 32 | 32 | 32 | 32 | 32 | |

FIG. 5

Available DMM modes and number of Wedgelet patterns for different PU sizes

| PU size | Available DMM modes | Number of Wedgelet patterns |
|---|---|---|
| 4x4 | DMM_mode_1 and DMM_mode_3 | 86 |
| 8x8 | DMM_mode_1/2/3/4 | 782 |
| 16x16 | DMM_mode_1/2/3/4 | 1394 |
| 32x32 | DMM_mode_1/2/3/4 | 1503 |
| 64x64 | None | None |

FIG. 9

DEPTH CODING MODES SIGNALING OF DEPTH DATA FOR 3D-HEVC

This application claims the benefit of U.S. Provisional Patent Application No. 61/805,901, filed Mar. 27, 2013, U.S. Provisional Patent Application No. 61/805,922, filed Mar. 27, 2013, U.S. Provisional Patent Application No. 61/811,103, filed Apr. 11, 2013, U.S. Provisional Patent Application No. 61/890,629 filed Oct. 14, 2013, and U.S. Provisional Patent Application No. 61/891,816, filed Oct. 16, 2013, all entitled "Simplified Intra Modes Signaling of Depth Maps for 3D-HEVC," the entire content of each of which is incorporated herein by reference.

TECHNICAL FIELD

This disclosure relates to video coding and, more particularly, three-dimensional (3D) video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure relates to techniques for encoding and decoding depth data for three-dimensional (3D) video data represented in a multiview plus depth format using depth coding modes that are different from high-efficiency video coding (HEVC) coding modes. Examples of additional depth intra coding modes available in a 3D video coding process, such as a 3D-HEVC process, include at least two of a Depth Modeling Mode (DMM), a Simplified Depth Coding (SDC) mode, and a Chain Coding Mode (CCM). In addition, an example of an additional depth inter coding mode includes an Inter SDC mode. In one example, the techniques of this disclosure include signaling depth intra coding modes used to code depth data for 3D video data in a depth modeling table that is separate from the HEVC syntax. In another example, the techniques of this disclosure include unifying signaling of residual information of depth data for 3D video data across two or more of the depth coding modes, including the depth intra coding modes and the depth inter coding mode. The techniques of this disclosure may reduce the decoder parsing burden and reduce a number of required context models and binarization methods by signaling the depth intra coding modes in the depth modeling table syntax separate from the HEVC intra coding modes, and unifying the residual information coding mechanisms for the depth coding modes.

In one example, this disclosure is directed to a method of decoding video data, the method comprising decoding a syntax element that indicates whether any of a plurality of depth intra coding modes are enabled for the video data, wherein the depth intra coding modes are different from HEVC intra coding modes, after decoding the syntax element indicating that the depth intra coding modes are enabled, decoding a depth modeling table, selecting one of the depth intra coding modes based on one or more syntax elements in the depth modeling table, and decoding depth data for the video data using the selected depth intra coding mode.

In another example, this disclosure is directed to a video decoding device comprising a memory configured to store video data one or more processors. The processors of the video decoding device are configured to decode a syntax element that indicates whether any of a plurality of depth intra coding modes are enabled, wherein the depth intra coding modes are different from HEVC intra coding modes, after decoding the syntax element indicating that the depth intra coding modes are enabled for the video data, decode a depth modeling table, select one of the depth intra coding modes based on one or more syntax elements in the depth modeling table, and decode depth data for the video data using the selected depth intra coding mode.

In a further example, this disclosure is directed to a video decoding device comprising means for decoding a syntax element that indicates whether any of a plurality of depth intra coding modes are enabled for the video data, wherein the depth intra coding modes are different from HEVC intra coding modes, after decoding the syntax element indicating that the depth intra coding modes are enabled, means for decoding a depth modeling table, means for selecting one of the depth intra coding modes based on one or more syntax elements in the depth modeling table, and means for decoding depth data for the video data using the selected depth intra coding mode.

In an additional example, this disclosure is directed to a computer-readable medium comprising instructions for decoding video data that when executed cause one or more processors to decode a syntax element that indicates whether any of a plurality of depth intra coding modes are enabled for the video data, wherein the depth intra coding modes are different from HEVC intra coding modes, after decoding the syntax element indicating that the depth intra coding modes are enabled, decode a depth modeling table, select one of the depth intra coding modes based on one or more syntax elements in the depth modeling table, and decode depth data for the video data using the selected depth intra coding mode.

In another example, this disclosure is direct to a method of encoding video data, the method comprising encoding depth data for the video data using a selected one of a plurality of depth intra coding modes, wherein the depth intra coding modes are different from HEVC intra coding modes, encoding a syntax element indicating that the depth intra coding modes are enabled for the video data, and encoding a depth modeling table including one or more syntax elements that indicate the selected depth intra coding mode.

In a further example, this disclosure is direct to a video encoding device comprising a memory configured to store video data, and one or more processors. The processors of the video encoding device are configured to encode depth data for the video data using a selected one of a plurality of depth intra coding modes, wherein the depth intra coding modes are different from HEVC intra coding modes, encode a syntax element indicating that the depth intra coding modes are enabled for the video data, and encode a depth modeling table including one or more syntax elements that indicate the selected depth intra coding mode.

In one example, this disclosure is directed to a method of decoding video data, the method comprising decoding a set of syntax elements that indicates residual information of depth data for the video data, wherein the same set of syntax elements indicates residual information for any of a plurality of depth coding modes, decoding one or more syntax elements indicating one of the plurality of depth coding modes for the video data, and decoding the depth data for the video data using the indicated depth coding mode based on the residual information of the depth data and neighboring reference samples.

In another example, this disclosure is directed to a video decoding device comprising a memory configured to store video data, and one or more processors. The processors of the video decoding device are configured to decode a set of syntax elements that indicates residual information of depth data for the video data, wherein the same set of syntax elements indicates residual information for any of a plurality of depth coding modes, decode one or more syntax elements indicating one of the plurality of depth coding modes for the video data, and decode the depth data for the video data using the indicated depth coding mode based on the residual information of the depth data and neighboring reference samples.

In a further example, this disclosure is direct to a video decoding device comprising means for decoding a set of syntax elements that indicates residual information of depth data for the video data, wherein the same set of syntax elements indicates residual information for any of a plurality of depth coding modes, means for decoding one or more syntax elements indicating one of the plurality of depth coding modes for the video data, and means for decoding the depth data for the video data using the indicated depth coding mode based on the residual information of the depth data and neighboring reference samples.

In an additional example, this disclosure is direct to a computer-readable medium comprising instructions for decoding video data that cause one or more processor to decode a set of syntax elements that indicates residual information of depth data for the video data, wherein the same set of syntax elements indicates residual information for any of a plurality of depth coding modes, decode one or more syntax elements indicating one of the plurality of depth coding modes for the video data; and decode the depth data for the video data using the indicated depth coding mode based on the residual information of the depth data and neighboring reference samples.

In another example, this disclosure is direct to a method of encoding video data, the method comprising encoding depth data for the video data using a selected one of a plurality of depth coding modes, wherein encoding the depth data comprises generating residual information of the depth data based on original depth values of the video data and neighboring reference samples, encoding one or more syntax elements indicating the selected depth coding mode for the video data, and encoding a set of syntax elements that indicates the residual information of the depth data, wherein the same set of syntax elements indicates residual information for any of the plurality of depth coding modes.

In a further example, this disclosure is direct to a video encoding device comprising a memory configured to store video data, and one or more processors. The processors of the video encoding device are configured to encode depth data for the video data using a selected one of a plurality of depth coding modes to generate residual information of the depth data based on original depth values of the video data and neighboring reference samples, encode one or more syntax elements indicating the selected depth coding mode for the video data, and encode a set of syntax elements that indicates the residual information of the depth data, wherein the same set of syntax elements indicates residual information for any of the plurality of depth coding modes.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 5 is a table showing values of V and H for angular intra prediction modes.

FIG. 9 is a table showing available DMM sub-modes and a number of Wedgelet patterns for different PU sizes.

DETAILED DESCRIPTION

Figure 1:
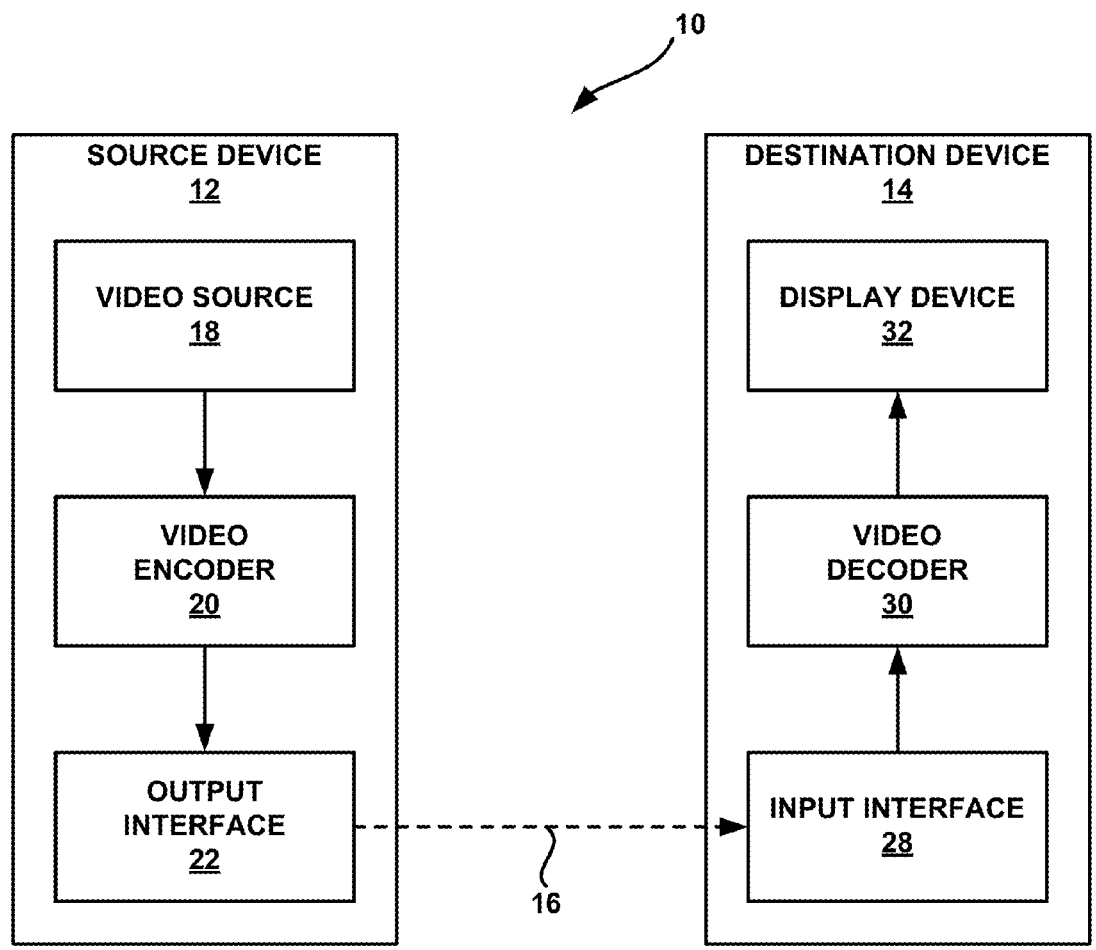
FIG. 1 is a block diagram illustrating an example video encoding and decoding system that may utilize the techniques of this disclosure for depth data coding.

In general, this disclosure relates to techniques for encoding and decoding depth data for three-dimensional (3D) video data represented in a multiview plus depth format using depth coding modes that are different than high-efficiency video coding (HEVC) coding modes. In the multiview plus depth format, the captured views (e.g., textures) of the 3D video data are associated with corresponding depth maps that describe depth data for the texture data. In accordance with a 3D video coding process, such as a 3D-HEVC process, the texture views and depth maps may be coded and multiplexed into a 3D video bitstream. The depth maps may be coded as grayscale video where the luma samples represent the depth values. In other words, residual values of the texture views are mapped to grayscale values, and residual values of the depth maps are mapped to depth values corresponding to the grayscale values relative to a zero disparity plane.

Depth maps are characterized by constant areas and sharp edges that present strong correlations with corresponding texture. Conventional inter-coding and intra-coding modes, such as those in the HEVC standard, can be used to code the depth maps, but due to different statistics and correlations between texture and corresponding depth, additional prediction modes have been designed for the depth maps. Examples of additional depth intra coding modes include a Depth Modeling Mode (DMM), a Simplified Depth Coding (SDC) mode, and a Chain Coding Mode (CCM). In addition, an example of an additional depth inter coding mode includes an Inter SDC mode.

The DDM may include a plurality of sub-modes. In one illustrative example, the DMM includes four sub-modes, referred to in this disclosure as DMM_1, DMM_2, DMM_3 and DMM_4. In all four of the depth sub-modes, a depth block is partitioned into two regions specified by a DMM pattern, where each region is represented by a constant value. There are two partitioning models defined in DMM, including Wedgelet partitioning in which a depth block is partitioned into two regions by a straight line, and Contour partitioning in which a depth block is partitions into two irregular regions. The DMM Wedgelet partitioning pattern can be either explicitly signaled (DMM_1), predicted by spatially neighboring blocks (DMM_2), or predicted by co-located texture blocks (DMM_3). The DMM Contour partitioning pattern can be predicted by co-located texture blocks (DMM_4). In other examples, the DDM may define a different number of depth sub-modes, i.e., greater or fewer than four.

The SDC mode may also include a plurality of sub-modes. For example, the SDC mode may include three sub-modes, referred to in this disclosure as SDCM_DC, SDCM_DMM_1, and SDCM_Planar. In the SDC mode, instead of coding quantized transform coefficients, a depth block is signaled as a type of partition, e.g., a single DC partition, two DMM_1 partitions, or a single planar partition, and a residual value for each partition. In the Inter SDC mode, the concept of the SDC mode is further extended for depth inter coding by coding only one DC residual value for each depth block containing a single unique partition. Although this disclosure primarily refers to the SDC mode as the Simplified Depth Coding (SDC) mode, in other examples the SDC mode may be referred to as a Segmentation-wise DC Coding (SDC) mode. In other examples, the SCD mode may define a different number of depth sub-modes, i.e., greater or fewer than three.

In the CCM, a depth block is partitioned into two regions specified by an arbitrary partition pattern that is signaled using "chains." A chain is a connection between a sample and one of its eight-connectivity samples. Each chain is assigned with a direction index and a series of connected chain indexes are signaled to define the partition pattern. Signaling of depth data for the depth intra coding modes and the depth inter coding mode is described in more detail below.

In one example, the techniques of this disclosure include signaling the depth intra coding modes used to code depth maps for 3D video data in a depth modeling table. The depth intra coding modes may include two or more of the DMM, SDC mode and CCM. The depth modeling table signals the syntax for the additional depth intra coding modes separate from the syntax for the HEVC intra coding modes. In addition, the techniques include signaling a syntax element, such as a flag, to indicate whether any of the depth intra coding modes that are different from the HEVC intra coding modes are enabled for the 3D video data. When the depth intra coding modes are enabled (i.e., when the signaled syntax element indicates that at least one of the depth intra coding modes is enabled for the 3D video data), a video decoder decodes the depth modeling table to determine the one of the depth intra coding modes used to code the depth data. The techniques of this disclosure may reduce the decoder parsing burden by signaling the depth intra coding modes in the depth modeling table separate from the HEVC intra coding modes, and indicating when the depth intra coding modes are enabled and the depth modeling table should be decoded.

In another example, the techniques of this disclosure include unifying signaling of residual information of depth maps for 3D video data across two or more of the depth coding modes. The depth coding modes may include two or more of the DMM, SDC mode, Inter SDC mode, and CCM. A unified set of syntax elements may include a syntax element that indicates whether residual values are coded for any of the depth coding modes. The unified set of syntax elements may also include syntax elements that indicate an absolute value and a sign of residual values for any of the depth coding modes. By sharing the same set of syntax elements to indicate residual information for two or more of the depth coding modes, context model selection and binarization methods for the syntax elements may also be unified. In addition, for the depth intra modes, neighboring reference samples may not be filtered during generation of the intra prediction samples referred to as residual values, or during reconstruction of depth values based on the residual values. The techniques of this disclosure may reduce the decoder parsing burden and reduce a number of required context models and binarization methods by unifying the residual information coding mechanisms for the depth coding modes.

FIG. 1 is a block diagram illustrating an example video encoding and decoding system 10 that may utilize the techniques of this disclosure for depth data coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for motion vector prediction in multiview coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for depth data coding may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video encoder 20 and video decoder 30, in some examples, may operate according to a video coding standard, such as the 3D-HEVC and may conform to the HEVC Test Model (HM). HEVC was developed by the Joint Collaboration Team on Video Coding (JCT-VC) of ITU-T Video Coding Experts Group (VCEG) and ISO/IEC Motion Picture Experts Group (MPEG). A draft of HEVC ("High Efficiency Video Coding (HEVC) text specification draft 10 (for FDIS & Last Call)," Bross et al., JCT-VC of ITU-T SG 16 WP 3 and ISO/IEC JTC 1/SC 29/WG 11, 12th Meeting: Geneva, CH, 14-23 Jan. 2013, JCTVC-L 1003) is available from http://phenix.int-evry.fr/jct/doc_end_user/documents/12_Geneva/wg11/JCTVC-L 1003-v34.zip.

The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture (or "frame") may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. For intra modes, the TUs are typically sized based on the size of PUs within a given CU defined for a partitioned LCU, although this may not always be the case. The TUs are typically the same size or smaller than the PUs. For inter modes, the TUs could be larger than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of pictures. As described herein, "picture" and "frame" may be used interchangeably. That is, picture containing video data may be referred to as video frame, or simply "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video encoder 20 and/or video decoder 30 may intra code depth data. For example, in 3D-HEVC, video encoder 20 and/or video decoder 30 may signal intra modes for depth maps. Video encoder 20 and/or video decoder 30 represent devices that may be configured to perform techniques for simplified intra modes signaling of depth maps in 3D-HEVC, as described in this disclosure.

In one example, video encoder 20 may be configured to signal the depth intra coding modes used to code depth maps for 3D video data in a depth modeling table, and video decoder 30 may be configured to determine the depth intra coding modes used to code the depth maps by parsing the depth modeling table syntax. The depth modeling table separates the syntax for the additional depth intra coding modes from the syntax for the HEVC intra coding modes. In another example, video encoder 20 may be configured to signal residual information of depth maps for 3D video data using mechanisms that are unified across two or more of the depth coding modes, and video decoder 30 may be configured to determine the residual information of the depth map for any of the two or more depth coding modes using the unified mechanisms. The depth coding modes may include both depth intra coding modes and a depth inter coding mode. The techniques of this disclosure may reduce the parsing burden on video decoder 30 for determining the additional depth coding modes and residual information of the depth data coded according to the depth coding modes.

The techniques described in this disclosure may be used to support encoding and/or decoding (generally "coding") of video data to produce a three-dimensional effect. As an example, two images of different views (that is, corresponding to two camera perspectives having slightly different horizontal positions) may be displayed substantially simultaneously such that one image is seen by a viewer's left eye, and the other image is seen by the viewer's right eye.

This 3D effect may be achieved using, for example, stereoscopic displays or autostereoscopic displays. Stereoscopic displays may be used in conjunction with eyewear that filters the two images accordingly. For example, passive glasses may filter the images using polarized lenses or different colored lenses to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

Coding 3D video data may involve coding texture and depth data. In general, the term "texture" is used to describe luminance (that is, brightness or "luma") values of an image and chrominance (that is, color or "chroma") values of the image. In some examples, a texture image may include one set of luminance data and two sets of chrominance data for blue hues (Cb) and red hues (Cr). In certain chroma formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

Depth data generally describes depth values for corresponding texture data. For example, a depth map may include a set of depth pixels (or depth values) that each describes depth for corresponding texture data. A pixel may have one or more texture values (e.g., luminance and chrominance), and may also have a one or more depth values. The depth data may be used to determine horizontal disparity for the corresponding texture data, and in some cases, vertical disparity may also be used. Depth data is often sub-sampled relative to luma data, meaning that multiple luma values may be associated with one particular depth value. The sub-sampling of depth data relative to luma data may be similar or different than the sub-sampling of chroma data relative to the luma data.

A device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero-disparity plane.

The zero-disparity plane may change for different portions of a video sequence, and the amount of depth relative to the zero-disparity plane may also change. Pixels located on the zero-disparity plane may be defined similarly for the left and right eyes. Pixels located in front of the zero-disparity plane may be displayed in different locations for the left and right eye (e.g., with horizontal disparity) so as to create a perception that the pixel appears to come out of the image in the z-direction perpendicular to the image plane.

Pixels located behind the zero-disparity plane may be displayed with a slight blur, to provide a slight perception of depth, or may be displayed in different locations for the left and right eye (e.g., with horizontal disparity that is opposite that of pixels located in front of the zero-disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth map. That is, a depth map corresponding to a texture picture describes depth data for the corresponding texture picture. Multiview video data may include data for various views, where each view may include a respective sequence of texture pictures and corresponding depth pictures.

As noted above, images may correspond to a particular temporal instance. Video data may be represented using a sequence of access units, where each access unit includes all data corresponding to a particular temporal instance. Thus, for example, for multiview video data plus depth, texture images from each view for a common temporal instance, plus the depth maps for each of the texture images, may all be included within a particular access unit. An access unit may include data for a texture component corresponding to a texture image, and a depth component corresponding to a depth map.

In this manner, 3D video data may be represented using a multiview video plus depth format, in which captured or generated views (texture) are associated with corresponding depth maps. Moreover, in 3D video coding, textures and depth maps may be coded and multiplexed into a 3D video bitstream. Depth maps may be coded as grayscale images, where "luma" samples (that is, pixels) of the depth maps represent depth values. In general, a block of depth data (a block of samples of a depth map) may be referred to as a depth block. A depth value may refer to a luma value associated with a depth sample. In any case, intra- and inter-coding methods may be applied for depth map coding.

Depth maps commonly include sharp edges and constant areas, and edges in depth maps typically present strong correlations with corresponding texture data. Due to the different statistics and correlations between texture and corresponding depth, different coding schemes can be designed for depth maps based on a 2D video codec.

Techniques of this disclosure generally relate to simplified coding modes signaling of depth maps, and may be applicable to the High Efficiency Video Coding (HEVC) standard. The Joint Video Team (JVT) developed a base version (2D) of HEVC that provides higher efficiency than previously developed video coding standards. A Joint Collaboration Team on 3D Video Coding (JCT-3V) is currently conducting study of two three-dimensional video (3DV) solutions as extensions to HEVC. One example 3DV solution includes a multiview extension of HEVC that is referred to as MV-HEVC. Another example includes a depth-enhanced 3D video extension (3D-HEVC).

In 3D-HEVC, each access unit contains multiple view components, each contains a unique view id, or view order index, or layer id. A view component contains a texture view component as well as a depth view component. A texture view component may be coded as one or more texture slices, while a depth view component may be coded as one or more depth slices.

In some instances, depth data may be intra coded, which relies on spatial prediction to reduce or remove spatial redundancy within a given picture. For example, in 3D-HEVC, a video coder (e.g., a video encoder or video decoder) may use intra prediction modes from the base (2D) HEVC standard to code an intra prediction unit of a depth slice. Intra coding modes of the HEVC standard are described in greater detail below with respect to FIGS. 4 and 5.

In another example, the video coder may use a region boundary chain coding mode to code an intra prediction unit of a depth slice. The region boundary chain coding mode (referred to as simply the chain coding mode or CCM) is described in greater detail below with respect to FIGS. 6A and 6B. In general, the video coder may use CCM to partition a block of depth data into irregularly shaped regions, which may then be intra coded.

In still another example, the video coder may use a simplified depth coding (SDC) mode to code an intra-prediction unit of a depth slice. The SDC mode is described in greater detail below. In contrast to other intra-mode coding schemes, when using the SDC mode, the video coder does not transform or quantize the residual depth values. Rather, the video coder may directly code residual depth values.

In another example, the video coder may use a depth modeling mode (DMM) to code an intra prediction unit of a depth slice. The DMM of 3D-HEVC is described in greater detail below with respect to FIGS. 7A and 7B. With DMM, the video coder may partition a block of depth data (referred to generally as a depth block) into prediction regions. For example, the video coder may partition a block of depth data using a Wedgelet pattern, defined by an arbitrary line drawn through the block of depth data, or a Contour pattern, which partitions the depth block into two irregularly-shaped regions. The Wedgelet pattern is described in more detail below with respect to FIGS. 8A and 8B, and FIG. 9.

While certain techniques of this disclosure may generally be described with respect to 3D-HEVC, the techniques are not necessarily limited in this way. The techniques described herein may also be applicable to other current standards or future standards not yet developed, particularly where it may be advantageous to provide simplified intra modes signaling of depth maps.

Figure 2:
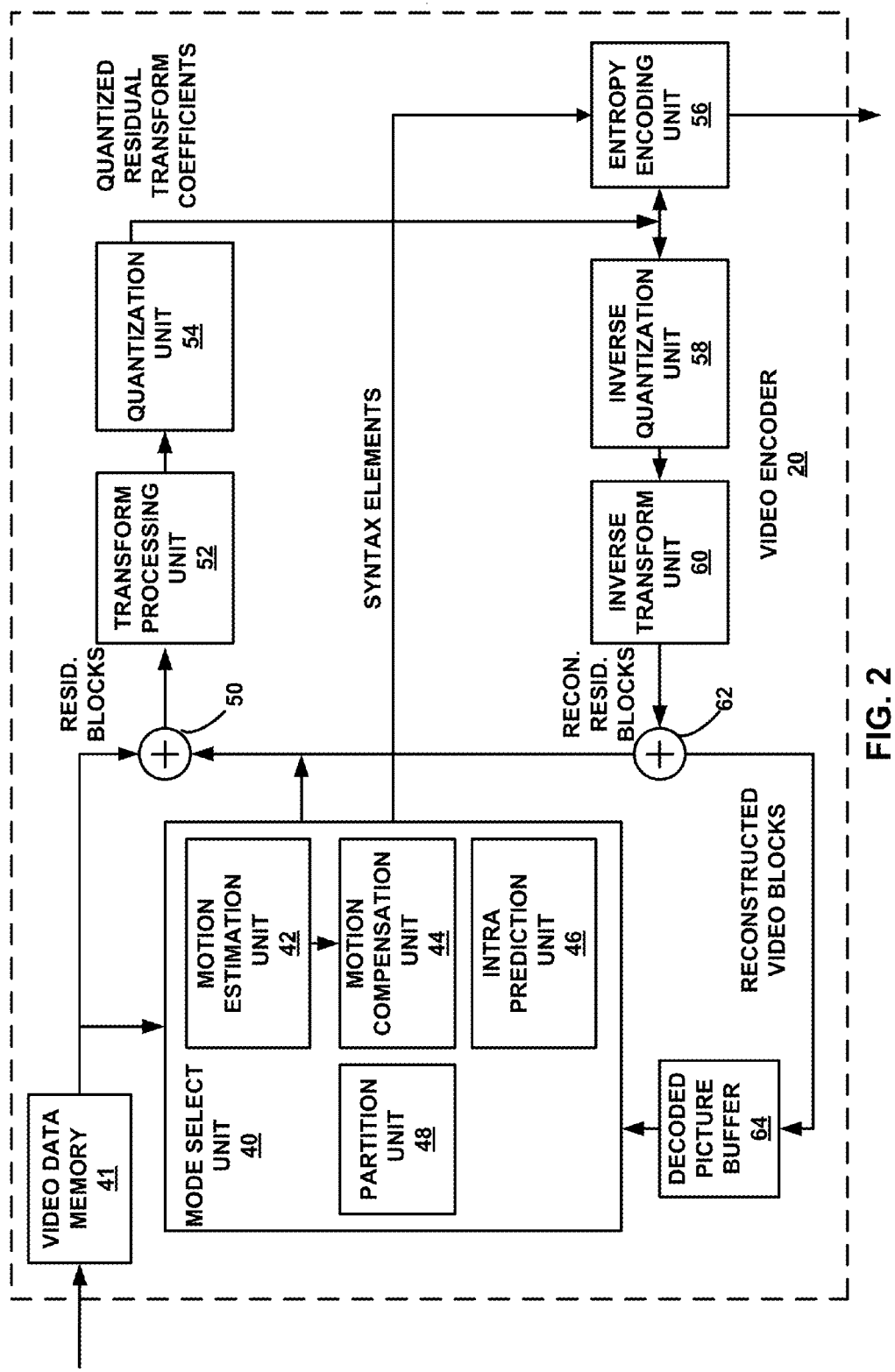
FIG. 2 is a block diagram illustrating an example of video encoder that may implement techniques for depth data coding.

FIG. 2 is a block diagram illustrating an example of video encoder 20 that may implement techniques for depth data coding. Video encoder 20 is representative of a device that may be configured to perform techniques for simplified coding modes signaling of depth maps in 3D-HEVC, as described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As noted above, video encoder 20 may be adapted to perform multiview video coding. In some instances, video encoder 20 may be configured to code multiview HEVC, such that each view in a time instance may be processed by a decoder, such as video decoder 30. For 3D-HEVC, in addition to encoding texture maps (i.e., luma and chroma values) for each view, video encoder 20 may further encode a depth map for each view.

As shown in FIG. 2, video encoder 20 receives a current video block within a video frame to be encoded. In the example of FIG. 2, video encoder 20 includes a video data memory 41, a mode select unit 40, decoded picture buffer (DPB) 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter). Example filers may include adaptive loop filters, sample adaptive offset (SAO) filters or other types of filters.

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64.

Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map. For example, intra-prediction unit 46 may use intra prediction modes from the base (2D) HEVC standard, a region boundary chain coding mode (CCM), a simplified depth coding or segmentation-wise DC coding (SDC), or a depth modeling mode (DMM) to code an intra predicted PU of a depth slice. In some examples, motion estimation unit 42 and motion compensation unit 44 may also be configured to code depth blocks of a depth map. Motion estimation unit 42 and motion compensation unit 44 may perform inter prediction according to the base (2D) HEVC standard or an Inter SDC mode to code an inter predicted PU of a depth slice.

Transform processing unit 52 applies the transform to the residual block, producing a block of residual transform coefficients. The transform may convert the residual information from a pixel value domain to a transform domain, such as a frequency domain. Transform processing unit 52 may perform transforms such as discrete cosine transforms (DCTs) or other transforms that are conceptually similar to DCT. Wavelet transforms, integer transforms, sub-band transforms or other types of transforms could also be used. Transform processing unit 52 may send the resulting transform coefficients to quantization unit 54. In some examples, the transform process may be skipped.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive binary arithmetic coding (CABAC) or other entropy coding processes, such as context adaptive variable length coding (CAVLC), syntax-based context-adaptive binary arithmetic coding (SBAC), or probability interval partitioning entropy (PIPE) coding. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation.

Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

According to the techniques described in this disclosure, video encoder 20 may be configured to encode depth data for 3D video data represented in a multiview plus depth format using depth coding modes that are different from HEVC coding modes. Examples of additional depth intra coding modes available in a 3D video coding process, such as a 3D-HEVC process, include at least two of a DMM, a SDC mode, and a CCM. In addition, an example of an additional depth inter coding mode includes an Inter SDC mode.

In one example, video encoder 20 signals depth intra coding modes used to code depth data for 3D video data in a depth modeling table. The depth modeling table signals the syntax for the additional depth intra coding modes separate from the syntax for the HEVC intra coding modes. In addition, video encoder 20 signals a syntax element, such as a flag, to indicate whether any of the depth intra coding modes that are different from the HEVC intra coding modes are enabled for the 3D video data. In some examples, the syntax element may indicate whether all of the depth intra coding modes are enabled for the 3D video data. The syntax element may be included in one of a video parameter set (VPS), a sequence parameter set (SPS) or a picture parameter set (SPS) of the video data. When the depth intra coding modes are enabled, the flag signaled by video encoder 20 indicates to video decoder 30 to decode the depth modeling table to determine the one of the depth intra coding modes used to code the depth data. The depth modeling table may be encoded at one of a coding unit (CU) level or a prediction unit (PU) level of the video data. The signaling of video encoder 20, in accordance with the techniques of this disclosure, may reduce the decoder parsing burden by signaling the depth intra coding modes in the depth modeling table separate from the HEVC intra coding modes, and indicating when the depth intra coding modes are enabled and the depth modeling table should be decoded.

In another example, video encoder 20 may be configured to signal residual information of depth data for 3D video data using a set of syntax elements unified across two or more of the depth coding modes. The depth coding modes may include the depth intra coding modes and the depth inter coding mode. The set of syntax elements may include a syntax element that indicates whether residual values are coded for any of the depth coding modes. The set of syntax elements may also include syntax elements that indicate an absolute value and a sign of residual values for any of the depth coding modes. By sharing the same set of syntax elements to indicate residual information for two or more of the depth coding modes, video encoder 20 may also unify context model selection and binarization methods for each of the shared syntax elements. In addition, for the depth intra coding modes, video encoder 20 may determine to not filter neighboring reference samples during generation of the residual values of the depth data. The encoding mechanisms and signaling of video encoder 20, in accordance with the techniques of this disclosure, may reduce the decoder parsing burden and reduce a number of required context models and binarization methods by unifying the residual information syntax for the depth coding modes.

Figure 3:
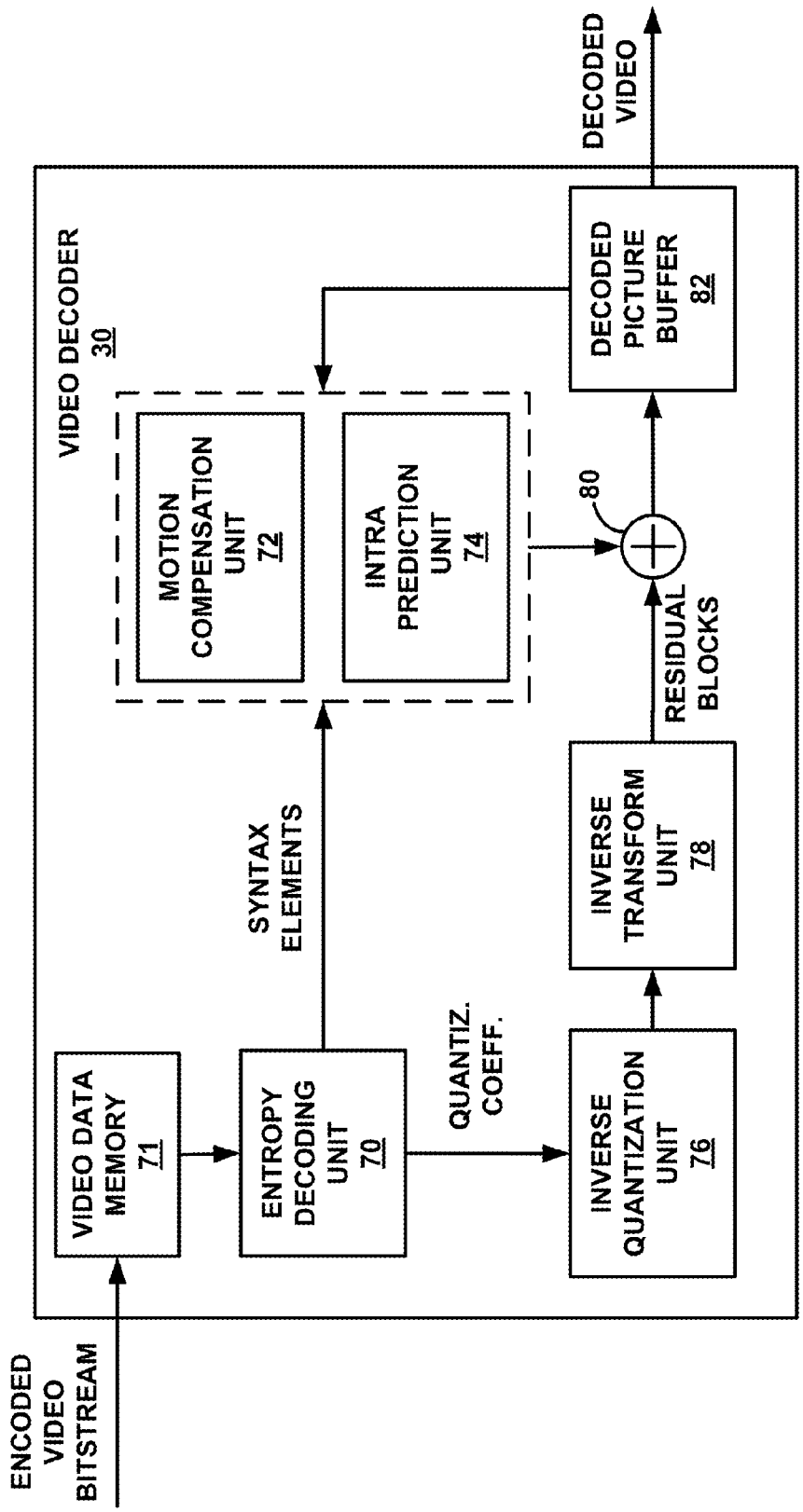
FIG. 3 is a block diagram illustrating an example of video decoder that may implement techniques for depth data coding.

FIG. 3 is a block diagram illustrating an example of video decoder 30 that may implement techniques for depth data coding. In the example of FIG. 3, video decoder 30 includes an a video data memory 71, an entropy decoding unit 70, motion compensation unit 72, intra prediction unit 74, inverse quantization unit 76, inverse transformation unit 78, decoded picture buffer (DPB) 82 and summer 80. Video decoder 30 represents a device that may be configured to perform techniques for simplified coding modes signaling of depth maps in 3D-HEVC, as described in this disclosure Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 entropy decodes the bitstream to generate quantized coefficients, motion vectors or intra-prediction mode indicators, and other syntax elements. Video decoder 30 may receive the syntax elements at the video slice level and/or the video block level.

As noted above, video decoder 30 may be adapted to perform multiview video coding. In some instances, video decoder 30 may be configured to decode multiview HEVC. For HEVC-3D, in addition to decoding texture maps (i.e., luma and chroma values) for each view, video decoder 30 may further decode a depth map for each view.

When a video slice is coded as an intra-coded (1) slice, intra prediction unit 74 may generate prediction data for a video block of the current video slice based on a signaled intra prediction mode and data from previously decoded blocks of the current frame or picture. Intra prediction unit 74 may also intra code depth data. For example, intra prediction unit 74 may use intra prediction modes from the base (2D) HEVC standard, a region boundary chain coding mode (CCM), a simplified depth coding (SDC) mode, or a depth modeling mode (DMM) to code an intra predicted PU of a depth slice.

When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in decoded picture buffer 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Motion compensation unit 72 may also inter code depth data. For example, motion compensation unit 72 may perform inter prediction according to the base (2D) HEVC standard or an Inter SDC mode to code an intra predicted PU of a depth slice.

Inverse quantization unit 76 inverse quantizes. i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 or intra-prediction unit 74 generates the predictive block for the current video block (e.g., a texture block or a depth block) based on motion vectors or other syntax elements, video decoder 30 forms a decoded video block by summing the residual blocks from inverse transform unit 78 with the corresponding predictive blocks generated by motion compensation unit 72 or intra-prediction unit 74. Summer 80 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

According to the techniques described in this disclosure, video decoder 30 is configured to decode depth data for 3D video data represented in a multiview plus depth format using depth coding modes that are different than HEVC coding modes. Examples of additional depth intra coding modes available in a 3D video coding process, such as a 3D-HEVC process, include at least two of a DMM, a SDC mode, and a CCM. In addition, an example of an additional depth inter coding mode includes an Inter SDC mode.

In one example, video decoder 30 decodes syntax elements indicating depth intra coding modes used to code depth data for 3D video data in a depth modeling table. The depth modeling table includes the syntax for the additional depth intra coding modes separate from the syntax for the HEVC intra coding modes. In addition, video decoder 30 decodes a syntax element, such as a flag, that indicates whether any of the depth intra coding modes that are different from the HEVC intra coding modes are enabled for the 3D video data. In some examples, the syntax element may indicate whether all of the depth intra coding modes are enabled for the 3D video data. The syntax element may be included in one of a video parameter set (VPS), a sequence parameter set (SPS) or a picture parameter set (SPS) of the video data. When video decoder 30 determines that the depth intra coding modes are enabled based on the decoded syntax element, video decoder 30 decodes the depth modeling table to determine the one of the depth intra coding modes used to code the depth data. The depth modeling table may be decoded at one of a coding unit (CU) level or a prediction unit (PU) level of the video data. The signaling, in accordance with the techniques of this disclosure, may reduce the parsing burden at video decoder 30 by including the depth intra coding modes in the depth modeling table separate from the HEVC intra coding modes, and indicating when the depth intra coding modes are enabled and the depth modeling table should be decoded.

In another example, video decoder 30 may be configured to decode a set of syntax elements that indicates residual information of depth data for 3D video data, where the set of syntax elements is unified across two or more of the depth coding modes. The depth coding modes may include the depth intra coding modes and the depth inter coding mode. The set of syntax elements may include a syntax element that indicates whether residual values are coded for any of the depth coding modes. The set of syntax elements may also include syntax elements that indicate an absolute value and a sign of residual values for any of the depth coding modes. By sharing the same set of syntax elements to indicate residual information for two or more of the depth coding modes, video decoder 30 may also unify context model selection and binarization methods for each of the shared syntax elements. In addition, for the depth intra modes, video decoder 30 may determine to not filter neighboring reference samples during reconstruction of depth values of the video data based on the received residual values. The coding mechanisms, in accordance with the techniques of this disclosure, may reduce the parsing burden at video decoder 30 and reduce a number of required context models and binarization methods by unifying the residual information syntax for the depth coding modes.

Various techniques for simplified coding mode signaling of depth maps consistent with 3D-HEVC will now be described in further detail. The techniques may be related to depth intra coding modes, includes two or more of a depth modeling mode (DMM), a simplified depth coding (SDC) mode, and a chain coding mode (CCM). The techniques may further be related to both depth intra coding modes and depth inter coding modes, such as an Inter SDC mode. Such techniques may be performed, for example, by or in conjunction with the devices illustrated in FIGS. 1-3. The following description includes a discussion of various video coding standards and techniques.

In this section, video coding techniques related to this disclosure are firstly reviewed. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The joint draft of MVC is described in "Advanced video coding for generic audiovisual services," ITU-T Recommendation H.264, March 2010. In addition, there is a new video coding standard, HEVC, being developed by the JCT-VC of ITU-T VCEG and ISO/IEC MPEG. A draft of HEVC is available from http://phenix.it-sudparis.eu/jct/doc_end_user/documents/9_Geneva/wg11/JCTVC-I1003-v5.zip.

The JCT-3V is currently conducting study of two three-dimensional video (3DV) solutions as extensions to HEVC. One example 3DV solution includes a multiview extension of HEVC that is referred to as MV-HEVC. Another example includes the depth-enhanced 3D video extension referred to as 3D-HEVC.

In 3D-HEVC, three-dimensional (3D) video data is represented using the multiview video plus depth format, in which captured views (e.g., textures) are associated with corresponding depth maps. In 3D-HEVC, the textures and depth maps are coded and multiplexed into a 3D video bitstream. Depth maps are coded as a grayscale video where the luma samples represent the depth values, and conventional intra- and inter-coding methods can be applied for depth map coding.

Depth maps are characterized by sharp edges and constant areas, and edges in depth maps typically present strong correlations with corresponding texture data. Due to the different statistics and correlations between texture and corresponding depth, different coding schemes are designed for depth maps based on a 2D video codec.

Figure 4:
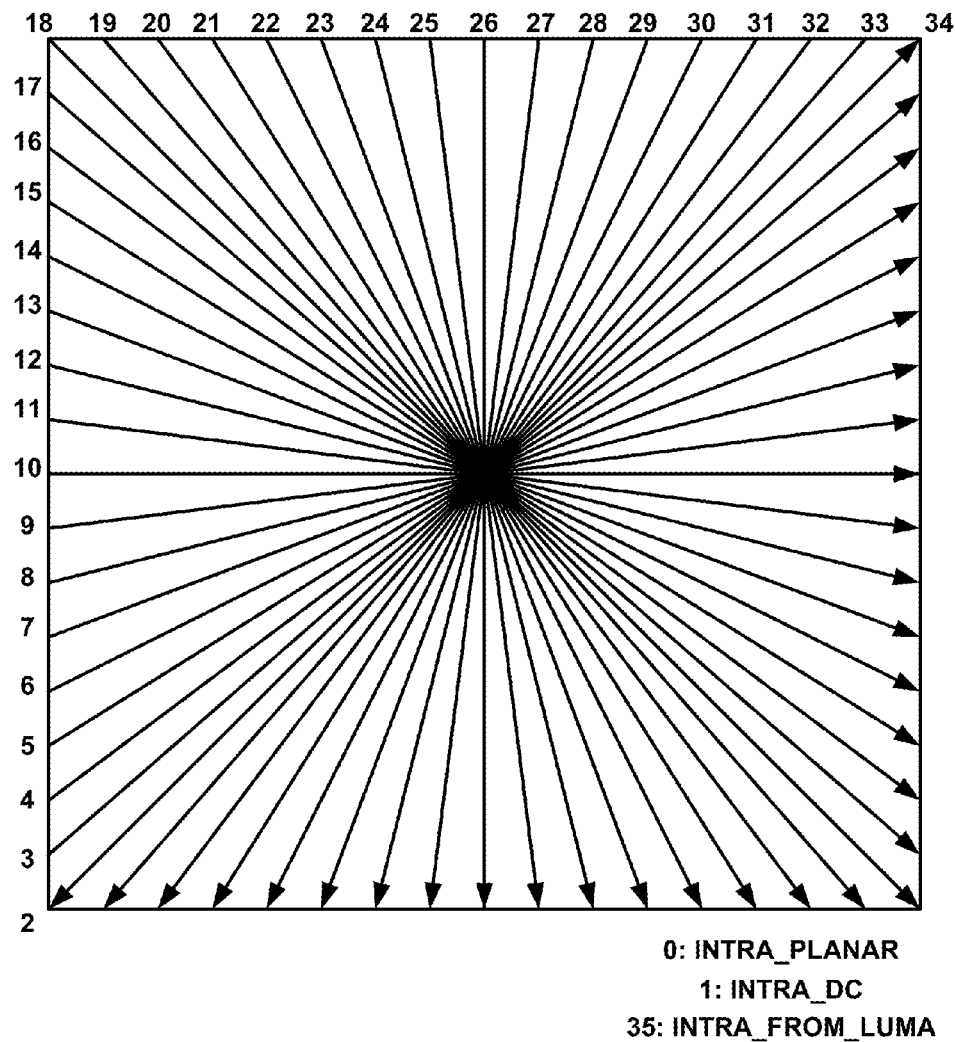
FIG. 4 generally illustrates the prediction directions associated with directional intra prediction modes in HEVC.

FIG. 4 generally illustrates the prediction directions associated with directional intra prediction modes in HEVC. In the base (2D) HEVC standard, for the luma component of each Prediction Unit (PU), an intra prediction coding method is utilized with thirty-three angular prediction modes (indexed from 2 to 34), DC mode (indexed with 1) and Planar mode (indexed with 0), as shown in FIG. 4. For example, as noted above, the HEVC standard may include thirty-five intra-prediction modes, including a planar mode (mode 0), a DC mode (mode 1) and 33 directional prediction modes (modes 2-34).

With planar mode, prediction is performed using a so-called "plane" function. With DC mode, prediction is performed based on an averaging of pixel values within the block. With a directional prediction mode, prediction is performed based on reconstructed pixels of a neighboring block along a particular direction (as indicated by the mode). In general, the tail end of the arrows shown in FIG. 4 represents a relative one of neighboring pixels from which a value is retrieved, while the head of the arrows represents the direction in which the retrieved value is propagated to form a predictive block.

The HEVC-based 3D Video Coding (3D-HEVC) codec in MPEG is based on the solutions proposed in submissions m22570 and m22571. The full citation for m22570 is: Schwarz et al., Description of 3D Video Coding Technology Proposal by Fraunhofer HHI (HEVC compatible configuration A), MPEG Meeting ISO/IEC JTC1/SC29/WG11, Doc. MPEG11/M22570, Geneva, Switzerland, November/December 2011. The full citation for m22571 is: Schwarz et al., Description of 3D Video Technology Proposal by Fraunhofer HHI (HEVC compatible; configuration B), MPEG Meeting—ISO/IEC JTC1/SC29/WG11, Doc. MPEG 11/M22571. Geneva, Switzerland, November/December 2011.

The reference software HTM version 6.0 for 3D-HEVC is available from: https://hevc.hhi.fraunhofer.de/svn/svn_3DVCSoftware/tags/HTM-6.0/. The software description (document number: C1005) for 3D-HEVC is available from: http://phenix.it-sudparis.eu/jct2idoc_end_user/documents/3_Geneva/wg11/JCT3V-C1005-v1.zip. For example, the link immediately above refers to the following documents: "HEVC Test Model 3," Document JCT3V-C1005_spec_d0, Tech et al., Joint Collaborative Team on 3D Video Coding Extension Development of ITU-T SG 16 WP 3 and ISO/IEC JTC 1/SC 29/WG 11, 3rd Meeting: Geneva, CH, 17-23 Jan. 2013, and "3D-HEVC Test Model 3," Document JCT3V-C1005_d0, Tech et al., Joint Collaborative Team on 3D Video Coding Extension Development of ITU-T SG 16 WP 3 and ISO/IEC JTC 1/SC 29/WG 11, 3rd Meeting: Geneva. CH, 17-23 Jan. 2013.

In 3D-HEVC, each access unit contains multiple view components, each contains a unique view id, or view order index, or layer id. A view component contains a texture view component as well as a depth view component. A texture view component is coded as one or more texture slices, while the depth view component is coded as one or more depth slices.

The available intra coding modes for depth data coding are HEVC intra mode, HEVC intra pulse code modulation (I_PCM) mode, Region Boundary Chain Coding Mode (CCM), Depth Modeling Mode (DMM), and Simplified Depth Coding Mode (SDCM or SDC mode). The available inter coding modes for depth data coding are HEVC inter mode and Inter SDC mode. Each of them is described in order in the following subsections.

In the HEVC intra mode for 3D-HEVC, the same definition of intra prediction modes as described above for the base (2D) HEVC standard is utilized. That is, a total of thirty-five intra prediction modes are supported with intra prediction mode 0 referring to planar intra prediction mode, mode 1 referring to DC prediction, and modes 2 to 34 referring to angular prediction modes with different directionalities, as illustrated in FIG. 4.

FIG. 5 is a table showing values of V and H for the angular intra prediction modes. The angle of the directional intra prediction modes is indicated as (H, V), with the value roughly being equal to H/V. The possible (H, V) combinations for the HEVC intra modes are listed in the table of FIG. 5, in which each prediction mode indexed by 2 through 34 corresponds to one of the (H, V) combinations.

HEVC I_PCM is also supported for intra coding. In the HEVC I_PCM mode, the coding mechanisms of prediction, transform, quantization and entropy coding are bypassed while the prediction samples are coded by a predefined number of bits.

Region boundary chain coding mode, referred to as chain coding mode (CCM), is introduced as one special HEVC intra prediction mode for depth map coding. CCM was described in JCT3V-A0070 (entitled "CE.6.h Region Boundary Chain Coding for Depth-map," Heo et al., JCT2-A0070, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012).

In the CCM, a depth block is partitioned into two regions specified by an arbitrary partition pattern that is signaled using "chains." A chain is a connection between a sample and one of its eight-connectivity samples. Each chain is assigned with a direction index and a series of connected chain indexes are signaled to define the partition pattern.

Figure 6A:
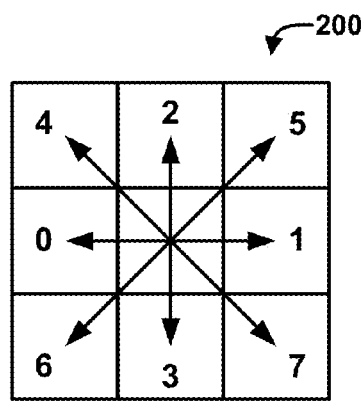
FIGS. 6A and 6B are conceptual diagrams illustrating, respectively, an example depth partition pattern, and example coded chains in a region boundary chain coding mode (CCM).
Figure 6B:
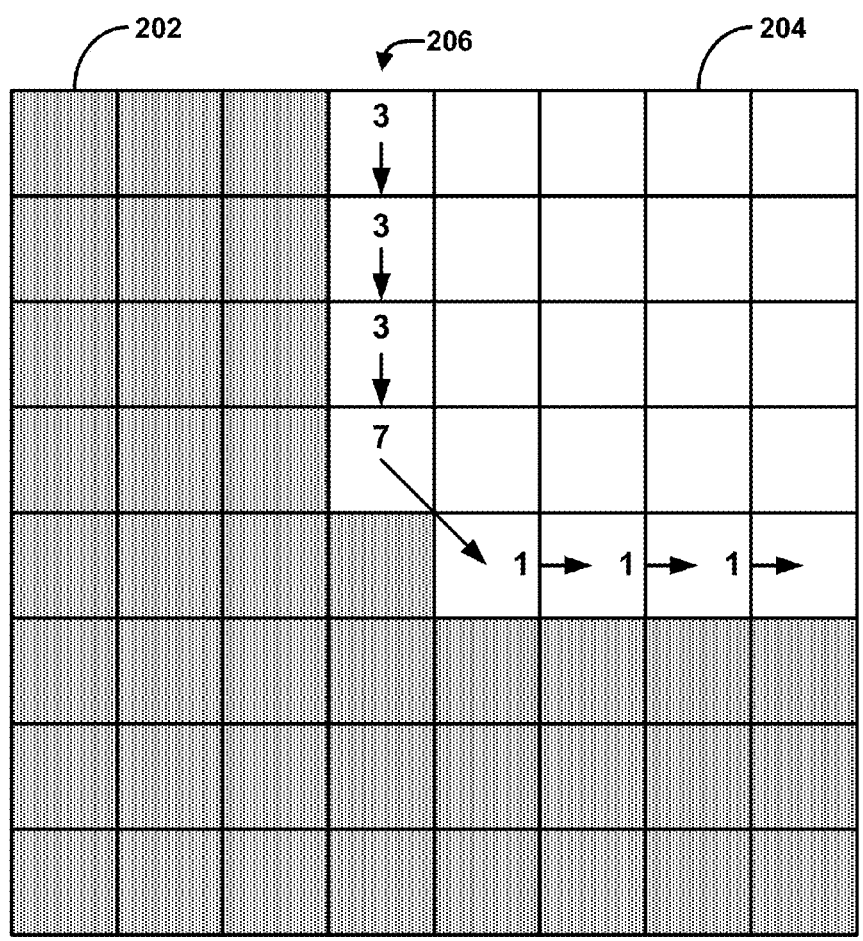

FIGS. 6A and 6B are conceptual diagrams illustrating, respectively, an example depth partition pattern, and example coded chains in the CCM. As shown in block 200 of FIG. 6A, there are 8 different types of chains, each assigned with a direction index ranging from 0 to 7. The chain direction types may aid a video coder in determining partitions of a depth block. Note, that instead of directly coding the direction index (0 . . . 7), differential coding is applied for signaling the direction index.

In the CCM, when rem_intra_luma_pred_mode is equal to 31 and the current PU size is equal to or larger than 4×4 but smaller than 64×64, an additional flag (edge_intra_flag) is transmitted in the bitstream to signal whether CCM is used or not. When this additional flag indicates that CCM is applied to the current PU, a starting point of a region boundary (from left column or above row, edge_start_left_flag), a starting position of the chain (edge_start_position), the number of the chain codes minus 1 (num_edge_codes_minus1), and, for each chain code, a direction index (edge_code) are further signaled in the bitstream.

The example PU illustrated in FIG. 6B includes a first partition 202 and a second partition 204 separated by a chain 206 that indicates the partitioning structure. A video encoder (such as video encoder 20) may determine and signal chain 206 for the current PU in an encoded bitstream, while a video decoder (such as video decoder 30) may parse data representing chain 206 from an encoded bitstream.

In general, chain 206 includes a starting position, an indication of a number of links in the chain (e.g., a number of chain codes), and for each chain code, a direction index.

To signal the arbitrary partition pattern shown in the example of FIG. 6B, video encoder 20 may encode one bit (e.g., 0) to indicate that chain 206 begins from the top boundary. Video encoder 20 may further encode three bits (e.g., 011) to indicate that chain 206 begins after the third depth sample of the top boundary, i.e., a starting position of "3." Video encoder 20 may further encode four bits (e.g., 0110) to indicate that there are 7 total links in chain 206. Video encoder 20 may also encode a series of connected chains indexes (e.g., 3, 3, 3, 7, 1, 1, 1) to indicate the direction of each chain link (e.g., in accordance with block 200). In some examples, video encoder 20 may convert each index to a code word using a look-up table. A video decoder, such as video decoder 30, may parse the signaling described above to determine the partitioning pattern of a block. Video decoder 30 may then decode depth values for each partition.

A Depth Modeling Mode (DMM) method may be used to provide better representations of sharp edges in depth maps during inter coding. The DMM method can be integrated as an alternative to the intra prediction modes specified in HEVC. A one-bit flag, for example, may be signaled for each PU to specify whether DMM or conventional intra prediction (including the HEVC intra mode, HEVC I_PCM mode and, in some cases, CCM) is applied. In one example, there are four intra modes in DMM, i.e., DMM_1, DMM_2, DMM_3, and DMM_4. In all four modes, a depth block may be partitioned into two regions specified by a DMM pattern, where each region is represented by a constant value. The DMM pattern can be either explicitly signaled (DMM_1), predicted by spatially neighboring blocks (DMM_2), or predicted by co-located texture block (DMM_3 and DMM_4). There are two partitioning models defined in the DMM, including Wedgelet partitioning and Contour partitioning.

Figure 7A:
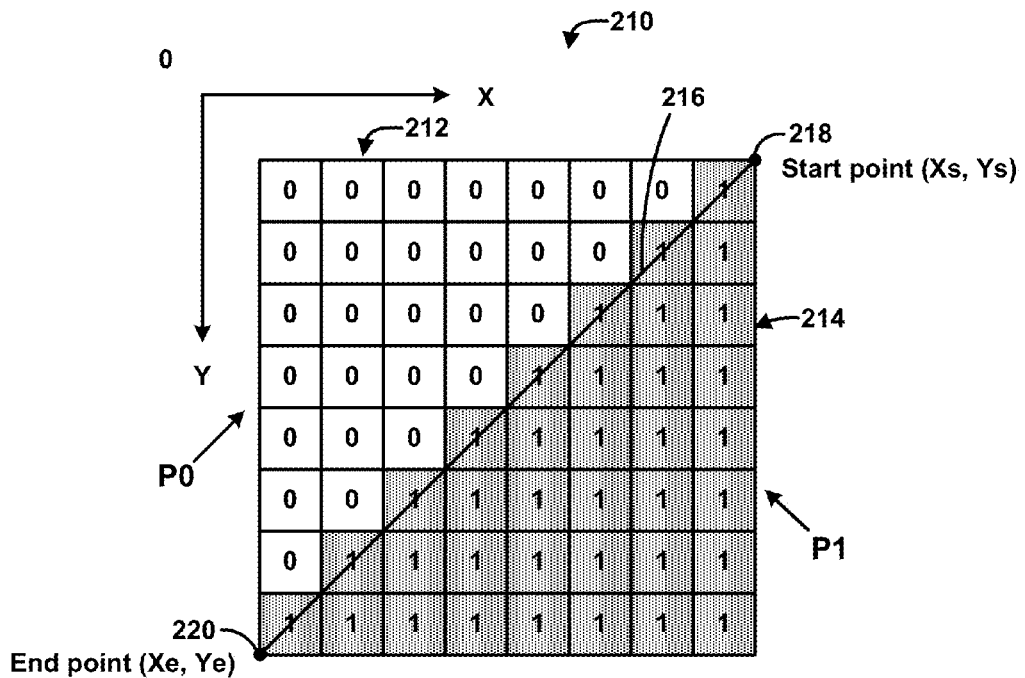
FIGS. 7A and 7B are conceptual diagrams illustrating, respectively, an example Wedgelet pattern for an 8×8 block, and an example Contour pattern for an 8×8 block in a depth modeling mode (DMM).
Figure 7B:
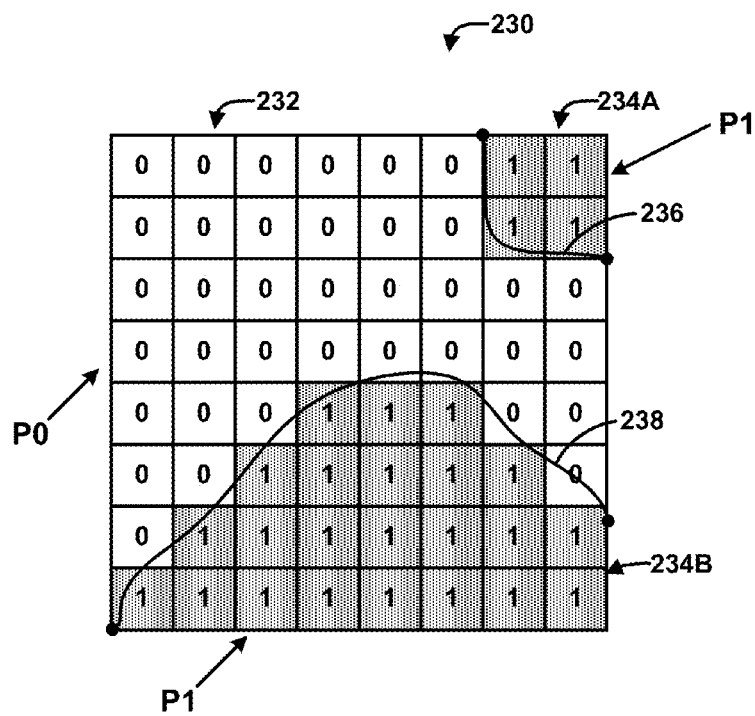

FIGS. 7A and 7B are conceptual diagrams illustrating, respectively, an example Wedgelet pattern for an 8×8 block, and an example Contour pattern for an 8×8 block in the DMM. FIG. 7A shows one Wedgelet pattern for an 8×8 block. For a Wedgelet partition, a depth block 210 is partitioned into two regions 212, 214 by a straight line 216, with a start point 218 located at (Xs, Ys) and an end point 220 located at (Xe, Ye), as illustrated in FIG. 7A, where the two regions are labeled with $P_0$ and $P_1$. Start point 218 may be defined as point (8, 0) and end point 220 may be defined as point (0, 8).

In the example of FIG. 7A, each individual square within depth block 210 represents a respective individual pixel of depth block 210. Numeric values within the squares represent whether the corresponding pixel belongs to region $P_0$ 212 (value "0") or region $P_1$ 214 (value "1"). Shading is also used in FIG. 7A to indicate whether a pixel belongs to region 212 (white squares) or region 214 (grey squares). Each Wedgelet pattern consists of an array of size $u_B \times v_B$ binary digit labeling whether the corresponding sample belongs to region $P_0$ or $P_1$, where $u_B$ and $v_B$ respectively represent the horizontal and vertical size of depth block 210.

In this manner, a video coder, such as video encoder 20 and video decoder 30, may use line 216, as defined by start point 218 and end point 220, to determine whether a pixel of depth block 210 belongs to region 212 (which may also be referred to as region "$P_0$") or to region 214 (which may also be referred to as region "$P_1$"). The Wedgelet patterns are initialized at the beginning of both encoding and decoding.

FIG. 7B shows one contour pattern for an 8×8 block. For a Contour partition, a depth block 230 can be partitioned into two irregular regions. In the example of FIG. 7B, depth block 230 is partitioned into region 232 and region 234A, 234B by lines 236, 238. Although pixels in region 234A are not immediately adjacent to pixels in region 234B, regions 234A and 234B are defined to form one single region, for the purposes of predicting a PU of depth block 230. The Contour partitioning is more flexible than the Wedgelet partitioning, but may be relatively more difficult to signal. In sub-mode DMM_4, in the case of 3D-HEVC, Contour partitioning pattern is implicitly derived using reconstructed luma samples of the co-located texture block.

In the example of FIG. 7B, each individual square within depth block 230 represents a respective individual pixel of depth block 230. Numeric values within the squares represent whether the corresponding pixel belongs to region $P_0$ 232 (value "0" in the example of FIG. 7B) or region $P_1$ 234A, 234B (value "1" in the example of FIG. 7B). Shading is also used in FIG. 7B to indicate whether a pixel belongs to region 232 (white squares) or region 234A, 234B (grey squares). As discussed above with respect to Wedgelet patterns, each Contour pattern may be defined by an array of size $u_B \times v_B$ binary digit labeling of whether the corresponding sample (that is, pixel) belongs to region $P_0$ or $P_1$, where $u_B$ and $v_B$ respectively represent the horizontal and vertical size of depth block 230.

In this manner, a video coder, such as video encoder 20 and video decoder 30, may use lines 236, 238 to determine whether a pixel of depth block 230 belongs to region 232 (which may also be referred to as region "$P_0$") or to region 234 (which may also be referred to as region "$P_1$"). Regions "$P_1$" and "$P_2$" are default naming conventions for different regions partitioned according to DMM, and thus, region $P_0$ of depth block 210 would not be considered the same region as region $P_0$ of depth block 230.

In the DMM, there are a total of 86, 782, 1394 and 1503 different Wedgelet patterns defined for 4×4, 8×8, 16×16 and 32×32 blocks, respectively. These patterns are generated and stored in both encoding and decoding. Based on the type (Wedgelet or Contour partitioning) and derivation of DMM pattern, four sub-modes are defined in DMM, including: DMM_1 (explicit Wedgelet signaling), DMM_2 (intra predicted Wedgelet partitioning), DMM_3 (inter-component Wedgelet partitioning), and DMM_4 (inter-component Contour partitioning), each described in more detail below.

The sub-mode DMM_1 defines explicit Wedgelet signaling. In sub-mode DMM_1, Wedgelet partitioning is applied and the optimal one is selected at the encoder, such as video encoder 20, based on a certain distortion criterion. The index of the selected Wedgelet pattern is signaled in the bitstream. Seven, ten or eleven bins are used to code the index which corresponds to the PU size equal to 4×4, 8×8 or larger than 8×8.

The sub-mode DMM_2 defines intra predicted Wedgelet partitioning. In sub-mode DMM_2, Wedgelet partitioning is applied and the selected Wedgelet pattern is predicted using the information of neighboring intra prediction mode and Wedgelet pattern information. In this case, the direct signaling of the Wedgelet pattern index is avoided, and a refinement of the predicted Wedgelet pattern is signaled.

The sub-mode DMM_3 defines inter-component Wedgelet partitioning. In sub-mode DMM_3, all available Wedgelet patterns are exhaustively tried on the co-located luma texture block region of the same access unit, and the one which matches the texture block best is selected as the Wedgelet partition for the PU in the depth slice. No signaling of Wedgelet partitioning pattern is needed, but an exhaustive search of the best pattern is required at the decoder, such as video decoder 30.

Due to the adoption of JCT3V-C0044 (entitled "CE6.h results on Simplification of Depth Modeling Mode 3," Wang et al., JCT3V-C0044, Joint Collaborative Team on 3D Video Coding Extension Development of ITU-T SG 16 WP 3 and ISO/IECJTC 1/SC 29/WG 11, 3rd Meeting: Geneva, 17-23 Jan. 2013) in the 3D-HEVC standard, the sub-mode DMM_3 has been modified to be somewhat different than described above. For example, in the modified sub-mode DMM_3, if the co-located texture luma block is intra coded with one of angular intra prediction modes 2 to 34, an additional index is signaled to identify the desired or final Wedgelet pattern from a subset of Wedgelet patterns. The subset of Wedgelet patterns is identified by the intra prediction direction of the co-located texture block.

A detailed introduction of the construction of subsets is described as follows. Assuming that the starting point of the Wedgelet pattern is S(Xs, Ys) and the ending point is E(Xe, Ye), then there is a pair of (S, E) corresponding to each Wedgelet pattern. For each intra prediction mode (i.e., modes 2 to 34), the direction information (Hi, Vi) is defined as in the table shown in FIG. 5. The fitness between the Wedgelet pattern (defined by (Xs, Ys) and E(Xe, Ye)) and the intra mode (defined by (Hi, Vi)) is defined as: $D[i]=|Vi\times(Xs-Xe)-Hi\times(Ye-Ys)|$. Then, each Wedgelet pattern can be mapped to the nearest intra prediction mode by searching minimum D among all intra prediction modes. Correspondingly, for each intra prediction mode j, there exists a Wedgelet pattern subset S(j) in which a nearest intra prediction mode of every pattern is j.

Figure 8A:
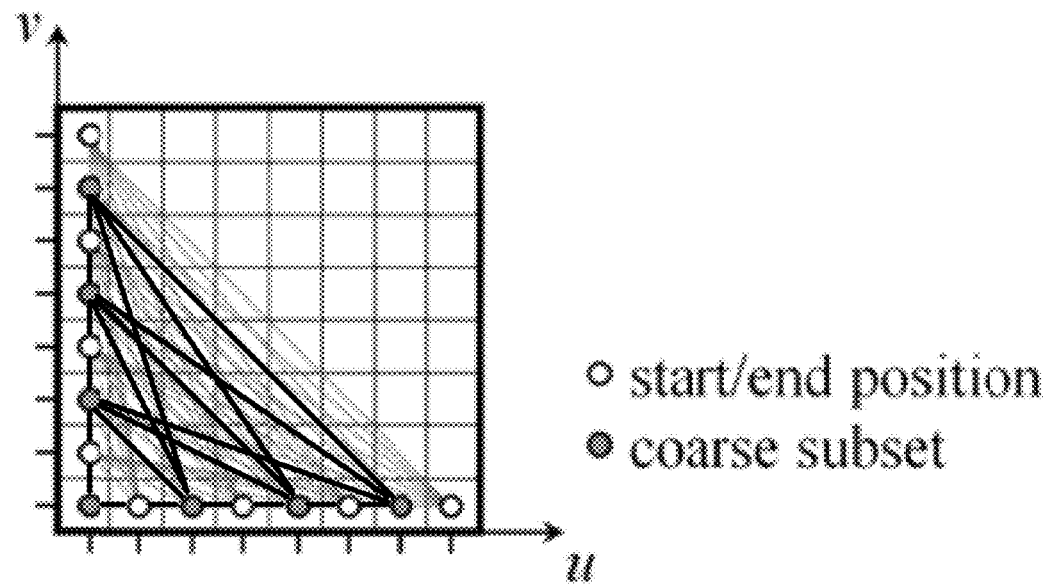
FIGS. 8A and 8B are conceptual diagrams illustrating, respectively, an example coarse subset of Wedgelet separation line start/end positions and example refinements within one Wedgelet pattern subset in a DMM.
Figure 8B:
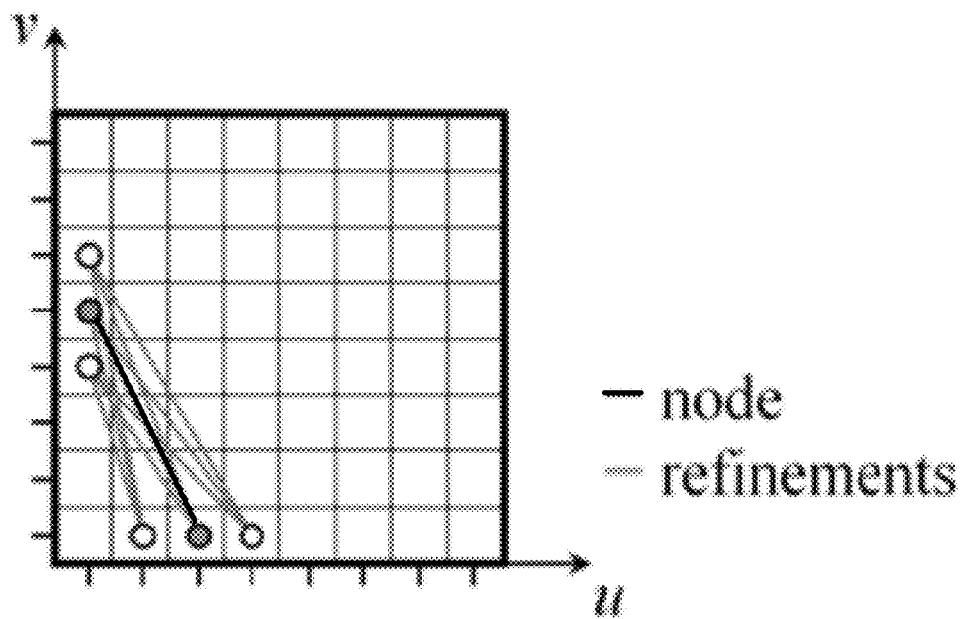

Otherwise, in the case where a co-located texture luma block is not intra coded or the intra mode is 0 or 1, the index of the best Wedgelet pattern in the coarse candidate Wedgelet pattern subset is signaled. FIGS. 8A and 8B are conceptual diagrams illustrating, respectively, an example coarse subset of Wedgelet separation line start/end positions and example refinements within one Wedgelet pattern subset in sub-mode DMM_3 of the DMM. In FIGS. 8A and 8B, the black-outlined circles indicate start/end positions of the Wedgelet pattern, and the ones of the black-outline circles with gray fill indicate the coarse subset of the start/end positions. The coarse patterns are generated for every two start and end positions, as shown in FIG. 8A. Each coarse candidate Wedgelet pattern subset contains up to eight references as shown in FIG. 8B. Note that, for both cases described above, the additional index that is signaled has the same fixed length.

The sub-mode DMM_4 defines inter-component Contour partitioning. In sub-mode DMM_4, a contour partitioning pattern is generated during the decoding process by separating a co-located texture block into two parts: the first part contains pixels with luma sample values larger than the average value, and the second part contains pixels with luma sample values less than or equal to the average value.

FIG. 9 is a table showing available DMM sub-modes and a number of Wedgelet patterns for different PU sizes. In an example implementation, for PU sizes less than or equaling to 4×4, only sub-mode DMM_1 and sub-mode DMM_3 are enabled, and for PU sizes larger than 4×4 but less than 64×64. i.e., 8×8, 16×16 and 32×32, all four modes are enabled. Furthermore, in the example implementation, for PU size larger than or equaling to 64×64, all four modes are disabled. For clarity, the available DMM sub-modes and corresponding numbers of Wedgelet patterns for different PU sizes are listed in the table shown in FIG. 9.

The Simplified Depth Coding (SDC) mode is introduced as an alternative intra coding mode to other HEVC intra coding modes. The SDC mode was described in JCT3V-B0036 (entitled "3D-CE6.h: Simplified Depth Coding with an optional Depth Lookup Table." Jager et al., Joint Collaborative Team on 3D Video Coding Extension Development of ITU-T SG 16 WP 3 and ISO/IEC JTC 1/SC 29/WG 11, 2nd Meeting: Shanghai, Conn., 13-19 Oct. 2012). An additional flag is signaled for each intra depth CU to specify whether the current CU is coded by the SDC mode or not. In the conventional 3D-HEVC process, the SDC mode is only applied for CUs with 2N×2N partition size.

In the SDC mode, instead of coding quantized transform coefficients, a depth block is represented as a type of partition, e.g., a single DC partition, two DMM_1 partitions, or a single planar partition, and a residual value (in the pixel domain) signaled for each partition. Three sub-modes are defined in the SDC mode including SDCM_DC, SDCM_DMM_1, and SDCM_Planar, which correspond to the partition types of DC, DMM_1, and Planar, respectively. In the SDC mode, no transform or quantization is applied and the depth values can be optionally mapped to indexes using a Depth Lookup Table (DLT), which is constructed by analyzing the frames within the first intra period before encoding the full sequence. If the DLT is used, the entire DLT is transmitted to the decoder, such as video decoder 30, in a sequence parameter set (SPS), and decoded index values are mapped back to depth values based on the DLT.

To describe the usage of DLT, in this disclosure, a table DLT[•] is used to convert a depth value to an index value according to the DLT, and a table IDLT[•] is used to convert an index value back to a depth value.

The syntax table for a coding unit (CU) is given below. The italicized portions of the syntax generally indicate the differences between the HEVC standard and the 3D-HEVC standard in terms of intra coding for depth views.

| G.7.3.9.1 General Coding unit syntax | |
|---|---|
| | Descriptor |
| coding_unit( x0, y0, log2CbSize , *ctDepth*) { | |
|   if( transquant_bypass_enable_flag ) { | |
|     cu_transquant_bypass_flag | ae(v) |
|   } | |
|   if( slice_type != I ) | |
|     skip_flag[ x0 ][ y0 ] | ae(v) |
|   if( skip_flag[ x0 ][ y0 ] ) | |
|     prediction_unit( x0, y0, log2CbSize ) | |
|     *if ( icEnableFlag )* | |
|       *ic_flag* | *ae(v)* |
|   else { | |
|     nCbS = ( 1 << log2CbSize ) | |
|     if( slice_type != I ) | |
|       pred_mode_flag | ae(v) |

-continued

| G.7.3.9.1 General Coding unit syntax | |
|---|---|
| | Descriptor |
|     if( PredMode = = MODE_INTRA && DepthFlag ) | |
|       sdc_flag[ x0 ] [ y0 ] | ae(v) |
| [Ed. (GT): In software there seems to be a dependency of position of sdc_flag and slice type.] | |
|     if( sdc_flag[ x0 ][ y0 ] ) { | |
|       sdc_pred_mode | ae(v) |
|       if( sdc_pred_mode = = 1 ) | |
|         wedge_full_tab_idx[ x0 ][ y0 ] | ae(v) |
|     } else { | |
|       if( ( PredMode[ x0 ] [ y0 ] ! = MODE_INTRA \|\| log2CbSize = = Log2MinCbSize ) && !predPartModeFlag) | |
|         part_mode | ae(v) |
|       if( PredMode[ x0 ][ y0 ] = = MODE_INTRA ) { | |
|         if( PartMode = = PART_2Nx2N && pcm_enabled_flag && | |
|           log2CbSize >= Log2MinIPCMCUSize && | |
|           log2CbSize <= Log2MaxIPCMCUSize ) | |
|         pcm_flag | ae(v) |
|         if( pcm_flag ) { | |
|           num_subsequent_pcm | tu(3) |
|           NumPCMBlock = num_subsequent_pcm + 1 | |
|           while( !byte_aligned( ) ) | |
|             pcm_alignment_zero_bit | f(1) |
|           pcm_sample( x0, y0, log2CbSize ) | |
|         } else { | |
|           pbOffset = ( PartMode = = PART_NxN ) ? ( nCbS / 2 ) : 0 | |
|           if ( vps_dmm_flag[ nuh_layer_id ] && log2CbSize <= Log2MaxDmmCbSize ) { | |
|             log2PbSize = log2CbSize − ( PartMode = = PART_NxN ? 1 : 0 ) | |
|             for( j = 0; j < = pbOffset; j = j + pbOffset ) | |
|               for( i = 0; i <= pbOffset; i = i + pbOffset ) | |
|                 dmm_flag[ x0 + i ][ y0+ j ] | ae(v) |
|             for( j = 0; j < = pbOffset; j = j + pbOffset ) | |
|               for( i = 0; i <= pbOffset; i = i + pbOffset ) | |
|                 if (dmm_flag[ x0 + i ][ y0+ j ] ) | |
|                   dmm_mode[ x0 + i ][ y0+ j ] | ae(v) |
|             for( j = 0; j <= pbOffset; j = j + pbOffset ) | |
|               for( i = 0; i <= pbOffset; i = i + pbOffset ) | |
|                 if ( dmm_flag[ x0 + i ][ y0+ j ] && | |
|                   ( dmm_mode[ x0 + i ][ y0+ j ] = = MODE_DMM_WFULL \|\| | |
|                   dmm_mode[ x0 + i ][ y0+ j ] = = MODE_DMM_WFULLDELTA ) ) | |
|                   wedge_full_tab_idx[ x0 + i ][ y0 + j ] | ae(v) |
|             for( j = 0; j <= pbOffset; j = j + pbOffset ) | |
|               for( i = 0; i <= pbOffset; i = i + pbOffset ) | |
|                 if ( dmm_flag[ x0 + i ][ y0+ j ] && | |
|                   ( dmm_mode[ x0 + i ][ y0+ j ] = = MODE_DMM_WPREDDIR \|\| | |
|                   dmm_mode[ x0 + i ][ y0+ j ] = = MODE_DMM_WPREDDIRDELTA ) ) | |
|                   wedge_predtex_tab_idx[ x0 + i ][ y0 + i ] | ae(v) |
|             for( j = 0; j <= pbOffset; j = j + pbOffset ) | |
|               for( i = 0; i <= pbOffset; i = i + pbOffset ) | |
|                 if ( dmm_flag[ x0 + i ][ y0+ j ] && | |
|                   ( dmm_mode[ x0 + i ][ y0+ j ] = = MODE_DMM_WPREDDIR \|\| | |
|                   dmm_mode[ x0 + i ][ y0+ j ] = = MODE_DMM_WPREDDIRDELTA ) ) | |
|                   dmm_delta_end_flag[ x0 + i ][ y0 + i ] | ae(v) |
|             for( j = 0; j <= pbOffset; j = j + pbOffset ) | |
|               for( i = 0; i <= pbOffset; i = i + pbOffset ) | |
|                 if ( dmm_delta_end_flag[ x0 + i ][ y0 + i ] ) | |
|                   dmm_delta_end_abs_minus1[ x0 + i ][ y0 + i ] | ae(v) |
|             for( j = 0; j <= pbOffset; j = j + pbOffset ) | |
|               for( i = 0; i <= pbOffset; i = i + pbOffset ) | |
|                 if ( dmm_delta_end_flag[ x0 + i ][ y0 + i ] ) | |
|                   dmm_delta_end_sign_flag[ x0 + i ][ y0+ j ] | ae(v) |
|             for( j = 0; j <= pbOffset; j = j + pbOffset ) | |
|               for( i = 0; i <= pbOffset; i = i + pbOffset ) | |
|                 DmmDeltaFlag[ x0 + i ][ y0 + i ] = ( dmm_flag[ x0 + i ][ y0+ j ] && | |
|                 ( dmm_mode[ x0 +i ][ y0 + i ] = = MODE_DMM_WFULLDELTA \|\| | |
|                 dmm_mode[ x0 + i ][ y0 + i ] = = MODE_DMM_WPREDDIRDELTA \|\| | |
|                 dmm_mode[ x0 + i ][ y0 + i ] = = MODE_DMM_WPREDTEXDELTA \|\| | |
|                 dmm_mode[ x0 + i ][ y0 + i ] = = MODE_DMM_CPREDTEXDELTA ) ) | |
|             for( j = 0; j <= pbOffset; j = j + pbOffset ) | |
|               for( i = 0; i <= pbOffset; i = i + pbOffset ) | |
|                 if ( DmmDeltaFlag[ x0 + i ][ y0 + i ] ) | |
|                   dmm_dc_1_abs[ x0 + i ][ y0 + i ] | ae(v) |

| G.7.3.9.1 General Coding unit syntax | |
|---|---|
| | Descriptor |
|         for( j = 0; j <= pbOffset; j = j + pbOffset )<br>          for( i = 0; i <= pbOffset; i = i + pbOffset )<br>            if ( DmmDeltaFlag[ x0 + i ][ y0+ j ] &&<br>               -dmm_dc_1_abs[ x0 + i ][ y0 + i ] != 0 )<br>               dmm_dc_1_sign_flag[ x0 + i ][ y0 + i ] | ae(v) |
|         for( j = 0; j <= pbOffset; j = j + pbOffset )<br>          for( i = 0; i <= pbOffset; i = i + pbOffset )<br>            if ( DmmDeltaFlag[ x0 + i ][ y0+ j ] )<br>               dmm_dc_2_abs[ x0 + i ][ y0 + i ] | ae(v) |
|         for( j = 0; j <= pbOffset; j = j + pbOffset )<br>          for( i = 0; i <= pbOffset; i = i + pbOffset )<br>            if ( DmmDeltaFlag[ x0 + i ][ y0+ j ] &&<br>               dmm_dc_2_abs[ x0 + i ][ y0 + i ] != 0 )<br>               dmm_dc_2_sign_flag[ x0 + i ][ y0 + i ] | ae(v) |
|       } else {<br>        for( j = 0; j <= pbOffset; j = j + pbOffset )<br>          for( i = 0; i <= pbOffset; i = i + pbOffset ) {<br>            if( !dmm_flag[ x0 + i ][ y0+ j ] )<br>              prev_intra_luma_pred_flag[ x0 + i ][ y0+ j ]<br>          } | ae(v) |
|         for( j = 0; j <= pbOffset; j = j + pbOffset )<br>          for( i = 0; i <= pbOffset; i = i + pbOffset ) {<br>            if( !dmm_flag[ x0 + i ][ y0+ j ] ) {<br>              if( prev_intra_luma_pred_flag[ x0 + i ][ y0+ j ] )<br>                mpm_idx[ x0 + i ][ y0+ j ] | ae(v) |
|               else {<br>                rem_intra_luma_pred_mode[ x0 + i ][ y0+ j ] | ae(v) |
|                 if( rem_intra_luma_pred_mode[ x0 + i ][ y0+ j ] == 31 &&<br>                  ( log2CbSize + ( PartMode == PART_NxN ) ? - 1 : 0 ) <= 5 &&<br>                  ( log2CbSize + ( PartMode == PART_NxN ) ? - 1 : 0 ) >= 2 ) {<br>                  edge_intra_flag[ x0 + i ][ y0 + j ] | ae(v) |
|                   if( edge_intra_flag[ x0 + i ][ y0 + j ] ) {<br>                    edge_start_left_flag[ x0 + i ][ y0+ j ] | ae(v) |
|                     edge_start_position[ x0 + i ][ y0+ j ] | ae(v) |
|                     num_edge_codes_minus1[ x0 + i ][ y0+ j ] | ae(v) |
|                     for( k = 0; k < = num_edge_codes_minus1; k++ )<br>                      edge_code[ k ] | ae(v) |
|                     edge_dc_flag[ x0 + i ][ y0+ j ] | ae(v) |
|                     if( edge_dc_flag[ x0 + i ][ y0+ j ] ) {<br>                      edge_dc_1_abs[ x0 + i ][ y0+ j ] | ae(v) |
|                       if( edge_dc_1_abs[ x0 + i ][ y0+ j ] != 0 )<br>                        edge_dc_1_sign_flag[ x0 + i ][ y0+ j ] | ae(v) |
|                       edge_dc_2_abs[ x0 + i ][ y0+ j ] | ae(v) |
|                       if( edge_dc_2_abs[ x0 + i ][ y0+ j ] != 0 )<br>                        edge_dc_2_sign_flag[ x0 + i ][ y0+ j ] | ae(v) |
|                     }<br>                  }<br>                }<br>              }<br>            }<br>          }<br>        }<br>        intra_chroma_pred_mode[ x0 ][ y0 ] | ae(v) |
|       }<br>  } else {<br>    if( PartMode == PART_2Nx2N )<br>      prediction_unit( x0, y0, nCbS, nCbS )<br>    else if( PartMode == PART_2NxN ) {<br>      prediction_unit( x0, y0, nCbS, nCbS / 2 )<br>      prediction_unit( x0, y0 + ( nCbS / 2 ), nCbS, nCbS / 2 )<br>    } else if( PartMode == PART_Nx2N ) {<br>      prediction_unit( x0, y0, nCbS / 2, nCbS )<br>      prediction_unit( x0 + ( nCbS / 2 ), y0, nCbS / 2, nCbS )<br>    } else if( PartMode == PART_2NxnU ) {<br>      prediction_unit( x0, y0, nCbS, nCbS / 4 )<br>      prediction_unit( x0, y0 + ( nCbS / 4 ), nCbS, nCbS *3 / 4 )<br>    } else if( PartMode == PART_2NxnD ) {<br>      prediction_unit( x0, y0, nCbS, nCbS *3 / 4 )<br>      prediction_unit( x0, y0 + ( nCbS * 3 / 4 ), nCbS, nCbS / 4 )<br>    } else if( PartMode == PART_nLx2N ) {<br>      prediction_unit( x0, y0, nCbS /4, nCbS )<br>      prediction_unit( x0 + ( nCbS / 4 ), y0, nCbS *3 / 4, nCbS)<br>    } else if( PartMode == PART_nRx2N ) {<br>      prediction_unit( x0, y0, nCbS *3 / 4, nCbS )<br>      prediction_unit( x0 + ( nCbS * 3 / 4 ), y0, nCbS / 4, nCbS ) | |

-continued

| G.7.3.9.1 General Coding unit syntax | |
|---|---|
| | Descriptor |
| ``````    } else { /* PART_NxN */`<br>      prediction_unit( x0, y0, nCbS / 2, nCbS / 2)<br>      prediction_unit( x0 + ( nCbS / 2 ), y0, nCbS / 2, nCbS / 2 )<br>      prediction_unit( x0, y0 + ( nCbS / 2 ), nCbS / 2, nCbS / 2 )<br>      prediction_unit( x0 + ( nCbS / 2 ), y0 + ( nCbS / 2 ), nCbS / 2, nCbS / 2 )<br>    }<br>  }<br>}<br>if( icEnableFlag )<br>  ic_flag | ae(v) |
| if( !pcm_flag ) {<br>  if( PredMode[ x0 ][ y0 ] != MODE_INTRA &&<br>    !(PartMode = = PART_2Nx2N && merge_flag[x0][y0]) )<br>    no_residual_syntax_flag | ae(v) |
|   if( !no_residual_syntax_flag && !sdc_flag) {<br>    MaxTrafoDepth = ( PredMode[ x0 ][ y0 ] = = MODE_INTRA ?<br>                  max_transform_hierarchy_depth_intra + IntraSplitFlag :<br>                  max_transform_hierarchy_depth_inter )<br>    transform_tree( x0, y0 x0, y0, log2CbSize, 0, 0 )<br>  }<br>  if( sdc_flag ) {<br>    sdcNumSegments = ( sdc_pred_mode = = 1 ? 2 : 1 )<br>    for ( i = 0; i < sdcNumSegments ; i++) {<br>      sdc_residual_flag[ x0 ][ y0 ][ i | |
| | ae(v) |
|       if( sdc_residual_flag[ x0 ][ y0 ][ i ]) {<br>        sdc_residual_sign_flag[ x0 ][ y0 ][ i ] | ae(v) |
|         sdc_residual_abs_minus1[ x0 ][ y0 ][ i ] | ae(v) |
|       }<br>    }<br>  }<br>}<br>} | |

In the Inter SDC mode, the concept of the SDC mode is further extended for depth inter coding. The Inter SDC mode was described in JCT3V-E1001 (Tech et al., "3D-HEVC Draft Text 1 (Output Document of JCT-3V)," Joint Collaborative Team on 3D Video Coding Extension Development (JCT-3V) of ITU-T SG 16 WP 3 and ISO/IEC JTC1/SC29/WG11, 5th Meeting: Vienna, AT, 27 Jul.-2 Aug. 2013). The working draft of 3D-HEVC (document number: JCT3V-E1001) is available from: http://phenix.int-evry.fr/jct3v/doc_end_user/documents5_Vienna/wg11/JCT3V-E1001-v3.zip.

The Inter SDC mode provides an additional residual coding method by encoding only one DC residual value for each PU that contains a single unique partition. With Inter SDC, transform and quantization are skipped for each PU, and the residual block has all its samples equal to the corresponding signaled DC residual value, which is similar to the sub-mode SDCM_DC of the SDC mode applied in intra coding. For a non-skip CU, a one-bit flag is further signaled to indicate whether Inter SDC is applied. For a skip CU, the same process as is done in current 3D-HEVC is maintained. If the Inter SDC mode is applied, only one DC residual value is signaled for each PU, otherwise, the traditional quantized transform coefficient block is signaled.

Residual coding for partitions in depth coding modes will now be described in more detail. In the depth coding modes, including the DMM, CCM, SDC mode, and Inter SDC mode, regardless of whether the PU contains one or two partitions, the residual (also referred to as the "delta DC") of the whole partition may be signaled with one single value. Such a method is called delta DC coding in this disclosure.

The syntax elements and semantics related to delta DC coding using the DMM are defined as follows.

| | Descriptor |
|---|---|
| depth_mode_parameters( x0 , y0 , log2CbSize ) {<br>...<br>  if( DmmFlag[ x0 ][ y0 ] ) {<br>    dmm_dc_flag[ x0 ][ y0 ] | ae(v) |
|     if ( dmm_dc_flag[ x0 ][ y0 ] )<br>      for( i = 0; i < 2; i ++ ) {<br>        dmm_dc_abs[ x0 ][ y0 ][ i ] | ae(v) |
|         if ( dmm_dc_abs[ x0 ][ y0 ][ i ])<br>          dmm_dc_sign_flag[ x0 ][ y0 ][ i ] | ae(v) |
|       }<br>  }<br>...<br>} | |

The syntax element dmm_dc_flag indicates whether residual values of depth data for the DMM are present. The dmm_dc_flag[x0][y0] equal to 1 specifies that dmm_dc_abs[x0][y0][i] and dmm_dc_sign_flag[x0][y0][i] are present. The dmm_dc_flag[x0][y0] equal to 0 specifies that dmm_dc_abs[x0][y0][i] and dmm_dc_sign_flag[x0][y0][i] are not present.

When the residual values are present, the syntax elements of dmm_dc_abs[x0][y0][i] and dmm_dc_sign_flag[x0][y0][i] indicate magnitude (i.e., absolute value) and sign, respectively, of the residual values of the depth data for the DMM. These syntax elements are used to derive DcOffset[x0][y0][i] as follows:

DcOffset[x0][y0][i]=(1−2*dmm_dc_sign_flag[x0][y0][i])*dmm_dc_abs[x0][y0][i].

The derivation of the delta DC value for each partition coded using the DMM is as follows. At the encoder, such as video encoder 20, for each partition i (i=0, 1), a predicted DC value, predDC[i], is derived using neighboring reference samples. The average value of original samples within partition i is calculated as origDC[i]. If a DLT is not applied, a residual value, deltaDC[i], is derived as origDC[i]−predDC[i]. Otherwise, the DLT is applied and deltaDC[i] is derived as DLT[origDC[i]]−DLT[predDC[i]]. In either case, deltaDC[i] can be further adjusted based on encoder optimization.

At the decoder, such as video decoder 30, for each partition i (i=0, 1), the residual value, deltaDC[i], is received and a predicted DC value, predDC[i], is derived using neighboring reference samples. If a DLT is not applied, the value of each prediction sample (i.e., reconstructed depth value) in partition i is derived as predDC[i]+deltaDC[i]. Otherwise, the DLT is applied and the value of each prediction sample in partition i is derived as IDLT[DLT[predDC[i]]+deltaDC[i]].

The syntax elements and semantics related to delta DC coding using the CCM are defined as follows.

|  | Descriptor |
| --- | --- |
| depth_mode_parameters( x0 , y0 , log2CbSize ) { | |
| ... | |
|   else if( DepthIntraMode[ x0 ][ y0 ] = = INTRA_DEP_CHAIN ) { | |
|     edge_dc_flag[ x0 ][ y0 ] | ae(v) |
|     if( edge_dc_flag[ x0 ][ y0 ] ) { | |
|       for( i = 0; i < 2; i++ ) { | |
|         edge_dc_abs[ x0 ][ y0 ][ i ] | ae(v) |
|         if( edge_dc_abs[ x0 ][ y0 ][ i ] != 0 ) | |
|           edge_dc_sign_flag[ x0 ][ y0 ][ i ] | ae(v) |
|       } | |
|     } | |
|   } | |
| ... | |
| } | |

The syntax element edge_dc_flag indicates whether residual values of depth data for the CCM are present. The edge_dc_flag[x0][y0] equal to 1 specifies that edge_dc_abs[x0][y0][i] and edge_dc_sign_flag[x0][y0][i] are present, and the edge_dc_flag[x0][y0] equal to 0 specifies that edge_dc_abs[x0][y0][i] and edge_dc_sign_flag[x0][y0][i] are not present.

When the residual values are present, the syntax elements of edge_dc_abs[x0][y0][i] and edge_dc_sign_flag[x0][y0][i] indicate magnitude (i.e., absolute value) and sign, respectively, of the residual values of the depth data for the CCM. These syntax elements are used to derive DcOffset[x0][y0][i] as follows:

DcOffset[*x0*][*y0*][*i*]=(1−2*edge_dc_sign_flag[*x0*][*y0*][*i*])*edge_dc_abs[*x0*][*y0*][*i*]

The derivation of the delta DC value for each partition coded using the CCM is as follows. In the CCM, a DLT is never applied and the delta DC is coded in a way that it is quantized at the encoder, such as video encoder 20, by a scaling factor scaleF, where scaleF is $$2^{\left(\frac{QP_Y}{10} - 2\right)}$$

clipped by a minimum value 1 and a maximum value $2^{(BitDepth_Y-1)}$, $QP_Y$ represents the quantization parameter applied for luma transform coefficient coding, and BitDepth$_Y$ indicates the bit depth applied for luma sample representation. Such a scaling factor is compensated back using dequantization at the decoder, such as video decoder 30. In this way, the value of delta DC signaled for the CCM can be much smaller.

At video encoder 20, for each partition i (i=0, 1), a predicted DC value, predDC[i], is derived using neighboring reference samples. The average value of original samples within partition i is calculated as origDC[i]. For each partition i, a quantized residual value, deltaDC[i], is derived as (origDC[i]−predDC[i])/scaleF, and deltaDC[i] can be further adjusted based on encoder optimization.

At the video decoder 30, for each partition i, a quantized residual value, deltaDC[i], is received and the residual value, deltaDC[i], is dequantized as deltaDC[i]=deltaDC[i]*scaleF. After that, for each partition i, a predicted DC value, predDC[i], is derived using neighboring reference samples. The value of each prediction sample (i.e., reconstructed depth value) within partition i is derived as the sum of deltaDC[i] and predDC[i]. In this document, the above quantization and dequantization process involved in the derivation of delta DC values in the CCM is referred to as advanced quantization and advanced dequantization.

The syntax elements and semantics related to residual coding using the SDC mode are defined as follows.

|  | Descriptor |
| --- | --- |
| Depth_mode_parameters( x0 , y0 , log2CbSize ) { | |
| ... | |
|   else if( SdcFlag[ x0 ][ y0 ] ) { | |
|     sdcNumSegments = | |
|     ( DepthIntraMode[ x0 ][ y0 ] = = INTRA_DEP_SDC_DMM_WFULL ) ? 2 : 1 | |
|     for( i = 0; i < sdcNumSegments; i++ ) { | |
|       sdc_residual_flag[ x0 ][ y0 ][ i ] | ae(v) |
|       if( sdc_residual_flag[ x0 ][ y0 ][ i ]) { | |
|         sdc_residual_sign_flag[ x0 ][ y0 ][ i ] | ae(v) |
|         sdc_residual_abs_minus1[ x0 ][ y0 ][ i ] | ae(v) |
|       } | |
|     } | |
|   } | |
| } | |

The syntax element sdc_residual_flag indicates whether residual values of depth data for the SDC mode are present. The sdc_residual_flag[x0][y0][i] equal to 0 specifies that the residual is zero for segment i. The sdc_residual_flag equal to 1 specifies that the residual is non-zero and the sdc_residual_sign_flag and sdc_residual_abs[i] syntax elements are present for segment i.

When the residual values are present, the syntax elements of sdc_residual_abs_minus1[x0][y0][i] and sdc_residual_sign_flag[x0][y0][i] indicate magnitude (i.e., absolute value) and sign, respectively, of the residual values of the depth data for the SDC mode. These syntax elements are used to derive SdcResidual[x0][y0][i] for segment i as follows:

SdcResidual[*x0*][*y0*][*i*]=(1−2*sdc_residual_sign_flag[*x0*][*y0*][*i*])*(sdc_residual_mag_minus1[*x0*][*y0*][*i*]+1)

The syntax elements and semantics related to residual coding using the Inter SDC mode are defined as follows.

|  | Descriptor |
| --- | --- |
| coding_unit( x0, y0, log2CbSize , ctDepth) { | |
| ... | |
|   if( DepthFlag && PredMode[ x0 ][ y0 ] != MODE_INTRA && !skip_flag[ x0 ][ y0 ] ) | |
|     inter_sdc_flag | ae(v) |

| | Descriptor |
|---|---|
| if( inter_sdc_flag ) {     puNum = ( PartMode = = PART_2Nx2N ) ? 1 : ( PartMode = = PART_NxN ? 4 : 2 )     for( i = 0; i < puNum; i++ ) {         inter_sdc_resi_abs_minus1[ x0 ][ y0 ][ i ]         inter_sdc_resi_sign_flag[ x0 ][ y0 ][ i ]     } } ... } | ae(v) ae(v) |

The syntax element inter_sdc_flag indicates whether residual values of depth data for the Inter SDC mode are present. The inter_sdc_flag equal to 1 specifies simplified depth coding of residual blocks is used for the current coding unit. The inter_sdc_flag equal to 0 specifies simplified depth coding of residual blocks is not used for the current coding unit. When not present, inter_sdc_flag is inferred to be equal to 0.

When the residual values are present, the syntax elements of inter_sdc_resi_abs_minus1[x0][y0][i] and inter_sdc_resi_sign_flag[x0][y0][i] indicate magnitude (i.e., absolute value) and sign, respectively, of the residual values of the depth data for the Inter SDC mode. These syntax elements are used to derive InterSdcResi[x0][y0][i] as follows:

InterSdcResi$[x0][y0][i]$=(1−2*inter_sdc_resi_sign_flag$[x0][y0][i]$)*(inter_sdc_resi_abs_minus1$[x0][y0][i]$+1)

The derivation of the delta DC value for each partition coded using the SDC mode and the Inter SDC mode is as follows. In both the SDC mode and the Inter SDC mode, the delta DC value for each partition is derived in a similar way as described above with respect to the DMM. At the encoder, such as video encoder 20, for each partition i (i=0, 1), a predicted DC value, predDC[i], is derived using neighboring reference samples. The average value of original samples within partition i is calculated as origDC[i]. If a DLT is not applied, a residual value, deltaDC[i], is derived as origDC[i]−predDC[i]. Otherwise, the DLT is applied and deltaDC[i] is derived as DLT[origDC[i]]−DLT[predDC[i]].

At the decoder, such as video decoder 30, for each partition i (i=0, 1), the residual value, deltaDC[i], is received and a predicted DC value, predDC[i], is derived using neighboring reference samples. If a DLT is not applied, the value of each prediction sample (i.e., reconstructed depth value) in partition i is derived as predDC[i]+deltaDC[i]. Otherwise, the DLT is applied and the value of each prediction sample (i.e., reconstructed depth value) in partition i is derived as IDLT[DLT[predDC[i]]+deltaDC[i]].

In HEVC and 3D-HEVC, for the luma component, the neighboring reference samples used for intra prediction sample, i.e., residual value, generation are filtered before the generation process at an encoder, such as video encoder 20, and before the depth value reconstruction process at a decoder, such as video decoder 30. The filtering is controlled by the given intra prediction mode and transform block size. For example, if the intra prediction mode is DC or the transform block size is equal to 4×4, neighboring samples are not filtered. As another example, if the distance between the given intra prediction mode and the vertical mode (or the horizontal mode) is larger than a predefined threshold, the filtering process is enabled. In some examples, the predefined threshold is 7, 1 and 0 for each of transform block sizes 8, 16 and 32, respectively.

For neighboring sample filtering, the [1, 2, 1] filter and bi-linear filter may be used. The bi-linear filtering is conditionally used if several conditions as defined in HEVC are true. In the conventional 3D-HEVC process, filtering of the neighboring reference samples is not applied for the DMM, but is applied for the CCM.

The conventional coding and signaling mechanisms of the depth coding modes in 3D-HEVC may create several issues at a decoder, such as video decoder 30. As one example, individual signaling of the usage of the different depth intra coding modes, (such as the DMM, the SDC mode, and the CCM) increases the decoder parsing burden. As another example, different syntax elements are introduced to code each of the depth intra coding modes. Additional context models are, therefore, required, which increases the memory complexity at the decoder. In a further example, the usage of the DMM is signaled in one loop traversing all PUs in one CU. In addition, several loops traversing all PUs in one CU are used to code additional information, which is not necessary but increases the parsing complexity at the decoder.

The techniques described in this disclosure relate to encoding and decoding of depth data for 3D video data using depth coding modes in the 3D-HEVC standard that are different from HEVC coding modes. Examples of the additional depth intra coding modes available in a 3D-HEVC include at least two of the DMM, the SDC mode and the CCM. In addition, an example of an additional depth inter coding mode includes an Inter SDC mode. The techniques, described in more detail below, may be performed by video encoder 20 (FIGS. 1 and 2) and/or video decoder 30 (FIGS. 1 and 3), both of which may be generally referred to as a video coder.

In a first example, the techniques of this disclosure include signaling the depth intra coding modes used to code depth maps for 3D video data in a depth modeling table. The depth modeling table signals the syntax for the additional depth intra coding modes separate from the syntax for the HEVC intra coding modes. In this way, the additional syntax for the depth intra coding modes is designed to have less interaction with the original in HEVC syntax for intra coding modes.

The techniques also include signaling a syntax element, such as a flag, to indicate whether any of the depth intra coding modes that are different from the HEVC intra modes are enabled for the 3D video data. Instead of having only the vps_dmm_flag in a video parameter set (VPS) of the video data to indicate whether a current depth layer uses the DMM, the techniques include signaling a single flag in one of the VPS, the SPS or the PPS of the video data to indicate whether any of the depth intra coding modes, including at least two of the DMM, the CCM, and the SDC mode, are enabled or all of the depth intra coding modes are disabled. In some examples, the single flag may indicate whether all of the depth intra coding modes are enabled. The techniques of this disclosure may reduce the parsing burden at video decoder 30 by signaling the depth intra coding modes in the depth modeling table separate from the HEVC intra coding modes, and indicating when the depth intra coding modes are enabled and the depth modeling table should be parsed.

When the depth intra coding modes are disabled, video decoder 30 does not decode the depth modeling table and selects one of the HEVC intra coding modes that is different from the depth intra coding modes, e.g., the HEVC intra coding mode or the HEVC I_PCM mode. When the depth intra coding modes are enabled, video decoder 30 receives and decodes the depth modeling table to select the one of the depth intra coding modes used to code the depth data. For example, the depth modeling table may include one or more syntax elements that indicate one of the sub-modes of the DMM, one of the sub-modes of the SDC mode, or the CCM for decoding the depth data. In some examples, the different syntax elements indicating the DMM sub-modes, the SDC sub-modes and the CCM may be grouped together so that the different modes are indicated by one syntax element.

Alternatively, sub-modes DMM_1 and DMM_3 of the DMM and the CCM may be treated as part of the HEVC intra coding modes. In this case, the depth modeling table may include syntax elements for at least one sub-mode of the DMM, e.g., DMM_2 and/or DMM_4, and the three sub-modes of the SDC mode, i.e., SDCM DM, SDCM_DMM_1, and SDCM_Planar. In the case where the CCM is defined as an HEVC intra coding mode, the techniques include signaling the residual information of the depth data for the CCM in a chain coding table that is separate from the depth modeling table.

In addition, instead of separately signaling the dmm_flag of all the PUs, the DMM sub-modes of all the PUs, and other DMM related information of all the PUs in several loops, the CU syntax table or the depth modeling table may be designed to include all the DMM information of one PU together, followed by the information for another PU, as so on. Therefore, only one loop that traverses all the PUs in a current CU is required.

In a second example, the techniques of this disclosure include unifying signaling of residual information of depth maps for 3D video data across two or more of the depth coding modes. A set of syntax elements is defined that indicates residual information of depth data, where the same set of syntax elements indicates residual information for any of the depth coding modes. The set of syntax elements indicates at least one residual value for each coding partition of the depth data for any of the depth coding modes.

The unified a set of syntax elements may include a syntax element that indicates whether residual values are coded for any of the depth coding modes, including at least two of the DMM, the CCM, the SDC mode, and the Inter SDC mode. The unified set of syntax elements may also include syntax elements that indicate an absolute value and a sign of residual values for any of the depth coding modes. In some cases, the unified set of syntax elements may be included in the depth modeling table, described above, to indicate the one of the depth intra coding modes used to code the depth data and to indicate the residual values of the depth data.

In the conventional 3D-HEVC process, the signaling of residual information for the DMM and the CCM is by syntax elements edge_dc_flag, edge_dc_1_abs, edge_dc_2_abs, dmm_dc_1_abs, dmm_dc_2_abs, edge_dc_1_sign_flag, edge_dc_2_sign_flag, dmm_dc_1_sign_flag and dmm_dc_2_sign_flag. In one example, according to the techniques described in this disclosure, the residual information syntax elements for the DMM and the CCM may be unified to reduce the parsing burden at video decoder 30 and a number of context models required for the residual information syntax elements.

In another example, the techniques unify the residual information signaling for the DMM, the CCM, and the SDC mode. In a further example, the signaling of residual information for Inter SDC modes may also be unified with the signaling of residual information for the DMM, the CCM, and the SDC modes. In general, for all the depth coding modes, when the residual is signaled for each of the two partitions of the PU or just the unique partition of the PU, the signaling mechanism may be unified in a way that the depth coding modes are sharing the same set of syntax elements.

By sharing the same set of syntax elements to indicate residual information for two or more of the depth coding modes, context model selection and binarization methods for the syntax elements may also be unified. For example, only one context model may be required for each of the syntax elements that are shared across two or more of the depth coding modes. In this way, the same set of context models, e.g., one for each of the shared syntax elements, may be applied to any of the depth coding modes. In addition, a single context model selection method may be used for any of the depth coding modes.

According to the techniques, the context model selection may be based on a number of partitions of a current depth block. For the syntax element that signals whether residual values are coded for the Inter SDC mode, the context model selection may depend on the number of partitions applied for a current CU. On the other hand, for the same syntax element that signals whether residual values are coded for the DMM, the CCM, or the SDC mode, the context model selection may depend on the number of partitions applied for a current PU.

In the conventional 3D-HEVC process, the binarization of the syntax elements that signal the absolute values of residual values for the DMM, the CCM, and the SDC mode are currently represented by syntax elements edge_dc_abs, dmm_dc_abs, and sdc_residual_abs_minus1, respectively. The techniques of this disclosure include unifying these syntax elements by using the same binarization method to reduce the parsing complexity at video decoder 30. The unified binarization method of these syntax elements may be the same as any of the binarization methods conventionally used for the syntax elements in the SDC mode, i.e., sdc_residual_abs_minus1, or the DMM, i.e., dmm_dc_abs.

The binarization of the syntax elements that signal the absolute values of the residual values for the Inter SDC mode may also be unified to be the same as the binarization method of for the SDC mode or the DMM. In general, for all depth coding modes that partition a depth CU (or a depth PU) into several segments and only one residual value is signaled for each segment, the binarization of the syntax elements that signal the absolute value and the sign of the residual values may be unified to reduce the parsing complexity at video decoder 30. The techniques of this disclosure may reduce the decoder parsing burden and reduce a number of required context models and binarization methods by unifying the residual information coding mechanisms for the depth coding modes.

In addition, for the depth intra modes, neighboring reference samples may not be filtered during generation of the intra prediction samples referred to as residual values, or during reconstruction of depth values based on the residual values. For example, according to the techniques of this disclosure, filtering of neighboring reference samples during the intra prediction sample generation may be disabled and not applied in the DMM, the CCM, and the sub-mode SDCM_DMM_1 of the SDC mode.

As described above, in the conventional 3D-HEVC process, the filtering of neighboring reference samples is already disabled for DC intra prediction modes, including the sub-mode SDCM_DC of the SDC mode. In another example, the filtering of neighboring reference samples during the intra prediction sample generation may further be disabled for the sub-mode SDCM_Planar of the SDC mode. In this way, video decoder 30 may decode the depth data to reconstruct depth values of the video data according to any of the depth coding modes based on the received residual information and the neighboring reference samples without filtering the neighboring reference samples. Similarly, video encoder 20 may generate residual values of the depth data according to any of the depth coding modes based on the original depth values of the video data and the neighboring reference samples without filtering the neighboring reference samples.

As an alternative, for the DMM, CCM, and the sub-modes SDCM_DMM_1 and SDCM_Planar of the SDC mode, filtering of neighboring reference samples during the intra prediction sample generation may always be applied. In this case, the filtering methods may be dependent on the applied depth coding mode.

Furthermore, the techniques include unifying a process used to reconstruct depth values based on one single transmitted residual value for a partition for any of the DMM, the SDC mode, the Inter SDC mode, and the CMM using a depth look-up table (DLT). For any of the depth coding modes, at video decoder 30, the DLT may be used to convert prediction value indexes to prediction values, i.e., reconstructed depth values, of the partition, where the prediction value index is the sum of the transmitted residual value and a predicted DC value index. When generating the residual information based on one single transmitted residual value for the partition and the prediction values according to the CCM, the advanced quantization at video encoder 20 and the advanced dequantization at video decoder 30 of the single residual value may be removed. By removing the advanced quantization from the CCM, the decoding process may be unified with the DMM and the SDC mode to use the DLT.

In this way, video decoder 30 reconstructs depth values within a coding partition using the DLT to look up values with an index value equal to the sum of a single residual value received for the coding partition and a DLT index value identifying a predicted value derived from the neighboring reference samples. Video decoder 30 does not perform advanced dequantization of the received single residual value. Similarly, video encoder 20 generates the single residual value for a coding partition using the DLT where the single residual value for the coding partition is equal to the difference of a first DLT index value identifying an average value of the original depth values within the coding partition and a second DLT index value identifying a predicted value derived from the neighboring reference samples. Video encoder 20 does not perform advanced quantization of the generated single residual value.

Several detailed implementation examples of depth coding modes signaling of depth data of 3D video data in 3D-HEVC are described below.

In a first example of the techniques of this disclosure, video encoder 20 encodes a flag indicating that depth intra coding modes are enabled, and encodes a depth modeling table including one or more syntax elements that indicate a selected one of the depth intra coding modes used to encode depth data. When the depth intra coding modes are enabled, as indicated by the signaled flag, video decoder 30 receives and decodes the depth modeling table to select the depth intra coding mode to decode the depth data.

In this example, instead of using multiple syntax elements in the depth coding mode to indicate the usage of the SDC mode, the DMM, or the HEVC Intra coding mode (including the CCM), one syntax element indicates enablement of the depth intra coding modes, including at least two of the DMM, the SDC mode and the CCM. The one or more syntax elements that indicate a selected one of depth intra coding modes are included in the depth modeling table separate from the HEVC syntax, and some conditions may be removed from the HEVC syntax for the CU.

In a first alternative of the first example technique of signaling the depth modeling table, one syntax element, depth_intra mode, is added to indicate the intra coding modes of depth views in the CU syntax table and the depth modeling table, and the CCM is signaled as one additional depth intra coding mode instead of being part of the HEVC intra prediction modes. In other examples, more than one syntax element may indicate the depth intra coding modes in the CU syntax table and the depth modeling table. Additions to the 3D-HEVC standard are italicized below, and deletions from the 3D-HEVC standard are indicated using the preceding term "REMOVED:" followed by the deleted text.

| G.7.3.9.1 General Coding unit syntax | |
|---|---|
| | Descriptor |
| coding_unit( x0, y0, log2CbSize , ctDepth) { | |
|   if( transquant_bypass_enable_flag ) { | |
|     cu_transquant_bypass_flag | ae(v) |
|   } | |
|   if( slice_type != I ) | |
|     skip_flag[ x0 ][ y0 ] | ae(v) |
|   if( skip_flag[ x0 ][ y0 ] ) | |
|     prediction_unit( x0, y0, log2CbSize ) | |
|     if ( icEnableFlag ) | |
|       ic_flag | ae(v) |
|   else { | |
|     nCbS = ( 1 << log2CbSize ) | |
|     if( slice_type != I ) | |
|       pred_mode_flag | ae(v) |
| REMOVED:   if( PredMode = = MODE_INTRA && DepthFlag ) | |
| REMOVED:     sdc_flag[ x0 ][ y0 ] | ae(v) |
| REMOVED:     if( sdc_flag[ x0 ][ y0 ] ) { | |
| REMOVED:       sdc_pred_mode | ae(v) |
| REMOVED:       if( sdc_pred_mode = = 1 ) | |
| REMOVED:         wedge_full_tab_idx[ x0 ][ y0 ] | ae(v) |
| REMOVED:     } else { | |
|     if( ( PredMode[ x0 ][ y0 ] ! = MODE_INTRA | | log2CbSize = = Log2MinCbSize ) && !predPartModeFlag) | |
|       part_mode | ae(v) |

-continued

| | G.7.3.9.1 General Coding unit syntax | |
|---|---|---|
| | | Descriptor |
| | if( PredMode[ x0 ][ y0 ] = = MODE_INTRA ) { | |
| |   if( PartMode = = PART_2Nx2N && pcm_enabled_flag && | |
| |     log2CbSize >= Log2MinIPCMCUSize && | |
| |     log2CbSize <= Log2MaxIPCMCUSize ) | |
| |     pcm_flag | ae(v) |
| |   if( pcm_flag ) { | |
| |     num_subsequent_pcm | tu(3) |
| |     NumPCMBlock = num_subsequent_pcm + 1 | |
| |     while( !byte_aligned( ) ) | |
| |       pcm_alignment_zero_bit | f(1) |
| |     pcm_sample( x0, y0, log2CbSize ) | |
| |   } else { | |
| |     pbOffset = ( PartMode = = PART_NxN ) ? ( nCbS / 2 ) : 0 | |
| REMOVED: |     if ( vps_dmm_flag[ nuh_layer_id ] && log2CbSize <= Log2MaxDmmCbSize ) { | |
| REMOVED: |       log2PbSize = log2CbSize − ( PartMode = = PART_NxN ? 1 : 0 ) | |
| REMOVED: |       for( j = 0; j <= pbOffset; j = j + pbOffset ) | |
| REMOVED: |         for( i = 0; i <= pbOffset; i = i + pbOffset ) | |
| REMOVED: |           dmm_flag[ x0 + i ][ y0+ j ] | ae(v) |
| REMOVED: |       for( j = 0; j <= pbOffset; j = j + pbOffset ) | |
| REMOVED: |         for( i = 0; i <= pbOffset; i = i + pbOffset ) | |
| REMOVED: |           if (dmm_flag[ x0 + i ][ y0+ j ] ) | |
| REMOVED: |             dmm_mode[ x0 + i ][ y0+ j ] | ae(v) |
| REMOVED: |       for( j = 0; j <= pbOffset; j = j + pbOffset ) | |
| REMOVED: |         for( i = 0; i <= pbOffset; i = i + pbOffset ) | |
| REMOVED: |           if ( dmm_flag[ x0 + i ][ y0+ j ] && ( dmm_mode[ x0 + i ][ y0+ j ] = = MODE_DMM_WFULL \|\| dmm_mode[ x0 + i ][ y0+ j ] = = MODE_DMM_WFULLDELTA ) ) | |
| REMOVED: |             wedge_full_tab_idx[ x0 + i ][ y0 + i ] | ae(v) |
| REMOVED: |       for( j = 0; j <= pbOffset; j = j + pbOffset ) | |
| REMOVED: |         for( i = 0; i <= pbOffset; i = i + pbOffset ) | |
| REMOVED: |           if ( dmm_flag[ x0 + i ][ y0+ j ] && ( dmm_mode[ x0 + i ][ y0+ j ] = = MODE_DMM_WPREDDIR \|\| dmm_mode[ x0 + i ][ y0+ j ] = = MODE_DMM_WPREDDIRDELTA ) ) | |
| REMOVED: |             wedge_predtex_tab_idx[ x0 + i ][ y0 + i ] | ae(v) |
| REMOVED: |       for( j = 0; j <= pbOffset; j = j + pbOffset ) | |
| REMOVED: |         for( i = 0; i <= pbOffset; i = i + pbOffset ) | |
| REMOVED: |           if( dmm_flag[ x0 + i ][ y0+ j ] && ( dmm_mode[ x0 + i ][ y0+ j ] = = MODE_DMM_WPREDDIR \|\| dmm_mode[ x0 + i ][ y0+ j ] = = MODE_DMM_WPREDDIRDELTA ) ) | |
| REMOVED: |             dmm_delta_end_flag[ x0 + i ][ y0 + i ] | ae(v) |
| REMOVED: |       for( j = 0; j <= pbOffset; j = j + pbOffset ) | |
| REMOVED: |         for( i = 0; i <= pbOffset; i = i + pbOffset ) | |
| REMOVED: |           if ( dmm_delta_end_flag[ x0 + i ][ y0 + i ] ) | |
| REMOVED: |             dmm_delta_end_abs_minus1[ x0 + i ][ y0 + i ] | ae(v) |
| REMOVED: |       for( j = 0; j <= pbOffset; j = j + pbOffset ) | |
| REMOVED: |         for( i = 0; i <= pbOffset; i = i + pbOffset ) | |
| REMOVED: |           if ( dmm_delta_end_flag[ x0 + i ][ y0 + i ] ) | |
| REMOVED: |             dmm_delta_end_sign_flag[ x0 ][ y0 ] | ae(v) |
| REMOVED: |       for( j = 0; j <= pbOffset; j = j + pbOffset ) | |
| REMOVED: |         for( i = 0; i <= pbOffset; i = i + pbOffset ) | |
| REMOVED: |           DmmDeltaFlag[ x0 + i ][ y0 + i ] = ( dmm_flag[ x0 + i ][ y0+ j ] && ( dmm_mode[ x0 + i ][ y0 + i ] = = MODE_DMM_WFULLDELTA \|\| dmm_mode[ x0 + i ][ y0 + i ] = = MODE_DMM_WPREDDIRDELTA \|\| dmm_mode[ x0 + i ][ y0 + i ] = = MODE_DMM_WPREDTEXDELTA \|\| dmm_mode[ x0 + i ][ y0 + i ] = = MODE_DMM_CPREDTEXDELTA ) ) | |
| REMOVED: |       for( j = 0; j <= pbOffset; j = j + pbOffset ) | |
| REMOVED: |         for( i = 0; i <= pbOffset; i = i + pbOffset ) | |
| REMOVED: |           if ( DmmDeltaFlag[ x0 + i ][ y0 + i ] ) | |
| REMOVED: |             dmm_dc_1_abs[ x0 + i ][ y0 + i ] | ae(v) |

G.7.3.9.1 General Coding unit syntax

|  |  | Descriptor |
|---|---|---|
| REMOVED: | for( j = 0; j <= pbOffset; j = j + pbOffset ) |  |
| REMOVED: | for( i = 0; i <= pbOffset; i = i + pbOffset ) |  |
| REMOVED: | if ( DmmDeltaFlag[ x0 + i ][ y0+ j ] && |  |
|  | dmm_dc_1_abs[ x0 + i ][ y0 + i ] != 0 ) |  |
| REMOVED: | dmm_dc_1_sign_flag[ x0 + i ][ y0 + i ] | ae(v) |
| REMOVED: | for( j = 0; j <= pbOffset; j = j + pbOffset ) |  |
| REMOVED: | for( i = 0; i <= pbOffset; i = i + pbOffset ) |  |
| REMOVED: | if ( DmmDeltaFlag[ x0 + i ][ y0+ j ] ) |  |
| REMOVED: | dmm_dc_2_abs[ x0 + i ][ y0 + i ] | ae(v) |
| REMOVED: | for( j = 0; j <= pbOffset; j = j + pbOffset ) |  |
| REMOVED: | for( i = 0; i <= pbOffset i = i + pbOffset ) |  |
| REMOVED: | if ( DmmDeltaFlag[ x0 + i ][ y0+ j ] && |  |
|  | dmm_dc_2_abs[ x0 + i ][ y0 + i ] != 0 ) |  |
| REMOVED: | dmm_dc_2_sign_flag[ x0 + i ][ y0 + i ] | ae(v) |
| REMOVED: | } else { |  |
|  | for( j = 0; j <= pbOffset; j = j + pbOffset ) |  |
|  | for( i = 0; i <= pbOffset; i = i + pbOffset ) { |  |
|  | if( *DepthModesFlag* [REMOVED: "!dmm_flag[ x0 + i ][ y0+ j ]"] ) |  |
|  | *depth_modeling_table( x0 + i, y0 + j )* |  |
|  | *if(depth_intra_mode[ x0 + i ][ y0 + j ] == HEVC_INTRA_PRED)* |  |
|  | prev_intra_luma_pred_flag[ x0 + i ][ y0+ j ] | ae(v) |
|  | } |  |
|  | for( j = 0; j <= pbOffset; j = j + pbOffset ) |  |
|  | for( i = 0; i <= pbOffset; i = i + pbOffset ) { |  |
|  | *if(depth_intra_mode[ x0 + i ][ y0 + j ]==HEVC_INTRA_PRED* [REMOVED: "!dmm_flag[ x0 + i ][ y0+ j ]"] ) { |  |
|  | if( prev_intra_luma_pred_flag[ x0 + i ][ y0+ j ] ) |  |
|  | mpm_idx[ x0 + i ][ y0+ j ] | ae(v) |
|  | else~~{~~ |  |
|  | rem_intra_luma_pred_mode[ x0 + i ][ y0+ j ] | ae(v) |
| REMOVED: | if( rem_intra_luma_pred_mode[ x0 + i ][ y0+ j ] = = 31 && |  |
|  | ( log2CbSize + ( PartMode = = PART_NxN ) ? − 1 : 0 ) <= 5 && |  |
|  | ( log2CbSize + ( PartMode = = PART_NxN ) ? − 1 : 0 ) >= 2 ) { |  |
| REMOVED: | edge_intra_flag[ x0 + i ][ y0 + j ] | ae(v) |
| REMOVED: | if( edge_intra_flag[ x0 + i ][ y0+ j ] ) { |  |
| REMOVED: | edge_start_left_flag[ x0 + i ][ y0+ j ] | ae(v) |
| REMOVED: | edge_start_position[ x0 + i ][ y0+ j ] | ae(v) |
| REMOVED: | num_edge_codes_minus1[ x0 + i ][ y0+ j ] | ae(v) |
| REMOVED: | for( k = 0; k <= num_edge_codes_minus1; k++ ) |  |
| REMOVED: | edge_code[ k ] | ae(v) |
| REMOVED: | edge_dc_flag[ x0 + i ][ y0+ j ] | ae(v) |
| REMOVED: | if( edge_dc_flag[ x0 + i ][ y0+ j ] ) { |  |
| REMOVED: | edge_dc_1_abs[ x0 + i ][ y0+ j ] | ae(v) |
| REMOVED: | if( edge_dc_1_abs[ x0 + i ][ y0+ j ] != 0 ) |  |
| REMOVED: | edge_dc_1_sign_flag[ x0 + i ][ y0+ j ] | ae(v) |
| REMOVED: | edge_dc_2_abs[ x0 + i ][ y0+ j ] | ae(v) |
| REMOVED: | if( edge_dc_2_abs[ x0 + i ][ y0+ j ] != 0 ) |  |
| REMOVED: | edge_dc_2_sign_flag[ x0 + i ][ y0+ j ] | ae(v) |
| REMOVED: | } |  |
| REMOVED: | } |  |
| REMOVED: | } |  |
| REMOVED: | } |  |
| REMOVED: | } |  |
|  | } |  |
|  | } |  |
|  | intra_chroma_pred_mode[ x0 ][ y0 ] | ae(v) |
|  | } |  |
|  | } else { |  |
|  | if( PartMode = = PART_2Nx2N ) |  |
|  | ... |  |
|  | } else { /* PART_NxN */ |  |
|  | prediction_unit( x0, y0, nCbS / 2, nCbS / 2) |  |
|  | prediction_unit( x0 + ( nCbS / 2 ), y0, nCbS / 2, nCbS / 2 ) |  |
|  | prediction_unit( x0, y0 + ( nCbS / 2 ), nCbS / 2, nCbS / 2 ) |  |
|  | prediction_unit( x0 + ( nCbS / 2 ), y0 + ( nCbS / 2 ), nCbS / 2, nCbS / 2 ) |  |
|  | } |  |
|  | } |  |
|  | ~~}~~ |  |
|  | if ( icEnableFlag ) |  |
|  | ic_flag | ae(v) |

-continued

| G.7.3.9.1 General Coding unit syntax | |
|---|---|
| | Descriptor |
|         if( !pcm_flag ) { | |
|           if( PredMode[ x0 ][ y0 ] != MODE_INTRA && | |
|             !(PartMode = = PART_2Nx2N && merge_flag[x0][y0]) ) | |
|             no_residual_syntax_flag | ae(v) |
|           if( !no_residual_syntax_flag [REMOVED: "!sdc flag"]) { | |
|             MaxTrafoDepth = (PredMode[ x0 ][ y0 ] = = MODE_INTRA ? | |
|     max_transform_hierarchy_depth_intra + IntraSplitFlag : | |
|     max_transform_hierarchy_depth_inter ) | |
|             transform_tree( x0, y0 x0, y0, log2CbSize, 0, 0 ) | |
|           } | |
| REMOVED:       if( sdc_flag ) { | |
| REMOVED:         sdcNumSegments = ( sdc_pred mode = = 1 ) ? 2 : 1 | |
| REMOVED:         for ( i = 0; i < sdcNumSegments ; i++) { | |
| REMOVED:           sdc_residual_flag[ x0 ][ y0 ][ i ] | ae(v) |
| REMOVED:           if( sdc_residual_flag[ x0 ][ y0 ][ i ]) { | |
| REMOVED:             sdc_residual_sign_flag[ x0 ][ y0 ][ i ] | ae(v) |
| REMOVED:             sdc_residual_abs_minus1[ x0 ][ y0 ][ i ] | ae(v) |
| REMOVED:           } | |
| REMOVED:         } | |
| REMOVED:       } | |
|         } | |
|       } | |
|     } | |

The newly introduced syntax "depth_modeling_table" may be defined as follows.

| H.xxxx depth modeling table syntax | |
|---|---|
| | Descriptor |
| depth_modeling_table( x0 , y0 ) { | |
|   depth_intra_mode[ x0 ][ y0 ] | ae(v) |
|   dmmFlag[ x0 ][ y0 ] = (depth_intra_mode[ x0 ][ y0 ] = = MODE_DMM_WFULL || | |
|     depth_intra_mode[ x0 ][ y0 ] = = MODE_DMM_WPREDDIR || | |
|     depth_intra_mode[ x0 ][ y0 ] = = MODE_DMM_WPREDTEX || | |
|     depth_intra_mode[ x0 ][ y0 ] = = MODE_DMM_CPREDTEX ) | |
|   sdcFlag[ x0 ][ y0 ] = (depth_intra_mode[ x0 ][ y0 ] = = SDCM_DMM_1 || | |
|     depth_intra_mode[ x0 ][ y0 ] = = SDCM DC || | |
|     depth_intra_mode[ x0 ][ y0 ] = = SDCM_Planar) | |
|   if (depth_intra_mode[ x0 ][ y0 ] = = MODE_DMM_WFULL || | |
|     depth_intra_mode[ x0 ][ y0 ] = = SDCM_DMM_1) | |
|     wedge_full_tab_idx[ x0 ][ y0 ] | ae(v) |
|   else if(depth_intra_mode[ x0 ][ y0 ] = = MODE_DMM_WPREDTEX) | |
|     wedge_predtex_tab_idx[ x0 ][ y0 ] | ae(v) |
|   else if (depth_intra_mode[ x0 ][ y0 ] = = MODE_DMM_WPREDDIR) { | |
|     dmm_delta_end_flag[ x0 ][ y0 ] | ae(v) |
|     if ( dmm_delta_end_flag[ x0 ][ y0 ] ) { | |
|       dmm_delta_end_abs_minus1[ x0 ][ y0 ] | ae(v) |
|       dmm_delta_end_sign_flag[ x0 ][ y0 ] | ae(v) |
|     } | |
|   } else if (depth_intra_mode[ x0 ][ y0 ] = = CCM ) { | |
|     edge_start_left_flag[ x0 ][ y0 ] | ae(v) |
|     edge_start_position[ x0 ][ y0 ] | ae(v) |
|     num_edge_codes_minus1[ x0 ][ y0 ] | ae(v) |
|     for( k = 0; k <= num_edge_codes_minus1; k++ ) | |
|       edge_code[ k ] | ae(v) |
|   } | |
|   if(dmmFlag[ x0 ][ y0 ]) { | |
|     dmm_delta_flag[ x0 ][ y0 ] | ae(v) |
|     if ( dmm_delta_flag [ x0 ][ y0 ] ) | |
|       for( i = 0; i < 2; i ++ ) { | |
|         dmm_dc_abs[ x0 ][ y0 ][ i ] | ae(v) |
|         if ( dmm_dc_abs[ x0 ][ y0 ][ i ]) | |
|           dmm_dc_sign_flag[ x0 ][ y0 ][ i ] | ae(v) |
|       } | |
|   } | |
|   else if ( depth_intra_mode[ x0 ][ y0 ] = = CCM ) { | |
|     edge_dc_flag[ x0 ][ y0 ] | ae(v) |

| H.xxxx depth modeling table syntax | |
|---|---|
| | Descriptor |
| ```
if( edge_dc_flag[ x0 ][ y0 ] ) {
    for( i = 0; i < 2; i++ ) {
        edge_dc_abs[ x0 ][ y0 ][ i ]
        if( edge_dc_abs[ x0 ][ y0 ][ i ] != 0 )
            edge_dc_sign_flag[ x0 ][ y0 ][ i ]
    }
  }
}
else if( sdcFlag[ x0 ][ y0 ] ) {
    sdcNumSegments = depth_intra_mode[ x0 ][ y0 ] = = SDCM_DMM_1 ? 2 : 1
    for ( i = 0; i < sdcNumSegments ; i++ ) {
        sdc_residual_flag[ x0 ][ y0 ][ i ]
        if( sdc_residual_flag [ x0 ][ y0 ][ i ] ) {
            sdc_residual_sign_flag[ x0 ][ y0 ][ i ]
            sdc_residual_abs_minus1[ x0 ][ y0 ][ i ]
        }
    }
  }
}
``` | ae(v)<br><br>ae(v)<br><br><br><br><br><br>ae(v)<br><br>ae(v)<br>ae(v) |

Semantics for the CU syntax table and the depth modeling table are defined as follows.

The DepthModesFlag may be set equal to a syntax element depth_modes_flag signaled for each depth layer in the VPS. The depth_modes_flag[i] equal to 1 indicates that the DMM, CCM, and SDC mode are enabled for the depth layer with layer_id equal to i. The depth_modes_flag[i] equal to 0 indicates that the DMM, CCM, and SDC mode are disabled for the depth layer with layer_id equal to i.

The no_residual_syntax_flag (rqt_root_cbf in the HEVC specification) equal to 1 specifies that the transform_tree( ) syntax is present for the current coding unit. The rqt_root_cbf equal to 0 specifies that the transform_tree( ) syntax is not present for the current coding unit. When rqt_root_cbf is not present and sdcFlag[x0][y0] is equal to 0, its value is inferred to be equal to 1. When rqt_root_cbf is not present and sdcFlag[x0][y0] equal to 1, its value is inferred to be equal to 0.

Alternatively, the semantics of the no_residual_syntax_flag and the signaling of the residual information (including sdc_residual_flag, sdc_residual_sign_flag and sdc_residual_abs_minus1) for the SDC mode is kept unchanged. In this case, the last portion of the syntax (starting with "else if(sdcFlag[x0][y0]){" and ending with "}" in the second to last line of the table) of the depth modeling table presented above may be removed.

The intra_chroma_pred_mode[x0][y0] specifies the intra prediction mode for chroma samples. The array indices x0, y0 specify the location (x0, y0) of the top-left luma sample of the considered prediction block relative to the top-left luma sample of the picture. When the current view component is a depth view component, this syntax is not present. Alternatively, when the SDC mode is applied for the current coding unit, this syntax is not present.

The depth_intra_mode[x0][y0] may be one of the values shown in Table 1 below. Additions to the 3D-HEVC standard are italicized below, and deletions from the 3D-HEVC standard are indicated using the preceding term "REMOVED:" followed by the deleted text.

TABLE 1

Interpretation of depth_intra_mode

| | | Bin string | | | | |
|---|---|---|---|---|---|---|
| | | (cLog2CbSize == 3 && partition size == SIZE_2Nx2N) \|\| (cLog2CbSize > 3 && cLog2CbSize < 6) | | cLog2CbSize == 3 && partition size == SIZE_NxN | | cLog2CbSize == |
| depth_intra_mode | DepthIntraMode | Prefix | Subfix | Prefix | Subfix | 6 |
| 0 | SDCM_Planar | 0 | 0 | — | | 0 |
| 1 | HEVC intra (HEVC_INTRA_PRED) | 0 | 1 0 | 0 | | 1 0 |
| 2 | SDCM_DMM_1 | 0 | 1 1 | — | | — |
| 3 | DMM_1 (MODE_DMM_WFULL) | 1 | 0 0 | 1 | 0 | — |
| 4 | DMM_4 (MODE_DMM_CPREDTEX) | 1 | 0 1 | — | | — |
| 5 | DMM_3 (MODE_DMM_WFULL) | 1 | 1 0 | 1 | 1 *0* | — |
| 6 | SDCM_DC | 1 | 1 1 0 | | | 1 1 |
| 7 | DMM_2 (MODE_DMM_WPREDDIR) | 1 | 1 1 1 *1* | | | |
| 8 | CCM | *1* | *1 1 1 0* | 1 | 1 1 | |
| *Context index offset* | | *3* | *4 5 6 6* | *0* | *1 2* | *6 7* |

In some alternatives, other bin strings to present DepthIntraMode may be applied. In addition, the prev_intra_luma_pred_flag is present when the current modes are of the DMM, e.g., when depth_intra_mode is equal to SDCM_DMM_1 and DMM_1. Alternatively, in Table 1, the sub-mode DMM_2 may be removed. Moreover, in Table 1, any other order of depth intra coding modes may apply.

As a further alternative, the sub-mode DMM_2 may be replaced by the CCM and the above Table 1 may be redefined as in Table 2 below.

TABLE 2

Interpretation of depth_intra_mode

|  |  | Bin string | | | | |
| --- | --- | --- | --- | --- | --- | --- |
|  |  | (cLog2CbSize == 3 && partition size == SIZE_2Nx2N) ‖ (cLog2CbSize > 3 && cLog2CbSize < 6) | | cLog2CbSize == 3 && partition size == SIZE_NxN | | cLog2CbSize == |
| depth_intra_mode | DepthIntraMode | Prefix | Subfix | Prefix | Subfix | 6 |
| 0 | SDCM_Planar | 0 | 0 | — | | 0 |
| 1 | HEVC intra (HEVC_INTRA_PRED) | 0 | 1 0 | 0 | | 1 0 |
| 2 | SDCM_DMM_1 | 0 | 1 1 | — | | — |
| 3 | DMM_1 (MODE_DMM_WFULL) | 1 | 0 0 | 1 | 0 | — |
| 4 | DMM_4 (MODE_DMM_CPREDTEX) | 1 | 0 1 | | | — |
| 5 | DMM_3 (MODE_DMM_WFULL) | 1 | 1 0 | 1 | 1 0 | — |
| 6 | SDCM_DC | 1 | 1 1 0 | | | 1 1 |
| 7 | *CCM* | 1 | 1 1 1 | | *1 1* | |

In the case where the sub-mode DMM_2 is replaced with the CCM, as shown in Table 2 above, the syntax of the depth modeling table may be modified by removing the lines as shown. Deletions from the depth modeling table presented above are indicated using the preceding term "REMOVED:" followed by the deleted text.

| H.xxxx depth modeling table syntax | |
| --- | --- |
|  | Descriptor |
| depth_modeling_table( x0 , y0 ) { |  |
|   depth_intra_mode[ x0 ][ y0 ] | ae(v) |
|   dmmFlag[ x0 ][ y0 ] = (depth_intra_mode[ x0 ][ y0 ] = = MODE_DMM_WFULL ‖ |  |
|     [REMOVED: "depth_intra_mode[ x0 ][ y0 ] = = MODE_DMM_WPREDDIR ‖"] |  |
|     depth_intra_mode[ x0 ][ y0 ] = = MODE_DMM_WPREDTEX ‖ |  |
|     depth_intra_mode[ x0 ][ y0 ] = = MODE_DMM_CPREDTEX ) |  |
|   sdcFlag[ x0 ][ y0 ] = (depth_intra_mode[ x0 ][ y0 ] = = SDCM_DMM_1 ‖ |  |
|     depth_intra_mode[ x0 ][ y0 ] = = SDCM_DC ‖ |  |
|     depth_intra_mode[ x0 ][ y0 ] = = SDCM_Planar) |  |
|   if (depth_intra_mode[ x0 ][ y0 ] = = MODE_DMM_WFULL) |  |
|     wedge_full_tab_idx[ x0 ][ y0 ] | ae(v) |
|   else if(depth_intra_mode[ x0 ][ y0 ] = = MODE_DMM_WPREDTEX) |  |
|     wedge_predtex_tab_idx[ x0 ][ y0 ] | ae(v) |
| REMOVED:   else if (depth_intra_mode[ x0 ][ y0 ] = = MODE_DMM_WPREDDIR) { |  |
| REMOVED:     dmm_delta_end_flag[ x0 ][ y0 ] | ae(v) |
| REMOVED:     if ( dmm_delta_end_flag[ x0 ][ y0 ] ) { |  |
| REMOVED:       dmm_delta_end_abs_minus1[ x0 ][ y0 ] | ae(v) |
| REMOVED:       dmm_delta_end_sign_flag[ x0 ][ y0 ] | ae(v) |
| REMOVED:     } |  |
| REMOVED:   } |  |
|   else if (depth_intra_mode[ x0 ][ y0 ] = = CCM ) { |  |
|     edge_start_left_flag[ x0 ][ y0 ] | ae(v) |
|     edge_start_position[ x0 ][ y0 ] | ae(v) |
|     num_edge_codes_minus1[ x0 ][ y0 ] | ae(v) |
|     for( k = 0; k <= num_edge_codes_minus1; k++ ) |  |
|       edge_code[ k ] | ae(v) |
|   } |  |
|   ... |  |
| } |  |

Semantics for the modified depth modeling table presented above are defined as follows.

The dmm_delta_flag[x0][y0] equal to 0 specifies that DC Offset values are unavailable and the dmm_delta_flag[x0][y0] equal to 1 specifies that DC Offset values are available. When the dmm_delta_flag[x0][y0] is equal to 1, the DC offset values, i.e., residual values, for each partition are further signaled by dmm_dc_abs and dmm_dc_sign_flag. [REMOVED: "The dmm_dc_1_sign_flag[x0][y0] are used to derive QuantDCOffsetP0[x0][y0] and QuantDCOffsetP1[x0][y0] values as follows:

QuantDCOffset$P0$[$x0$][$y0$]=(1−
2*dmm_dc_0_sign_flag[$x0$][$y0$])*
dmm_dc_0_abs[$x0$][$y0$]  (G-19)

QuantDCOffset$P1$[$x0$][$y0$]=(1−2*dmm_dc_sign_flag
[$x0$][$y0$])* dmm_dc_1_abs[$x0$][$y0$]  (G-20)

The edge_dc_flag[x0][y0] equal to 0 specifies that de-quantized offset is not used.

The edge_dc_flag[x0][y0] equal to 1 specifies that de-quantized offset is used. The edge_dc_0_abs[x0][y0], edge_dc_0_sign_flag[x0][y0], edge_dc_1_abs[x0][y0], edge_dc_1_sign_flag[x0][y0] are used to derive QuantDCOffsetP0[x0][y0] and QuantDCOffsetP1[x0][y0] values as follows.

QuantDCOffset$P0$[$x0$][$y0$]=(1−
2*edge_dc_0_sign_flag[$x0$][$y0$])*
edge_dc_1_abs[$x0$][$y0$]  (G-21)

QuantDCOffset$P1$[$x0$][$y0$]=(1−
2*edge_dc_0_sign_flag[$x0$][$y0$])*
edge_dc_1_abs[$x0$][$y0$]  (G-22)"|

The dmm_dc_abs[x0][y0][i] and the dmm_dc_sign_flag[x0][y0][i] are used to derive the QuantDCOffsetP1[x0][y0] value as follows:

QuantDCOffset$P0$[$x0$][$y0$]=(1−2*dmm_dc_sign_flag
[$x0$][$y0$][0])* dmm_dc_abs[$x0$][$y0$][0]  (H-x)

QuantDCOffset$P1$[$x0$][$y0$]=(1−2*dmm_dc_sign_flag
[$x0$][$y0$][1])* dmm_dc_abs[$x0$][$y0$][1]  (H-x)

The edge_dc_abs[x0][y0][i] and the edge_dc_sign_flag[x0][y0][i] and the DcOffsetP1[x0][y0] value as follows.

DcOffset$P0$[$x0$][$y0$]=(1−*edge_dc_sign_flag[$x0$]
[$y0$][0])* edge_dc_abs[$x0$][$y0$][0]  (H-X)

DcOffset$P1$[$x0$][$y0$]=(1−2*edge_dc_sign_flag[$x0$]
[$y0$][1])* edge_dc_abs[$x0$][$y0$][1]  (H-X)

When decoding the syntax element depth_intra_mode, the following context models, shown in Table 3 below, may be applied to code the first and/or second bin:

TABLE 3

Specification of ctxIdxInc using left and above syntax elements

| Syntax element (depth_intra_mode) | condL | condA | ctxIdxInc |
|---|---|---|---|
| 1$^{st}$ bin | depth_intra_mode [xL][yL] < 3 | depth_intra_mode [xA][yA] < 3 | (condL && availableL) + (condA && availableA) |
| 2$^{nd}$ bin | sdc_flag[xL][yL] | sdc_flag[xA][yA] | (condL && availableL) + (condA && availableA) |

In one alternative to the context model specification shown in Table 3, the usage of condL and condA for coding the second bin may only be applied when the first bin is equal to 0, i.e., (depth_intra_mode<3). In another alternative, only one context may be used for each of the first two bins of the syntax element depth_intra_mode. In a further alternative, only one context may be used for the first bin, and the second bin may be bypass coded. For the remaining bins of the syntax element depth_intra_mode, one context may be used for each of them. In other examples, the remaining bins of depth_intra_mode may be bypass coded. The initialization of contexts used for coding the syntax element depth_intra_mode may be dependent on the slice type.

A second alternative of the first example technique of signaling the depth modeling table is similar to the first alternative described above. In the second alternative, however, the signaling of the DMM and CCM depth intra coding mode and associated residual information, i.e., using syntax elements dmm_delta_flag, edge_dc_flag, edge_dc_abs, dmm_dc_abs, edge_dc_sign_flag, and dmm_dc_sign_flag, in the depth modeling table may be further unified as follows. Additions to the depth modeling table over the first alternative described above are italicized, and deletions are indicated using the preceding term "REMOVED:" followed by the deleted text.

| H.xxxx depth modeling table syntax | |
|---|---|
| | Descriptor |
| depth_modeling_table( x0 , y0 ) { depth_intra_mode[ x0 ][ y0 ] | ae(v) |

-continued

H.xxxx depth modeling table syntax

|  | Descriptor |
|---|---|
| ``dmmFlag[ x0 ][ y0+ j ] = (depth_intra_mode[ x0 ][ y0 ] = =``<br>`` MODE_DMM_WFULL ||``<br>``   depth_intra_mode[ x0 ][ y0 ] = = MODE_DMM_WPREDDIR ||``<br>``   depth_intra_mode[ x0 ][ y0 ] = = MODE_DMM_WPREDTEX ||``<br>``   depth_intra_mode[ x0 ][ y0 ] = = MODE_DMM_CPREDTEX )``<br>``...``<br>``  if( dmmFlag[ x0 ][ y0 ] || `` *depth_intra_mode[ x0 ][ y0 ] = = CCM* `` ) {``<br>``    ``*dmm_cmm_delta_flag[ x0 ][ y0 ]* | ae(v) |
| ``    if ( `` *dmm_cmm_delta_flag [ x0 ][ y0 ]* `` ) {``<br>``      for( i = 0; i < 2; i ++ ) {``<br>``        ``*dmm_cmm_dc_abs [ x0 ][ y0 ][ i ]* | ae(v) |
| ``        if ( `` *dmm_cmm_dc_abs[ x0 ][ y0 ][ i ] != 0* `` )``<br>``          ``*dmm_cmm_dc_sign_flag[ x0 ][ y0 ][ i ]* | ae(v) |
| ``      }``<br>``    }``<br>``  }``<br>``  else if( sdcFlag[ x0 ][ y0 ] ) {``<br>``    sdcNumSegments = depth_intra_mode[ x0 ][ y0 ] = = SDCM_DMM_1 ? 2``<br>``: 1``<br>``    for ( i = 0; i < sdcNumSegments ; i++) {``<br>``      sdc_residual_flag[ x0 ][ y0 ][ i ]`` | ae(v) |
| ``      if( sdc_residual_flag [ x0 ][ y0 ][ i ]) {``<br>``        sdc_residual_sign_flag[ x0 ][ y0 ][ i ]`` | ae(v) |
| ``        sdc_residual_abs_minus1[ x0 ][ y0 ][ i ]`` | ae(v) |
| ``      }``<br>``    }``<br>``  }`` | |
| REMOVED: ``else if (depth_intra_mode[ x0 ][ y0 ] = = CCM ) {``<br>REMOVED: ``  edge_dc_flag[ x0 ][ y0 ]`` | ae(v) |
| REMOVED: ``  if( edge_dc_flag[ x0 ][ y0 ] ) {``<br>REMOVED: ``    for( i = 0; i < 2; i++ ) {``<br>REMOVED: ``      edge_dc_abs[ x0 ][ y0 ][ i ]`` | ae(v) |
| REMOVED: ``      if( edge_dc_abs[ x0 ][ y0 ][ i ] != 0 )``<br>REMOVED: ``        edge_dc_sign_flag[ x0 ][ y0 ][ i ]`` | ae(v) |
| REMOVED: ``    }``<br>REMOVED: ``  }``<br>REMOVED: ``}``<br>``}`` | |

Semantics for the modified depth modeling table are defined as follows.

The dmm_cmm_delta_flag[x0][y0] equal to 0 specifies that DC Offset values are unavailable and the dmm_cmm_delta_flag[x0][y0] equal to 1 specifies that DC Offset values are available for CCM or DMM coded PUs. When dmm_cmm_delta_flag[x0][y0] is equal to 1, the DC offset values for each partition is further signaled by dmm_cmm_dc_abs and dmm_cmm_dc_sign_flag.

[REMOVED: "The dmm_delta_flag[x0][y0] equal to 0 specifies that DC Offset values are unavailable and the dmm_delta_flag[x0][y0] equal to 1 specifies that DC Offset values are available. When dmm_delta_flag[x0][y0] is equal to 1, the DC offset values for each partition is further signaled by dmm_dc_abs and dmm_dc_sign_flag.

The edge_dc_flag[x0][y0] equal to 0 specifies that de-quantized offset is not used.

The edge_dc_flag[x0][y0] equal to 1 specifies that de-quantized offset is used."|

The dmm_cmm_dc_abs[x0][y0][i] and dmm_cmm_dc_sign_flag[x0][y0][i] are used to derive the QuantDCOffsetPi[x0][y0] value as follows wherein i being 0 to 1:

QuantDCOffset$Pi$[$x0$]/[$y0$]=(1−2*dmm_cmm_dc_sign_flag[$x0$]/[$y0$][I])* dmm_cmm_dc_abs[$x0$]/[$y0$][I]  (H-x)

[REMOVED: "The dmm_dc_abs[x0][y0][i] and dmm_dc_sign_flag[x0][y0][i] are used to derive the QuantDCOffsetPi[x0][y0] value as follows:

QuantDCOffset$P0$[$x0$]/[$y0$]=(1−2*dmm_dc_sign_flag[$x0$]/[$y0$][0])* dmm_dc_abs[$x0$]/[$y0$][0]  (H-x)

QuantDCOffset$P1$[$x0$]/[$y0$]=(1−2*dmm_dc_sign_flag[$x0$]/[$y0$][1])* dmm_dc_abs[$x0$]/[$y0$][1]  (H-x)

The edge_dc_abs[x0][y0][i] and edge_dc_sign_flag[x0][y0][i] and the DcOffsetPi[x0][y0] value as follows.

DcOffset$P0$[$x0$]/[$y0$]=(1−2*edge_dc_sign_flag[$x0$]/[$y0$][0])* edge_dc_abs[$x0$]/[$y0$][0]  (H-X)

DcOffset$P1$[$x0$]/[$y0$]=(1−2*edge_dc_sign_flag[$x0$]/[$y0$][1])* edge_dc_abs[$x0$]/[$y0$][1]  (H-X)"|

A third alternative of the first example technique of signaling the depth modeling table is similar to the first alternative described above. In the third alternative, however, the number of available depth intra modes is kept unchanged from the conventional 3D-HEVC standard while one syntax element, i.e., depth_intra_mode, is used to signal the intra coding mode of one PU in the CU syntax table and the depth modeling table. The additional syntax elements related to the depth intra coding modes, i.e., the DMM and the SDC mode, are put into the depth modeling table separate from the HEVC intra coding mode syntax in the CU syntax table. In this example, since the CCM is defined as part of the HEVC intra coding modes, a chain coding syntax table is introduced separate from the depth modeling table. Additions to the CU and depth modeling table over the first alternative described above are italicized, and deletions are indicated using the preceding term "REMOVED:" followed by the deleted text.

| G.7.3.9.1 General Coding unit syntax | |
|---|---|
| | Descriptor |
| coding_unit( x0, y0, log2CbSize , ctDepth) {<br>  if( transquant_bypass_enable_flag ) {<br>    cu_transquant_bypass_flag<br>  }<br>...<br>    if( pcm_flag ) {<br>      num_subsequent_pcm<br>      NumPCMBlock = num_subsequent_pcm + 1<br>      while( !byte_aligned( ) )<br>        pcm_alignment_zero_bit<br>      pcm_sample( x0, y0, log2CbSize )<br>    } else {<br>      pbOffset = ( PartMode = = PART_NxN ) ? ( nCbS / 2 ) : 0<br>      log2PbSize = log2CbSize − ( PartMode = = PART_NxN ? 1 : 0 )<br>      for( j = 0; j <= pbOffset; j = j + pbOffset )<br>        for( i = 0; i <= pbOffset; i = i + pbOffset ) {<br>          if( DepthModesFlag )<br>            depth_modeling_table( x0 + i, y0+ j )<br>          if(depth_intra_mode[ x0 + i ][ y0 + j ]==HEVC_INTRA_PRED)<br>            prev_intra_luma_pred_flag[ x0 + i ][ y0+ j ]<br>        }<br>      for( j = 0; j <= pbOffset; j = j + pbOffset )<br>        for( i = 0; i <= pbOffset; i = i + pbOffset ) {<br>          if(depth_intra_mode[ x0 + i ][ y0 + j ]==HEVC_INTRA_PRED ) {<br>            if( prev_intra_luma_pred_flag[ x0 + i ][ y0+ j ] )<br>              mpm_idx[ x0 + i ][ y0+ j ]<br>            else {<br>              rem_intra_luma_pred_mode[ x0 + i ][ y0+ j ]<br>              *if( rem_intra_luma_pred_mode[ x0 + i ][ y0+ j ] = = 31 &&*<br>                *( log2CbSize + ( PartMode = = PART_NxN ) ? − 1 : 0 ) <= 5 &&*<br>                *( log2CbSize + ( PartMode = = PART_NxN ) ? − 1 : 0 ) >= 2 )*<br>                *ccm_info ( x0 + i , y0 + j )*<br>            }<br>          }<br>        }<br>      intra_chroma_pred_mode[ x0 ][ y0 ]<br>    }<br>  } else {<br>    ...<br>    }<br>  }<br>} | <br><br>ae(v)<br><br><br><br>tu(3)<br><br><br>f(1)<br><br><br><br><br><br><br><br><br>ae(v)<br><br><br><br><br>ae(v)<br><br>ae(v)<br><br><br><br><br><br><br><br>ae(v) |

In the third alternative, the CCM related syntax elements are removed from the depth modeling table and, instead, a new chain coding syntax table "ccm_info" is introduced.

| H.xxxx depth modeling table syntax | |
|---|---|
| | Descriptor |
| depth_modeling_table( x0 , y0 ) {<br>  depth_intra_mode[ x0 ][ y0 ]<br>  dmmFlag[ x0 ][ y0 ] = (depth_intra_mode[ x0 ][ y0 ] = =<br>MODE_DMM_WFULL ||<br>    depth_intra_mode[ x0 ][ y0 ] = = MODE_DMM_WPREDDIR ||<br>    depth_intra_mode[ x0 ][ y0 ] = = MODE_DMM_WPREDTEX ||<br>    depth_intra_mode[ x0 ][ y0 ] = = MODE_DMM_CPREDTEX )<br>  sdcFlag[ x0 ][ y0 ] = (depth_intra_mode[ x0 ][ y0 ] = = SDCM_DMM_1 ||<br>    depth_intra_mode[ x0 ][ y0 ] = = SDCM_DC ||<br>    depth_intra_mode[ x0 ][ y0 ] = = SDCM_Planar)<br>  if (depth_intra_mode[ x0 ][ y0 ] = = MODE_DMM_WFULL)<br>    wedge_full_tab_idx[ x0 ][y0] | <br>ae(v)<br><br><br><br><br><br><br><br><br><br><br>ae(v) |

| H.xxxx depth modeling table syntax | |
|---|---|
| | Descriptor |
|     else if(depth_intra_mode[ x0 ][ y0 ] = = MODE_DMM_WPREDTEX) | |
|       wedge_predtex_tab_idx[ x0 ][ y0 ] | ae(v) |
|     else if (depth_intra_mode[ x0 ][ y0 ] = = MODE_DMM_WPREDDIR) { | |
|       dmm_delta_end_flag[ x0 ][ y0 ] | ae(v) |
|       if ( dmm_delta_end_flag[ x0 ][ y0 ] ) { | |
|         dmm_delta_end_abs_minus1[ x0 ][ y0 ] | ae(v) |
|         dmm_delta_end_sign_flag[ x0 ][ y0 ] | ae(v) |
|       } | |
|     } | |
| REMOVED:     else if (depth_intra_mode[ x0 ][ y0 ] = = CCM ) { | |
| REMOVED:       edge_start_left_flag[ x0 ][ y0 ] | ae(v) |
| REMOVED:       edge_start_position[ x0 ][ y0 ] | ae(v) |
| REMOVED:       num_edge_codes_minus1[ x0 ][ y0 ] | ae(v) |
| REMOVED:       for( k = 0; k <= num_edge_codes_minus1; k++ ) | |
| REMOVED:         edge_code[ k ] | ae(v) |
| REMOVED:     } | |
|     if(dmmFlag[ x0 ][ y0 ]) { | |
|       dmm_delta_flag[ x0 ][ y0 ] | ae(v) |
|       if (dmm_delta_flag [ x0 ][ y0 ] ) { | |
|         for( i = 0; i < 2; i ++ ) { | |
|           dmm_dc_abs [ x0 ][ y0 ][ i ] | ae(v) |
|           if ( dmm_dc_abs [ x0 ][ y0 ][ i ] != 0 ) | |
|             dmm_dc_sign_flag[ x0 ][ y0 ][ i ] | ae(v) |
|         } | |
|       } | |
|     } | |
| REMOVED:     else if (depth_intra_mode[ x0 ][ y0 ] = = CCM ) { | |
| REMOVED:       edge_dc_flag[ x0 ][ y0 ] | ae(v) |
| REMOVED:       if( edge_dc_flag[ x0 ][ y0 ] ) { | |
| REMOVED:         for( i = 0; i < 2; i++) { | |
| REMOVED:           edge_dc_abs[ x0 ][ y0 ][ i ] | ae(v) |
| REMOVED:           if( edge_dc_abs[ x0 ][ y0 ][ i ] != 0 ) | |
| REMOVED:             edge_dc_sign_flag[ x0 ][ y0 ][ i ] | ae(v) |
| REMOVED:         } | |
| REMOVED:       } | |
| REMOVED:     } | |
|     else if( sdcFlag[ x0 ][ y0 ] ) { | |
|     sdcNumSegments = depth_intra_mode[ x0 ][ y0 ] = = SDCM_DMM_1 ? 2 : 1 | |
|       for ( i = 0; i < sdcNumSegments ; i++) { | |
|         sdc_residual_flag[ x0 ][ y0 ][ i ] | ae(v) |
|         if( sdc_residual_flag [ x0 ][ y0 ][ i ]) { | |
|           sdc_residual_sign_flag[ x0 ][ y0 ][ i ] | ae(v) |
|           sdc_residual_abs_minus1[ x0 ][ y0 ][ i ] | ae(v) |
|         } | |
|       } | |
|     } | |
| } | |

| H.xxxx chain coding mode syntax | |
|---|---|
| | Descriptor |
| ccm_info ( x0 , y0 ) { | |
|   edge_intra_flag[ x0 ][ y0 ] | ae(v) |
|   if( edge_intra_flag[ x0 ][ y0 ] ) { | |
|     edge_start_left_flag[ x0 ][ y0 ] | ae(v) |
|     edge_start_position[ x0 ][ y0 ] | ae(v) |
|     num_edge_codes_minus1[ x0 ][ y0 ] | ae(v) |
|     for( k = 0; k <= num_edge_codes_minus1; k++ ) | |
|       edge_code[ k ] | ae(v) |
|     edge_dc_flag[ x0 ][ y0 ] | ae(v) |
|     if( edge_dc_flag[ x0 ][ y0 ] ) { | |
|       for( i = 0; i < 2; i++) { | |
|         edge_dc_abs[ x0 ][ y0 ][ i ] | ae(v) |
|         if( edge_dc_abs[ x0 ][ y0 ][ i ] != 0 ) | |
|           edge_dc_sign_flag[ x0 ][ y0 ][ i ] | ae(v) |
|       } | |
|     } | |
|   } | |
| } | |

Semantics for the modified depth modeling table presented above are defined as follows. The depth_intra_mode [x0][y0] may be one of the values shown in Table 4 below. Table 4 represents the available depth intra modes unchanged from the conventional 3D-HEVC standard.

TABLE 4

Interpretation of depth_intra_mode

| | | Bin string | | | | |
|---|---|---|---|---|---|---|
| | | (cLog2CbSize == 3 && partition size == SIZE_2Nx2N) \|\| (cLog2CbSize > 3 && cLog2CbSize < 6) | | cLog2CbSize == 3 && partition size == SIZE_NxN | | cLog2CbSize == |
| depth_intra_mode | DepthIntraMode | Prefix | Subfix | Prefix | Subfix | 6 |
| 0 | SDCM_Planar | 0 | 0 | — | | 0 |
| 1 | HEVC intra (including CCM) (HEVC_INTRA_PRED) | 0 | 1 0 | 0 | | 1 0 |
| 2 | SDCM_DMM_1 | 0 | 1 1 | — | | — |
| 3 | DMM_1 (MODE_DMM_WFULL) | 1 | 0 0 | 1 | 0 | — |
| 4 | DMM_4 (MODE_DMM_CPREDTEX) | 1 | 0 1 | — | | — |
| 5 | DMM_3 (MODE_DMM_WFULL) | 1 | 1 0 | 1 | 1 | — |
| 6 | SDCM_DC | 1 | 1 1 0 | | | 1 1 |
| 7 | DMM_2 (MODE_DMM_WPREDDIR) | 1 | 1 1 1 | | | |

In one alternative, the bin string for the syntax element depth_intra_mode equal to 0, 1 and 2 (i.e., indicating SDCM Planar, HEVC intra including the CCM, and SDCM_DMM_1) may be set to "000," "001" and "01," respectively. In another alternative, the bin string for the syntax element depth_intra_mode equal to 0, 1 and 2 may be set to "000," "01" and "001," respectively. In a further alternative, other orders of the first three depth intra modes may be used. In general, other bin strings to present the DepthIntraMode may be applied.

For example, the available number of depth intra modes in the 3D-HEVC standard may be decreased by 1, i.e., DMM_2 may be removed. The changes in semantics and syntax tables from the depth modeling table presented above are indicated using the preceding term "REMOVED:" followed by the deleted text in Table 5 and the modified depth modeling syntax table presented below.

TABLE 5

Interpretation of depth_intra_mode

| | | | Bin string | | | | |
|---|---|---|---|---|---|---|---|
| | | | (cLog2CbSize == 3 && partition size == SIZE_2Nx2N) \|\| (cLog2CbSize > 3 && cLog2CbSize < 6) | | cLog2CbSize == 3 && partition size == SIZE_NxN | | cLog2CbSize == |
| | depth_intra_mode | DepthIntraMode | Prefix | Subfix | Prefix | Subfix | 6 |
| | 0 | SDCM_Planar | 0 | 0 | — | | 0 |
| | 1 | HEVC intra (including CCM) | 0 | 1 0 | 0 | | 1 0 |
| | 2 | SDCM_DMM_1 | 0 | 1 1 | — | | — |
| | 3 | DMM_1(MODE_DMM_WFULL) | 1 | 0 0 | 1 | 0 | — |
| | 4 | DMM_4(MODE_DMM_CPREDTEX) | 1 | 0 1 | — | | — |
| | 5 | DMM_3(MODE_DMM_WFULL) | 1 | 1 0 | 1 | 1 | — |
| | 6 | SDCM_DC | 1 | 1 1 REMOVED: "0"] | | | 1 1 |
| REMOVED: | 7 | DMM_2 (MODE_DMM_WPREDDIR) | 1 | 1 1 1 | | | |

| H.xxxx depth modeling table syntax | |
|---|---|
| | Descriptor |
| depth_modeling_table( x0 , y0 ) {<br>  depth_intra_mode[ x0 ][ y0 ]<br>  dmmFlag[ x0 ][ y0 ] = (depth_intra_mode[ x0 ][ y0 ] == MODE_DMM_WFULL \|\|<br>    [REMOVED: "depth_intra_mode[ x0 ][ y0 ] == MODE_DMM_WPREDDIR \|\|"]<br>    depth_intra_mode[ x0 ][ y0 ] == MODE_DMM_WPREDTEX \|\|<br>    depth_intra_mode[ x0 ][ y0 ] == MODE_DMM_CPREDTEX )<br>  sdcFlag[ x0 ][ y0 ] = (depth_intra_mode[ x0 ][ y0 ] == SDCM_DMM_1 \|\|<br>    depth_intra_mode[ x0 ][ y0 ] == SDCM_DC \|\|<br>    depth_intra_mode[ x0 ][ y0 ] == SDCM_Planar) | ae(v) |

| H.xxxx depth modeling table syntax | |
|---|---|
| | Descriptor |
|     if (depth_intra_mode[ x0 ][ y0 ] = = MODE_DMM_WFULL) | |
|       wedge_full_tab_idx[ x0 ][ y0 ] | ae(v) |
|     else if(depth_intra_mode [ x0 ][ y0 ] = = MODE_DMM_WPREDTEX) | |
|       wedge_predtex_tab_idx[ x0 ][ y0 ] | ae(v) |
| REMOVED:     else if (depth_intra_mode[ x0 ][ y0 ] = = MODE_DMM_WPREDDIR) { | |
| REMOVED:       dmm_delta_end_flag[ x0 ][ y0 ] | |
| REMOVED:       if ( dmm_delta_end_flag[ x0 ][ y0 ] ) { | |
| REMOVED:         dmm_delta_end_abs_minus1[ x0 ][ y0 ] | ae(v) |
| REMOVED:         dmm_delta_end_sign_flag[ x0 ][ y0 ] | ae(v) |
| REMOVED:       } | |
| REMOVED:     } | |
|     if(dmmFlag[ x0 ][ y0 ]) { | |
|       ... | |
| } | |

In another example, the sub-mode SDCM_DC of the SDC mode may not be considered in depth intra coding. In that case, the depth_intramode equal to 6 may be replaced by the CCM.

A fourth alternative of the first example technique of signaling the depth modeling table is similar to the third alternative described above. In the fourth alternative, however, the sub-modes DMM_1 and DMM_3 of the DMM are treated as part of the HEVC intra coding mode. Additions to syntax and semantics of the CU and depth modeling table over the third alternative described above are italicized, and deletions are indicated using the preceding term "REMOVED:" followed by the deleted text.

| G.7.3.9.1 General Coding unit syntax | |
|---|---|
| | Descriptor |
| coding_unit( x0, y0, log2CbSize , ctDepth) { | |
|   if( transquant_bypass_enable_flag ) { | |
|     cu_transquant_bypass_flag | ae(v) |
|   } | |
| ... | |
|   if( pcm_flag ) { | |
|     ... | |
|   } else { | |
|     pbOffset = ( PartMode = = PART_NxN ) ? ( nCbS / 2 ) : 0 | |
|     log2PbSize = log2CbSize − ( PartMode = = PART_NxN ? 1 : 0 ) | |
|     for( j = 0; j <= pbOffset; j = j + pbOffset ) | |
|       for( i = 0; i <= pbOffset; i = i + pbOffset ) { | |
|         if( DepthModesFlag ) | |
|           depth_intra_mode[ x0 + i ][ y0 + j ] | ae(v) |
|         if(depth_intra_mode[ x0 + i ][ y0 + j ]= =HEVC_INTRA_PRED) | |
|           prev_intra_luma_pred_flag[ x0 + i ][ y0+ j ] | ae(v) |
|     } | |
|     for( j = 0; j <= pbOffset; j = j + pbOffset ) | |
|       for( i = 0; i <= pbOffset; i = i + pbOffset ) { | |
|         if(depth_intra_mode[ x0 + i ][ y0 + j ]==HEVC_INTRA_PRED) { | |
|           if( prev_intra_luma_pred_flag[ x0 + i ][ y0+ j ] ) | |
|             mpm_idx[ x0 + i ][ y0+ j ] | ae(v) |
|           else{ | |
|             rem_intra_luma_pred_mode[ x0 + i ][ y0+ j ] | ae(v) |
|         if( [REMOVED: "rem_intra_luma_pred_mode[ x0 + i ][ y0+ j ] = = 31 &&"] | |
| ( log2CbSize + ( PartMode = = PART_NxN ) ? − 1 : 0 ) <= 5 && ( log2CbSize + | |
| ( PartMode = = PART_NxN ) ? − 1 : 0 ) >= 2 ) | |
|           *dmm_ccm_directional_intra_idc[ x0 + i ][ y0 + j ]* | *ae(v)* |
|           *if(dmm_ccm_directional_intra_idc[ x0 + i ][ y0 + j ] == 3) {* | |
|             *ccm_info ( x0 + i , y0 + j )* | |
|           *else if( dmm_ccm_directional_intra_idc[ x0 + i ][ y0 + j ] != 0 )* | |
|             *wedge_predtex_tab_idx[ x0 + i ][ y0 + j ]* | *ae(v)* |
|         } | |
|         *if(dmm_ccm_directional_intra_idc[ x0 + i ][ y0 +j ] != 0 ||* | |
| *depth_intra_mode[ x0 + i ][ y0 + j ] = = MODE_DMM_CPREDTEX )* { | |
|           *for( k = 0; k < 2; k++) {* | |
|             *edge_dc_abs[ x0 + i ][ y0+ j ][ k ]* | *ae(v)* |
|             *if(edge_dc_abs[ x0 + i ][ y0+ j ][ k ] != 0 )* | |
|               *edge_dc_sign_flag[ x0 + i ][ y0+ j ][ k ]* | *ae(v)* |
|             } | |
|           } | |
|         } | |
|       } | |
|     } | |
|     intra_chroma_pred_mode[ x0 ][ y0 ] | ae(v) |

G.7.3.9.1 General Coding unit syntax

| | Descriptor |
|---|---|
| ``` }     } else {         if( PartMode = = PART_2Nx2N ) ... } ``` | |

H.xxxx depth modeling table syntax

| | | Descriptor |
|---|---|---|
| | depth_modeling_table( x0 , y0 ) { | |
| |    depth_intra_mode[ x0 ][ y0 ] | ae(v) |
| REMOVED: |    dmmFlag[ x0 ][ y0 ] = (depth_intra_mode[ x0 ][ y0 ] = = MODE_DMM_WFULL || depth_intra_mode[ x0 ][ y0 ] = = MODE_DMM_WPREDDIR || depth_intra_mode[ x0 ][ y0 ] = = MODE_DMM_WPREDTEX || depth_intra_mode[ x0 ][ y0 ] = = MODE_DMM_CPREDTEX ) | |
| |    sdcFlag[ x0 ][ y0 ] = (depth_intra_mode[ x0 ][ y0 ] = = SDCM_DMM_1 || depth_intra_mode[ x0 ][ y0 ] = = SDCM_DC || depth_intra_mode[ x0 ][ y0 ] = = SDCM_Planar) | |
| REMOVED: |    if (depth_intra_mode[ x0 ][ y0 ] = = MODE_DMM_WFULL) | |
| REMOVED: |      wedge_full_tab_idx[ x0 ][ y0 ] | ae(v) |
| REMOVED: |    else if(depth_intra_mode[ x0 ][ y0 ] = = MODE_DMM_WPREDTEX) | |
| REMOVED: |      wedge_predtex_tab_idx[ x0 ][ y0 ] | ae(v) |
| REMOVED: |    else if (depth_intra_mode[ x0 ][ y0 ] = = MODE_DMM_WPREDDIR) { | |
| REMOVED: |      dmm_delta_end_flag[ x0 ][ y0 ] | ae(v) |
| REMOVED: |      if ( dmm_delta_end_flag[ x0 ][ y0 ] ) { | |
| REMOVED: |         dmm_delta_end_abs_minus1 [ x0 ][ y0 ] | ae(v) |
| REMOVED: |         dmm_delta_end_sign_flag[ x0 ][ y0 ] | ae(v) |
| REMOVED: |      } | |
| REMOVED: |    } | |
| REMOVED: |    if(dmmFlag[ x0 ][ y0 ]) { | |
| REMOVED: |      dmm_delta_flag[ x0 ][ y0 ] | ae(v) |
| REMOVED: |      if (dmm_delta_flag [ x0 ][ y0 ] ) { | |
| REMOVED: |         for( i = 0; i < 2; i ++ ) { | |
| REMOVED: |            dmm_dc_abs [ x0 ][ y0 ][ i ] | ae(v) |
| REMOVED: |            if ( dmm_dc_abs [ x0 ][ y0 ][ i ] != 0 ) | |
| REMOVED: |               dmm_dc_sign_flag[ x0 ][ y0 ][ i ] | ae(v) |
| REMOVED: |         } | |
| REMOVED: |      } | |
| REMOVED: |    } | |
| REMOVED: |    else | |
| |    if( sdcFlag[ x0 ][ y0 ] ) { | |
| |      sdcNumSegments = depth_intra_mode[ x0 ][ y0 ] = = SDCM_DMM_1 ? 2 : 1 | |
| |      for ( i = 0; i < sdcNumSegments ; i++) { | |
| |         sdc_residual_flag [ x0 ][ y0 ][ i ] | ae(v) |
| |         if( sdc_residual_flag [ x0 ][ y0 ][ i ]) { | |
| |            sdc_residual_sign_flag[ x0 ][ y0 ][ i ] | ae(v) |
| |            sdc_residual_abs_minus1[ x0 ][ y0 ][ i ] | ae(v) |
| |         } | |
| |      } | |
| |    } | |
| | } | |

H.xxxx chain coding mode syntax

| | | Descriptor |
|---|---|---|
| | ccm_info ( x0 , y0 ) { | |
| REMOVED: |    edge_intra_flag[ x0 ][ y0 ] | ae(v) |
| |    if( edge_intra_flag[ x0 ][ y0 ] ) { | |
| |      edge_start_left_flag[ x0 ][ y0 ] | ae(v) |
| |      edge_start_position[ x0][ y0 ] | ae(v) |
| |      num_edge_codes_minus1[ x0 ][ y0 ] | ae(v) |
| |      for( k = 0; k <= num_edge_codes_minus1; k++ ) | |
| |         edge_code[ k ] | ae(v) |
| REMOVED: |      edge_dc_flag[ x0 ][ y0 ] | ae(v) |
| REMOVED: |      if( edge_dc_flag[ x0 ][ y0 ] ) { | |
| REMOVED: |         for( i = 0; i < 2; i++) { | |
| REMOVED: |            edge_dc_abs[ x0 ][ y0 ][ i ] | ae(v) |
| REMOVED: |            if( edge_dc_abs[ x0 ][ y0 ][ i ] != 0 ) | |
| REMOVED: |               edge_dc_sign_flag[ x0 ][ y0 ][ i ] | ae(v) |
| REMOVED: |         } | |
| REMOVED: |      } | |
| |    } | |
| | } | |

Semantics for the CU syntax table and modified depth modeling table presented above are defined as follows. The depth_intra_mode[x0][y0] may be one of the values shown in Table 6 below.

TABLE 6

Interpretation of depth_intra_mode

| depth_intra_mode | DepthIntraMode | (cLog2CbSize == 3 && partition size == SIZE_2Nx2N) \|\| (cLog2CbSize > 3 && cLog2CbSize < 6) Prefix | Subfix | cLog2CbSize == 3 && partition size == SIZE_NxN Prefix | Subfix | cLog2CbSize == 6 |
|---|---|---|---|---|---|---|
| 0 | SDCM_Planar | 0 | 0 | — | — | 0 |
| 1 | HEVC intra (including CCM, DMM_1, DMM_3) | 0 | 1 0 | — | — | 1 0 |
| 2 | SDCM_DMM_1 | 0 | 1 1 | — | — | — |
| 3 | DMM_4 (MODE_DMM_CPREDTEX) | 1 | 0 | — | — | — |
| 4 | SDCM_DC | 1 | 1 | — | — | 1 1 |

The dmm_ccm_directional_intra_idc[x0+i][y0+i] may be one of the values shown in Table 7 below.

TABLE 7

Interpretation of dmm_ccm_directional_intra_idc

| dmm_ccm_directional_intra_idc | DmmCcmDirectionalIntraIdc | rem_intra_luma_pred_mode [ x0 + i ] [ y0 + j] == 31 | | rem_intra_luma_pred_mode [ x0 + i ] [y0 + j ] != 31 | |
|---|---|---|---|---|---|
| 0 | HEVC_INTRA | 0 | 0 | 0 | |
| 1 | DMM_1 | 1 | 0 | 1 | 0 |
| 2 | DMM_3 | 1 | 1 0 | 1 | 1 |
| 3 | CCM | 1 | 1 1 | — | — |

In a second example of the techniques of this disclosure, the syntax tables and syntax elements for the DMM, the HEVC intra mode, and the CCM are simplified. In this example, instead of separately signaling the dmm_flag of all the PUs, the DMM sub-modes of all the PUs, and other DMM related information of all the PUs in several loops, the CU syntax table or the depth modeling table may be designed to include all the DMM information of one PU together, followed by the information for another PU, as so on. Therefore, only one loop that traverses all the PUs in a current CU is required.

In a first alternative of the second example technique of simplifying the syntax tables and elements for depth intra coding modes, the related semantics are kept unchanged while the CU syntax table is modified to make it simpler for the parsing process at video decoder 30. Additions to the 3D-HEVC standard are italicized below, and deletions from the 3D-HEVC standard are indicated using the preceding term "REMOVED:" followed by the deleted text.

| G.7.3.9.1 General Coding unit syntax | |
|---|---|
| | Descriptor |
| coding_unit( x0, y0, log2CbSize , *ctDepth*) { | |
|   if( transquant_bypass_enable_flag ) { | |
|     cu_transquant_bypass_flag | ae(v) |
|   } | |
|   if( slice_type != I && *!MotionInhFlag[ x0 ][ y0 ]*) | |
|     skip_flag[ x0 ][ y0 ] | ae(v) |

-continued

| G.7.3.9.1 General Coding unit syntax | |
|---|---|
| | Descriptor |
|     if( skip_flag[ x0 ][ y0 ] ) | |
|       prediction_unit( x0, y0, log2CbSize ) | |
|     else { | |
|       *if( !MotionInhFlag[ x0 ][ y0 ] ) {* | |
|         nCbS = ( 1 << log2CbSize ) | |
|       if( slice_type != I ) | |
|         pred_mode_flag | ae(v) |
|       *if( PredMode = = MODE_INTRA && DepthFlag )* | |
|         *sdc_flag[ x0 ][ y0 ]* | *ae(v)* |
|       *if( sdc_flag[ x0 ][ y0 ] ) {* | |
|         *sdc_pred_mode* | *ae(v)* |
|         *if( sdc_pred_mode = = 1 )* | |
|           *wedge_full_tab_idx[ x0 ][ y0 ]* | *ae(v)* |
|       } *else {* | |
|         *if( ( PredMode[ x0 ][ y0 ] ! = MODE_INTRA | | log2CbSize = = Log2MinCbSize ) && !predPartModeFlag)* | |
|         part_mode | ae(v) |
|       if( PredMode[ x0 ][ y0 ] = = MODE_INTRA ) { | |
|         if( PartMode = = PART_2Nx2N && pcm_enabled_flag && | |
|           log2CbSize >= Log2MinIPCMCUSize && | |
|           log2CbSize <= Log2MaxIPCMCUSize ) | |
|         pcm_flag | ae(v) |
|       if( pcm_flag ) { | |
|         num_subsequent_pcm | tu(3) |
|         NumPCMBlock = num_subsequent_pcm + 1 | |
|         while( !byte_aligned( ) ) | |
|           pcm_alignment_zero_bit | f(1) |
|         pcm_sample( x0, y0, log2CbSize ) | |
|       } else { | |
|         pbOffset = ( PartMode = = PART_NxN ) ? ( nCbS / 2 ) : 0 | |
| REMOVED:         if (vps_dmm_flag[ nuh_layer_id ] && log2CbSize <= Log2MaxDmmCbSize ) { | |
| REMOVED:         log2PbSize = log2CbSize − ( PartMode = = PART_NxN ? 1 : 0 ) | |
| REMOVED:         for( j = 0; j <= pbOffset; j = j + pbOffset ) | |
| REMOVED:           for( i = 0; i <= pbOffset; i = i + pbOffset ) | |
| REMOVED:             dmm_flag[ x0 + i ][ y0+ j ] | ae(v) |
| REMOVED:         for( j = 0; j <= pbOffset; j = j + pbOffset ) | |
| REMOVED:           for( i = 0; i <= pbOffset; i = i + pbOffset ) | |
| REMOVED:             if (dmm_flag[ x0 + i ][ y0+ j ] ) | |
| REMOVED:               dmm_mode[ x0 + 1 ][ y0+ j ] | ae(v) |
| REMOVED:         for( j = 0; j <= pbOffset; j = j + pbOffset ) | |
| REMOVED:           for( i = 0; i <= pbOffset; i = i + pbOffset ) | |
| REMOVED:             if ( dmm_flag[ x0 + i ][ y0+ j ] && ( dmm_mode[ x0 + i ][ y0+ j ] = = MODE_DMM_WFULL | | dmm_mode[ x0 + i ][ y0+ j ] = = MODE_DMM_WFULLDELTA ) ) | |
| REMOVED:               wedge_full_tab_idx[ x0 + i ] [ y0 + i ] | ae(v) |
| REMOVED:         for( j = 0; j <= pbOffset; j = j + pbOffset ) | |
| REMOVED:           for( i = 0; i <= pbOffset; i = i + pbOffset ) | |
| REMOVED:             if ( dmm_flag[ x0 + i ][ y0+ j ] && ( dmm_mode[ x0 + i ][ y0+ j ] = = MODE_DMM_WPREDTEX | | dmm_mode[ x0 + i ][ y0+ j ] = = MODE_DMM_WPREDTEXDELTA) ) | |
| REMOVED:               wedge_full_tab_idx[ x0 + i ][ y0 + i ] | ae(v) |
| REMOVED:         for( j = 0; j <= pbOffset; j = j + pbOffset ) | |
| REMOVED:           for( i = 0; i <= pbOffset; i = i + pbOffset ) | |
| REMOVED:             if ( dmm_flag[ x0 + i ][ y0+ j ] && ( dmm_mode[ x0 + i ][ y0+ j ] = = MODE_DMM_WPREDDIR | | dmm_mode[ x0 + i ][ y0+ j ] = = MODE_DMM_WPREDDIRDELTA ) ) | |
| REMOVED:               dmm_delta_end_flag[ x0 + i ][ y0 + i ] | ae(v) |
| REMOVED:         for( j = 0; j <= pbOffset; j = j + pbOffset ) | |
| REMOVED:           for( i = 0; i <= pbOffset; i = i + pbOffset ) | |
| REMOVED:             if ( dmm_delta_end_flag[ x0 + i ][ y0 + i ] ) | |
| REMOVED:               dmm_delta_end_abs_minus1[ x0 + i ][ y0 + i ] | ae(v) |
| REMOVED:         for( j = 0; j <= pbOffset; j = j + pbOffset ) | |
| REMOVED:           for( i = 0; i <= pbOffset; i = i + pbOffset ) | |
| REMOVED:             if ( dmm_delta_end_flag[ x0 + i ][ y0 + i ] ) | |
| REMOVED:               dmm_delta_end_sign_flag[ x0 ][ y0 ] | ae(v) |

-continued

| G.7.3.9.1 General Coding unit syntax | | |
|---|---|---|
| | | Descriptor |
| REMOVED: | for( j = 0; j <= pbOffset; j = j + pbOffset ) | |
| REMOVED: | for( i = 0; i <= pbOffset; i = i + pbOffset ) | |
| REMOVED: | DmmDeltaFlag[ x0 + i ][ y0 + i ] = ( dmm_flag[ x0 + i ][ y0+ j ] && ( dmm_mode[ x0 + i ][ y0 + i ] = = MODE_DMM_WFULLDELTA \|\| dmm_mode[ x0 + i ][ y0 + i ] = = MODE_DMM_WPREDDIRDELTA \|\| dmm_mode[ x0 + i ][ y0 + i ] = = MODE_DMM_WPREDTEXDELTA \|\| dmm_mode[ x0 + i ][ y0 + i ] = = MODE_DMM_CPREDTEXDELTA ) ) | |
| REMOVED: | for( j = 0; j <= pbOffset; j = j + pbOffset ) | |
| REMOVED: | for( i = 0; i <= pbOffset; i = i + pbOffset ) | |
| REMOVED: | if ( DmmDeltaFlag[ x0 + i ][ y0 + i ] ) | |
| REMOVED: | dmm_dc_1_abs[ x0 + i ][ y0 + i ] | ae(v) |
| REMOVED: | for( j = 0; j <= pbOffset; j = j + pbOffset ) | |
| REMOVED: | for( i = 0; i <= pbOffset; i = i + pbOffset ) | |
| REMOVED: | if ( DmmDeltaFlag[ x0 + i ][ y0+ j ] && dmm_dc_1_abs[ x0 + i ][ y0 + i ] != 0 ) | |
| REMOVED: | dmm_dc_1_sign_flag[ x0 + i ][ y0 + i ] | ae(v) |
| REMOVED: | for( j = 0; j <= pbOffset; j = j + pbOffset ) | |
| REMOVED: | for( i = 0; i <= pbOffset; i = i + pbOffset ) | |
| REMOVED: | if ( DmmDeltaFlag[ x0 + i ][ y0+ j ] ) | |
| REMOVED: | dmm_dc_2_abs[ x0 + i ][ y0 + i ] | ae(v) |
| REMOVED: | for( j = 0; j <= pbOffset; j = j + pbOffset ) | |
| REMOVED: | for( i = 0; i <= pbOffset; i = i + pbOffset ) | |
| REMOVED: | if ( DmmDeltaFlag[ x0 + i ][ y0+ j ] && dmm_dc_2_abs[ x0 + i ][ y0 + i ] != 0 ) | |
| REMOVED: | dmm_dc_2_sign_flag[ x0 + i ][ y0 + i ] | ae(v) |
| REMOVED: | } else { | |
| | for( j = 0; j <= pbOffset; j = j + pbOffset ) | |
| | for( i = 0; i <= pbOffset; i = i + pbOffset ) { | |
| | *if (vps_dmm_flag[ nuh_layer_id ] && log2CbSize < = Log2MaxDmmCbSize )* | |
| | *dmm_flag[ x0 + i ][ y0 j ]* | *ae(v)* |
| | *if( !dmm_flag[ x0 + i ][ y0+ j ] )* | |
| | prev_intra_luma_pred_flag[ x0 + i ][ y0+ j ] | ae(v) |
| | *else {* | |
| | *dmm_mode[ x0 + i ][ y0+ j ]* | *ae(v)* |
| | *DmmDeltaFlag[ x0 + i ][ y0 + j ] = (* | |
| | *dmm_mode[ x0 + i ][ y0 + j ] = = MODE_DMM_WFULLDELTA \|\| dmm_mode[ x0 + i ][ y0 + j ] = = MODE_DMM_WPREDDIRDELTA \|\| dmm_mode[ x0 + i ][ y0 + j ] = = MODE_DMM_WPREDTEXDELTA \|\| dmm_mode[ x0 + i ][ y0 + j ] = = MODE_DMM_CPREDTEXDELTA )* | |
| | *if ( dmm_mode[ x0 + i ][ y0+ j ] = = MODE_DMM_WFULL \|\| dmm_mode[ x0 + i ][ y0+ j ] = = MODE_DMM_WFULLDELTA )* | |
| | *wedge_full_tab_idx[ x0 + i ][ y0 + j ]* | *ae(v)* |
| | *else if ( dmm_mode[ x0 + i ][ y0+ j ] = = MODE_DMM_WPREDTEX \|\| dmm_mode[ x0 + i ][ y0+ j ] = = MODE_DMM_WPREDTEXDELTA)* | |
| | *wedge_predtex_tab_idx[ x0 + i ][ y0 + j ]* | *ae(v)* |
| | *else if (dmm_mode[ x0 + i ][ y0+ j ] = = MODE_DMM_WPREDDIR \|\| dmm_mode[ x0 + i ][ y0+ j ] = = MODE_DMM_WPREDDIRDELTA ) {* | |
| | *dmm_delta_end_flag[ x0 + i ][ y0 + j ]* | *ae(v)* |
| | *if(dmm_delta_end_flag[ x0 + i ][ y0 + j ]) {* | |
| | *dmm_delta_end_abs_minus1[ x0 + i ][ y0 + j ]* | *ae(v)* |
| | *dmm_delta_end_sign_flag[ x0 + i ][ y0 + j ]* | *ae(v)* |
| | *}* | |
| | *}* | |
| | *if ( DmmDeltaFlag[ x0 + i ][ y0 + j ] ) {* | |
| | *dmm_dc_1_abs[ x0 + i ][ y0 + j ]* | *ae(v)* |
| | *dmm_dc_2_abs[ x0 + i ][ y0 + j ]* | *ae(v)* |
| | *if (dmm_dc_1_abs[ x0 + i ][ y0 + j ])* | |
| | *dmm_dc_1_sign_flag[ x0 + i ][ y0 + j ]* | *ae(v)* |
| | *if (dmm_dc_2_abs[ x0 + i ][ y0 + j ])* | |
| | *dmm_dc_2_sign_flag[ x0 + i ][ y0 +j ]* | *ae(v)* |
| | *}* | |
| | *}* | |
| | *}* | |

| G.7.3.9.1 General Coding unit syntax | |
|---|---|
| | Descriptor |
|       for( j = 0; j <= pbOffset; j = j + pbOffset ) | |
|         for( i = 0; i <= pbOffset; i = i + pbOffset ) { | |
|           if( !dmm_flag[ x0 + i ][ y0+ j ] ){ | |
|             if( prev_intra_luma_pred_flag[ x0 + i ][ y0+ j] ) | |
|               mpm_idx[ x0 + i ][ y0+ j ] | ae(v) |
|             else { | |
|               rem_intra_luma_pred_mode[ x0 + i ][ y0+ j ] | ae(v) |
|               if( rem_intra_luma_pred_mode[ x0 + i ][ y0+ j ] = = 31 && ( log2CbSize + ( PartMode = = PART_NxN ) ? − 1 : 0 ) <= 5 && ( log2CbSize + ( PartMode = = PART_NxN ) ? − 1 : 0 ) >= 2 ) { | |
|                 edge_intra_flag[ x0 + i ][ y0 + j ] | ae(v) |
|                 if( edge_intra_flag[ x0 + i ][ y0+ j ] ) { | |
|                   edge_start_left_flag[ x0 + i ][ y0+ j ] | ae(v) |
|                   edge_start_position[ x0 + i ][ y0+ j ] | ae(v) |
|                   num_edge_codes_minus1[ x0 + i ][ y0+ j ] | ae(v) |
|                   for( k = 0; k <= num_edge_codes_minus1; k++ ) | |
|                     edge_code[ k ] | ae(v) |
|                   edge_dc_flag[ x0 + i ][ y0+ j ] | ae(v) |
|                   if( edge_dc_flag[ x0 + i ][ y0+ j ] ) { | |
|                     edge_dc_1_abs[ x0 + i ][ y0+j ] | ae(v) |
|                     if( edge_dc_1_abs[ x0 + i ][ y0+ j ] != 0 ) | |
|                       edge_dc_1_sign_flag[ x0 + i ][ y0+ j ] | ae(v) |
|                     edge_dc_2_abs[ x0 + i ][ y0+ j ] | ae(v) |
|                     if( edge_dc_2_abs[ x0 + i ][ y0+ j ] != 0 ) | |
|                       edge_dc_2_sign_flag[ x0 + i ][ y0+ j ] | ae(v) |
|                   } | |
|                 } | |
|               } | |
|             } | |
|           } | |
|         } | |
| REMOVED:         } | |
|         intra_chroma_pred_mode[ x0 ][ y0 ] | ae(v) |
|       } | |
|     } else { | |
|     ... | |
| } | |

In a second alternative of the second example technique of simplifying the syntax tables and elements for depth intra coding modes, the syntax elements related to the signaling of the DC Offsets are unified when the DMM or the CCM is applied. Additions to syntax and semantics of the CU syntax table over the first alternative described above are italicized, and deletions are indicated using the preceding term "REMOVED:" followed by the deleted text.

| G.7.3.9.1 General Coding unit syntax | |
|---|---|
| | Descriptor |
| coding_unit( x0, y0, log2CbSize , ctDepth) { | |
|   if( transquant_bypass_enable_flag ) { | |
|     cu_transquant_bypass_flag | ae(v) |
|   } | |
| ... | |
|     } else { | |
|       pbOffset = ( PartMode = = PART_NxN ) ? ( nCbS / 2 ) : 0 | |
|       for( j = 0; j <= pbOffset; j = j + pbOffset ) | |
|         for( i = 0; i <= pbOffset; i = i + pbOffset ) { | |
|           if (( vps_dmm_flag[ nuh_layer_id ] && log2CbSize <= Log2MaxDmmCbSize ) | |
|             dmm_flag[ x0 + i ][ y0+ j ] | ae(v) |
|           if( !dmm_flag[ x0 + i ][ y0+ j ] ) | |
|             prev_intra_luma_pred_flag[ x0 + i ][ y0+ j ] | ae(v) |
|           else { | |
|             dmm_mode[ x0 + i ][ y0+ j ] | ae(v) |
|             DmmDeltaFlag[ x0 + i ][ y0 + i ] = ( dmm_mode[ x0 + i ][ y0 + i ] = = MODE_DMM_WFULLDELTA || dmm_mode[ x0 + i ][ y0 + i ] = = MODE_DMM_WPREDDIRDELTA || dmm_mode[ x0 + i ][ y0 + i ] = = MODE_DMM_WPREDTEXDELTA || dmm_mode[ x0 + i ][ y0 + i ] = = MODE_DMM_CPREDTEXDELTA ) | |
|             if ( dmm_mode[ x0 + i ][ y0+ j ] = = MODE_DMM_WFULL || dmm_mode[ x0 + i ][ y0+ j ] = = MODE_DMM_WFULLDELTA ) | |
|               wedge_full_tab_idx[ x0 + i ][ y0 + i ] | ae(v) |

-continued

| G.7.3.9.1 General Coding unit syntax | |
|---|---|
| | Descriptor |

| | | |
|---|---|---|
| | else if ( dmm_mode[ x0 + i ][ y0+ j ] = = MODE_DMM_WPREDTEX \|\| dmm_mode[ x0 + i ][ y0+ j ] = = MODE_DMM_WPREDTEXDELTA) | |
| |     wedge_predtex_tab_idx[ x0 ][ y0 ] | ae(v) |
| | else if (dmm_mode[ x0 + i ][ y0+ j ] = = MODE_DMM_WPREDDIR \|\| dmm_mode[ x0 + i ][ y0+ j ] = = MODE_DMM_WPREDDIRDELTA ) { | |
| |     dmm_delta_end_flag[ x0 + i ][ y0 + i ] | ae(v) |
| |     if(dmm_delta_end_flag[ x0 + i ][ y0 + i ]) { | |
| |       dmm_delta_end_abs_minus1[ x0 + i ][ y0 + i ] | ae(v) |
| |       dmm_delta_end_sign_flag[ x0 ][ y0 ] | ae(v) |
| |     } | |
| | } | |
| REMOVED: | if ( DmmDeltaFlag[ x0 + i ][ y0 + j ] ) { | |
| REMOVED: |   dmm_dc_1_abs[ x0 + i ][ y0 + j ] | ae(v) |
| REMOVED: |   dmm_dc_2_abs[ x0 + i ][ y0 + j ] | ae(v) |
| REMOVED: |   if (dmm_dc_1_abs[ x0 + i ][ y0 + j ]) | |
| REMOVED: |     dmm_dc_1_sign_flag[ x0 + i ][ y0 + j ] | ae(v) |
| REMOVED: |   if (dmm_dc_2_abs[ x0 + i ][ y0 + j ]) | |
| REMOVED: |     dmm_dc_2_sign_flag[ x0 + i ][ y0 + j ] | ae(v) |
| REMOVED: | } | |
| | } | |
| | for( j = 0; j <= pbOffset; j = j + pbOffset ) | |
| |   for( i = 0; i <= pbOffset; i = i + pbOffset ) { | |
| |     if( !dmm_flag[ x0 + i ][ y0+ j ] ) { | |
| |       if( prev_intra_luma_pred_flag[ x0 + i ][ y0+ j ] ) | |
| |         mpm_idx[ x0 + i ][ y0+ j ] | ae(v) |
| |       else { | |
| |         rem_intra_luma_pred_mode[ x0 + i ][ y0+ j ] | ae(v) |
| |         if( rem_intra_luma_pred_mode[ x0 + i ][ y0+ j ] = = 31 && ( log2CbSize + ( PartMode = = PART_NxN ) ? − 1 : 0 ) <= 5 && ( log2CbSize + ( PartMode = = PART_NxN ) ? − 1 : 0 ) >= 2 ) { | |
| |           edge_intra_flag[ x0 + i ][ y0+ j ] | |
| |           if( edge_intra_flag[ x0 + i ][ y0+ j ] ) { | |
| |             edge_start_left_flag[ x0 + i ][ y0+ j ] | ae(v) |
| |             edge_start_position[ x0 + i ][ y0+ j ] | ae(v) |
| |             num_edge_codes_minus1[ x0 + i ][ y0+ j ] | ae(v) |
| |             for( k = 0; k <= num_edge_codes_minus1; k++ ) | |
| |               edge_code[ k ] | ae(v) |
| |             edge_dc_flag[ x0 + i ][ y0+ j ] | ae(v) |
| REMOVED: |             if( edge_dc_flag[ x0 + i ][ y0+ j ] ) { | |
| REMOVED: |               edge_dc_1_abs[ x0 + i ][ y0+ j ] | ae(v) |
| REMOVED: |               if( edge_dc_1_abs[ x0 + i ][ y0+ j ] != 0 ) | |
| REMOVED: |                 edge_dc_1_sign_flag[ x0 + i ][ y0+ j ] | ae(v) |
| REMOVED: |               edge_dc_2_abs[ x0 + i ][ y0+ j ] | ae(v) |
| REMOVED: |               if( edge_dc_2_abs[ x0 + i ][ y0+ j ] != 0 ) | |
| REMOVED: |                 edge_dc_2_sign_flag[ x0 + i ][ y0+ j ] | ae(v) |
| REMOVED: |             } | |
| |           } | |
| |         } | |
| |       } | |
| | *if( edge_dc_flag[ x0 + i ][ y0+ j ] \|\| DmmDeltaFlag[ x0 + i ][ y0 + i ] ) {* | |
| |   *dc_1_abs[ x0 + i ][ y0+ j ]* | *ae(v)* |
| |   *if(dc_1_abs[ x0 + i ][ y0+ j ] != 0 )* | |
| |     *dc_1_sign_flag[ x0 + i ][ y0+ j ]* | *ae(v)* |
| |   *dc_2_abs[ x0 + i ][ y0+ j ]* | *ae(v)* |
| |   *if(dc_2_abs[ x0 + i ][ y0+ j ] != 0 )* | |
| |     *dc_2_sign_flag[ x0 + i ][ y0+ j ]* | *ae(v)* |
| | *}* | |
| |     } | |
| REMOVED: |   } | |
| |   intra_chroma_pred_mode[ x0 ][ y0 ] | ae(v) |
| | } | |
| | } else { | |
| |   ... | |
| | } | |

Semantics for the CU syntax table presented above are defined as follows.

The dc_0_abs[x0][y0], dc_0_sign_flag[x0][y0], dc_1_abs[x0][y0], and dc_1_sign_flag[x0][y0] are used to derive QuantDCOffsetP0[x0][y0] and QuantDCOffsetP1[x0][y0] values as follows:

$$\text{QuantDCOffset}P0[x0][y0]=(1-2*\text{dc\_0\_sign\_flag}[x0][y0])* \text{dc\_0\_abs}[x0][y0] \quad (G\text{-}19)$$

$$\text{QuantDCOffset}P1[x0][y0]=(1-2*\text{dc\_1\_sign\_flag}[x0][y0])* \text{dc\_1\_abs}[x0][y0] \quad (G\text{-}20)$$

[REMOVED: "The edge_dc_0_abs[x0][y0], edge_dc_0_sign_flag[x0][y0], edge_dc_1_abs[x0][y0], and edge_dc_1_sign_flag[x0][y0] are used to derive QuantDCOffsetP0[x0][y0] and QuantDCOffsetP1[x0][y0] values as follows:

$$\text{QuantDCOffset}P0[x0][y0]=(1-2*\text{edge\_dc\_0\_sign\_flag}[x0][y0])* \text{edge\_dc\_1\_abs}[x0][y0] \quad (G\text{-}21)$$

$$\text{QuantDCOffset}P1[x0][y0]=(1-2*\text{edge\_dc\_0\_sign\_flag}[x0][y0])* \text{edge\_dc\_1\_abs}[x0][y0] \quad (G\text{-}22)"|$$

In a third example of the techniques of this disclosure, video encoder 20 signals residual information of depth data for 3D video data using signaling mechanisms that are unified across two or more of the depth coding modes. In this way, video decoder 30 may decode the same set of syntax elements to determine the residual information for any of the depth coding modes. A unified a set of syntax elements may include a syntax element that indicates whether residual values are coded for any of the depth coding modes. The unified set of syntax elements may also include syntax elements that indicate the absolute value and the sign of residual values for any of the depth coding modes. By sharing the same set of syntax elements to indicate residual information for two or more of the depth coding modes, context model selection and binarization methods for the syntax elements may also be unified.

Additions to the 3D-HEVC standard are italicized below, and deletions from the 3D-HEVC standard are indicated using the preceding term "REMOVED:" followed by the deleted text. The working draft of 3D-HEVC (document number: JCT3V-E1001) is available from: http://phenix.int-evry.fr/jct3 v/doc_end_user/documents/5_Vienna/wg11/JCT3V-E1001-v3.zip. The software description of 3D-HEVC (document number: JCT3V-E1005) is available from: http://phenix.int-evry.fr/jct3v/doc_end_user/documents/5_Vienna/wg11/JCT3V-E1005-v1.zip.

| H.7.3.8.5.1 Depth mode parameter syntax | Descriptor |
|---|---|
| depth_mode_parameters( x0 , y0 , log2CbSize ) { | |
|   if( log2CbSize = = 3 && PartMode[ xC ][ yC ] = = PART_2Nx2N ) | |
|     \| \| ( log2CbSize > 3 && log2CbSize < 6 ) ) | |
|     depth_intra_mode_set_indication_flag | ae(v) |
|   depth_intra_mode[ x0 ][ y0 ] | ae(v) |
|   if ( DepthIntraMode[ x0 ][ y0 ] = = INTRA_DEP_DMM_WFULL \| \| | |
|     DepthIntraMode[ x0 ][ y0 ] = = INTRA_DEP_SDC_DMM_WFULL ) | |
|     wedge_full_tab_idx[ x0 ][ y0 ] | ae(v) |
|   else if( DepthIntraMode[ x0 ][ y0 ] = = INTRA_DEP_DMM_WPREDTEX ) | |
|     wedge_predtex_tab_idx[ x0 ][ y0 ] | ae(v) |
|   } else if( DepthIntraMode[ x0 ][ y0 ] = = INTRA_DEP_CHAIN ) { | |
|     edge_start_left_flag[ x0 ][ y0 ] | ae(v) |
|     edge_start_position[ x0 ][ y0 ] | ae(v) |
|     num_edge_codes_minus1[ x0 ][ y0 ] | ae(v) |
|     for( k = 0; k <= num_edge_codes_minus1; k++ ) | |
|       edge_code[ k ] | ae(v) |
|   } | |
|   if( DmmFlag[ x0 ][ y0 ] \| \| | |
|     *DepthIntraMode[ x0 ][ y0 ] = = INTRA_DEP_CHAIN \| \|* | |
|     *SdcFlag[ x0 ][ y0 ] ) {* | |
|     *dcNumSeg = ( DepthIntraMode[ x0 ][ y0 ] = =* | |
|     *INTRA_DEP_SDC_PLANAR ) ? 1 : 2* | |
|     [REMOVED: "dmm"] depth_dc_flag[ x0 ][ y0 ] | ae(v) |
|     if ( [REMOVED: "dmm"] depth_dc_flag[ x0 ][ y0 ] ) { | |
|       for( i = 0; i < [REMOVED: "2"] dcNumSeg; i ++ ) { | |
|         [REMOVED: "dmm"] depth_dc_abs[ x0 ][ y0 ][ i ] | ae(v) |
|         if ( dmm_dc_abs[ x0 ][ y0 ][ i ]) | |
|           [REMOVED: "dmm"] depth_dc_sign_flag[ x0 ][ y0 ][ i ] | ae(v) |
|         } | |
|       } | |
|     } | |
| REMOVED:   else if( DepthIntraMode[ x0 ][ y0 ] = = INTRA_DEP_CHAIN ) { | |
| REMOVED:     edge_dc_flag[ x0 ][ y0 ] | ae(v) |
| REMOVED:     if( edge_dc_flag[ x0 ][ y0 ] ) { | |
| REMOVED:       for( i = 0; i < 2; i++ ) { | |
| REMOVED:         edge_dc_abs[ x0 ][ y0 ][ i ] | ae(v) |
| REMOVED:         if( edge_dc_abs[ x0 ][ y0 ][ i ] != 0 ) | |
| REMOVED:           edge_dc_sign_flag[ x0 ][ y0 ][ i ] | ae(v) |

H.7.3.8.5.1 Depth mode parameter syntax

| | Descriptor |
|---|---|
| REMOVED:     } | |
| REMOVED:    } | |
| REMOVED:   } | |
| REMOVED:   else if( SdcFlag[ x0 ][ y0 ] ) { | |
| REMOVED:    sdcNumSegments = | |
| ( DepthIntraMode[ x0 ][ y0 ] = = INTRA_DEP_SDC_DMM_WFULL ) | |
| ? 2 : 1 | |
| REMOVED:    for( i = 0; i < sdcNumSegments; i++ ) { | |
| REMOVED:     sdc_residual_flag[ x0 ][ y0 ][ i ] | ae(v) |
| REMOVED:     if( sdc_residual_flag[ x0 ][ y0 ][ i ]) { | |
| REMOVED:      sdc_residual_sign_flag[ x0 ][ y0 ][ i ] | ae(v) |
| REMOVED:      sdc_residual_abs_minus1[ x0 ][ y0 ][ i ] | ae(v) |
| REMOVED:     } | |
| REMOVED:    } | |
| REMOVED:   } | |
| } | |

Semantics associated with the depth mode parameter syntax table presented above are defined as follows.

H.7.4.9.5.1 Depth Mode Parameter Semantics

The depth_dc_flag[x0][y0] equal to 1 specifies that depth_dc_abs[x0][y0][i] and depth_dc_sign_flag[x0][y0][i] are present. The depth_dc_flag[x0][y0] equal to 0 specifies that depth_dc_abs[x0][y0][i] and depth_dc_sign_flag[x0][y0][i] are not present and derived as 0. The depth dc_abs[x0][y0][i] is used to derive depth_dc_abs[x0][y0][i] as follows.

depth_dc_abs[x0][y0][i]+=(dcNumSeg==1?1:0)

The depth_dc_sign_flag[x0][y0][i] are used to derive DcOffet[x0][y0][i] as follows.

DcOffset[x0][y0][i]=(1−2*depth_dc_sign_flag[x0][y0][i])*depth_dc_abs[x0][y0][i]   (H-24)

[REMOVED: "The dmm_dc_flag[x0][y0] equal to 1 specifies that dmm_dc_abs[x0][y0][i] and dmm_dc_sign_flag[x0][y0][i] are present. The dmm_dc_flag[x0][y0] equal to 0 specifies that dmm_dc_abs[x0][y0][i] and dmm_dc_sign_flag[x0][y0][i] are not present. The dmm_dc_abs[x0][y0][i], dmm_dc_sign_flag[x0][y0][i] are used to derive DcOffset[x0][y0][i] as follows.

DcOffset[x0][y0][i]=(1−2*dmm_dc_sign_flag[x0][y0][i])*dmm_dc_abs[x0][y0][i]   (H-24)

The edge_dc_flag[x0][y0] equal to 1 specifies that edge_dc_abs[x0][y0][i] and edge_dc_sign_flag[x0][y0][i] are present. The edge_dc_flag[x0][y0] equal to 0 specifies that edge_dc_abs[x0][y0][i] and edge_dc_sign_flag[x0][y0][i] are not present. The edge_dc_abs[x0][y0][i], edge_dc_sign_flag[x0][y0][i] are used to derive DcOffset[x0][y0][i] as follows.

DcOffset[x0][y0][i]=(1−2*edge_dc_sign_flag[x0][y0][i])*edge_dc_abs[x0][y0][i]   (H-25)

The sdc_residual_flag[x0][y0][i] equal to 0 specifies that the residual is zero for segment i. The sdc_residual_flag equal to 1 specifies that the residual is non-zero and the sdc_residual_sign_flag and sdc_residual_abs[i] syntax elements are present for segment i. The sdc_residual_abs_minus1[x0][y0][i] and sdc_residual_sign_flag[x0][y0][i] are used to derive SdcResidual[x0][y0][i] for segment i as follows.

SdcResidual[x0][y0][i]=(1−2*sdc_residual_sign_flag[x0][y0][i])* (sdc_residual_mag_minus1[x0][y0][i]+1)   (H-26)"|

H.8.4.4.2.11 Depth Partition Value Derivation and Assignment Process

Inputs to this process are as follows.

the neighboring samples p[x][y], with x=−1, y=−1 . . . nTbS*2−1 and x=0 . . . nTbS*2−1, y=−1 a binary array partitionPattern[x][y], with x, y=0 . . . nTbS−1, specifying a partitioning of the prediction block in a partition 0 and a partition 1.

a variable nTbS specifying the transform block size a flag dcOffsetAvailFlag, specifying whether DC Offset values are available

[REMOVED: "a flag intraChainFlag, specifying whether the current intra prediction mode is equal to INTRA_CHAIN"]

the variables dcOffsetP0 and dcOffsetP1, specifying the DC offsets for the block partitions Output of this process is as follows.

the predicted samples predSamples[x][y], with x, y= 0 . . . nTbS−1

The variables vertEdgeFlag and horEdgeFlag are derived as specified in the following.

vertEdgeFlag=(partitionPattern[0][0]!=partitionPattern[nTbS−1][0])?1:0   (H-45)

horEdgeFlag=(partitionPattern[0][0]!=partitionPattern[0][nTbS−1])?1:0   (H-46)

The variables dcVal0 and dcVal1 are derived as specified in the following.

If vertEdgeFlag is equal to horEdgeFlag, the following applies:

dcValBR=horEdgeFlag?((p[−1][nTbS−1]+p[nTbS−1][−1])>>1): (1<<(BitDepth$_Y$−1))   (H-47)

dcValLT=(p[−1][0]+p[0][−1])>>1   (H-48)

Otherwise (horEdgeFlag is not equal to vertEdgeFlag), the following applies:

dcValBR=horEdgeFlag?p[−1][nTbS−1]: p[nTbS−1][−1]   (H-49)

dcValLT=horEdgeFlag?p[(nTbS−1)>>1][−1]: p[−1][(nTbS−1)>>1]   (H-50)

[REMOVED: "The variable dcOffsetScale is derived as follows:

dcOffsetScale=intraChainFlag?Clip3(1,(1<<BitDepth$_Y$−1, Round($2^{(QP'_Y/10)-2}$)):1   (H-51)"|

The predicted sample values predSamples[x][y] are derived as specified in the following.
For x in the range of 0 to (nTbS−1), inclusive the following applies:
For y in the range of 0 to (nTbS−1), inclusive the following applies:
The variables predDcVal and dcOffset are derived as specified in the following:

predDcVal=(partitionPattern[x][y]==partitionPattern
[0][0])?dcValLT:dcValBR    (H-52)

dcOffset=dcOffsetAvailFlag?(partitionPattern[x][y]==
0?dcOffsetP0:dcOffsetP1):0    (H-53)

[REMOVED: "dcOffset=dcOffset*dcOffsetScale    (H-54)"|

If [REMOVED: "intraChainFlag is equal to 1 or"] dlt_flag[nuh_layer_id] is equal to 0, the following applies:

predSamples[x][y]=predDcVal+dcOffset    (H-55)

Otherwise ([REMOVED: "intraChainFlag is equal to 0 and"| dlt_flag[nuh_layer_id] is equal to 1), the following applies:

predSamples[x][y]=Idx2DepthValue[DepthValue2Idx
[predDcVal]+dcOffset]    (H-56)

H.8.4.4.3 Depth Value Reconstruction Process

Inputs to this process are as follows.
a luma location (xTb, yTb) specifying the top-left luma sample of the current block relative to the top-left luma sample of the current picture
a variable nTbS specifying the transform block size
predicted samples predSamples[x][y], with x, y=0 . . . nTbS−1
the intra prediction mode predModeIntra
Output of this process is as follows.
reconstructed depth value samples resSamples[x][y], with x, y=0 . . . nTbS−1
Depending on predModeIntra the array wedgePattern[x][y] with x, y=0 . . . nTbS−1 specifying the binary segmentation pattern is derived as follows.
If predModeIntra is equal to INTRA_DMM_WFULL, the following applies.

wedgePattern=WedgePatternTable[Log 2(nTbS)]
[wedge_full_tab_idx[xTb][yTb]]

Otherwise (predModeIntra is not equal to INTRA_DMM_WFULL), the following applies:
For x, y=0 . . . nTbS−1 wedgePattern[x][y] is set equal to 0
Depending on dlt_flag[nuh_layer_id] the reconstructed depth value samples resSamples[x][y] are derived as specified in the following.
If dlt_flag[nuh_layer_id] is equal to 0, the following applies:

For x, y=0 . . . nTbS−1, the reconstructed depth value samples resSamples[x][y] are derived as specified in the following:

resSamples[x][y]=predSamples[x][y]+[REMOVED:
"SdcResidual"|DcOffset[xTb][yTb][wedgePattern[x][y]]    (H-59)

Otherwise (dlt_flag[nuh_layer_id] is equal to 1), the following applies:
The variables dcPred[0] and dcPred[1] are derived as specified in the following:
If predModeIntra is equal to INTRA_DC, the following applies:

dcPred[0]=predSamples[nTbS−1][nTbS−1]    (H-60)

Otherwise, if predModeIntra is equal to INTRA_PLANAR, the following applies:

dcPred[0]=(predSamples[0][0]+predSamples[0]
[nTbS−1]+predSamples[nTbS−1][0]+pred-
Samples[nTbS−1][nTbS−1]+2)>>2    (H-61)

Otherwise, (predModeIntra is equal to INTRA_DMM_WFULL), the following applies:

dcPred[wedgePattern[0][0]]=predSamples[0][0]    (H-62)

dcPred[wedgePattern[nTbS−1][0]]=predSamples
[nTbS−1][0]    (H-63)

dcPred[wedgePattern[0][nTbS−1]]=predSamples[0]
[nTbS−1]    (H-64)

dcPred[wedgePattern[nTbS−1][nTbS−1]]=pred-
Samples[nTbS−1][nTbS−1]    (H-65)

For x, y=0 . . . nTbS−1, the reconstructed depth value samples resSamples[x][y] are derived as specified in the following:

dltIdxPred=DepthValue2Idx[dcPred[wedgePattern[x]
[y]]]    (H-66)

dltIdxResi=[REMOVED: "SdcResidual"]DcOfJset
[xTb][yTb][wedgePattern[x][y]]    (H-67)

resSamples[x][y]=predSamples[x][y]+
Idx2DepthValue[dltIdxPred+dltIdxResi]−
dcPred[wedgePattern[x][y]]    (H-68)

H.9.3.2.2 Initialization Process for Context Variables

The specifications in subclause 9.3.2.2 apply with the following modifications.
All references to the process specified in subclauses 7.3.8.1 through 7.3.8.11 are replaced with references to the process specified in subclauses H.7.3.8.1 to H.7.3.8.11.
Table H-12 is appended to the end of Table 9-4.
Table H-13 to Table H-24 are appended to the end of the subclause.

TABLE H-12

Association of ctxIdx and syntax elements for each initialization Type in the initialization process

| Syntax structure | Syntax element | ctxTable | initType 0 | initType 1 | initType 2 |
|---|---|---|---|---|---|
| coding_unit( ) | depth_intra_mode | Table H-21 | 0..7 | 8..15 | 16..23 |
| depth_mode_parameters( ) | wedge_full_tab_idx | Table H-13 | 0 | 1 | 2 |
| | wedge_predtex_tab_idx | Table H-14 | 0 | 1 | 2 |
| | *depth*_dc_flag | Table H-22 | 0 | 1 | 2 |
| | *depth*_dc_abs | Table H-15 | 0 | 1 | 2 |
| | edge_code | Table H-16 | 0 | 1 | 2 |
| | iv_res_pred_weight_idx | Table H-17 | | 0..3 | 4..7 |
| | ic_flag | Table H-18 | | 0 | 1 |

TABLE H-12-continued

Association of ctxIdx and syntax elements for each initialization Type in the initialization process

| Syntax structure | Syntax element | ctxTable | initType 0 | initType 1 | initType 2 |
|---|---|---|---|---|---|
| | REMOVED: edge_dc_flag | Table H-23 | 0 | 1 | 2 |
| | REMOVED: edge_dc_abs | Table H-24 | 0 | 1 | 2 |
| | REMOVED: sdc_residual_flag | Table H-19 | 0 | 1 | 2 |
| | REMOVED: sdc_residual_abs_minus1 | prefix: Table H-20 suffix: na | prefix: 0 suffix: na | prefix: 1 suffix: na | prefix: 0 suffix: na |
| | inter_sdc_flag | Table H-25 | 0 | 1 | 2 |
| | inter_sdc_resi_abs_minus1 | Table H-26 | 0 | 1 | 2 |
| | inter_sdc_resi_sign_flag | Table H-27 | 0 | 1 | 2 |

[REMOVED: "Table H-19: Values of initValue for sdc_residual_flag ctxIdx"

| Initialization variable | ctxIdx of sdc_residual_flag | | |
|---|---|---|---|
| | 0 | 1 | 2 |
| initValue | 154 | 154 | 154 ]

[REMOVED: "Table H-20: Values of initValue for sdc_residual_abs_minus1 ctxIdx"

| Initialization variable | ctxIdx of sdc_residual_abs_minus1 | | |
|---|---|---|---|
| | 0 | 1 | 2 |
| initValue | prefix: 155 suffix : na | prefix: 155 suffix : na | prefix: 155 suffix : na ] |

TABLE H-21

Values of initValue for depth_intra_mode ctxIdx

| Initialization variable | ctxIdx of depth_intra_mode | | | | | | | |
|---|---|---|---|---|---|---|---|---|
| | 0 | 1 | 2 | 3 | 4 | 5 | 6 | 7 |
| initValue | 0 | 0 | 64 | 168 | 168 | 124 | 154 | 0 |
| | 8 | 9 | 10 | 11 | 12 | 13 | 14 | 15 |
| initValue | 0 | 64 | 0 | 183 | 154 | 108 | 0 | 0 |
| | 16 | 17 | 18 | 19 | 20 | 21 | 22 | 23 |
| initValue | 64 | 0 | 154 | 154 | 168 | 109 | 0 | 0 |

TABLE H-22

Values of initValue for depth_dc_flag ctxIdx

| Initialization variable | ctxIdx of dmm_dc_flag | | |
|---|---|---|---|
| | 0 | 1 | 2 |
| initValue | 0 | 0 | 64 |

[REMOVED: "Table H-23: Values of initValue for edge_dc_flag ctxIdx"

| Initialization variable | ctxIdx of edge_sdc_flag | | |
|---|---|---|---|
| | 0 | 1 | 2 |
| initValue | 154 | 154 | 154 ]

[REMOVED: "Table H-24: Values of initValue for edge_dc_abs ctxIdx"

| Initialization variable | ctxIdx of edge_dc_abs | | |
|---|---|---|---|
| | 0 | 1 | 2 |
| initValue | 154 | 154 | 154 ]

TABLE H-25

Values of initValue for inter_sdc_flag ctxIdx

| Initialization variable | ctxIdx of inter_dc_flag | | |
|---|---|---|---|
| | 0 | 1 | 2 |
| initValue | 154 | 154 | 154 |

TABLE H-26

Values of initValue for inter_sdc_resi_abs_minus1 ctxIdx

| Initialization variable | ctxIdx of inter_sdc_resi_abs_minus1 | | |
|---|---|---|---|
| | 0 | 1 | 2 |
| initValue | 154 | 154 | 154 |

TABLE H-27

Values of initValue for inter_sdc_resi_sign_flag ctxIdx

| Initialization variable | ctxIdx of inter_sdc_resi_sign_flag | | |
|---|---|---|---|
| | 0 | 1 | 2 |
| initValue | 154 | 154 | 154 |

H.9.3.3 Binarization process

H.9.3.3.1 General

The specifications in subclause 9.3.3.1 apply with the following modifications.
Table H-28 is appended to the end of Table 9-32.

TABLE H-28

Syntax elements and associated binarizations

| Syntax structure | Syntax element | Binarization Process | Input parameters |
|---|---|---|---|
| coding_unit( ) | iv_res_pred_weight_idx | TR | cMax = 2, cRiceParam = 0 |
| | ic_flag | FL | cMax = 1 |
| | iv_res_pred_weight_idx | TR | cMax = 2, cRiceParam = 0 |
| | inter_sdc_flag | FL | cMax = 1 |
| | inter_sdc_resi_abs_minus1 | UEG0 | [Ed. (GT) To be specified] |
| | inter_sdc_resi_sign_flag | FL | cMax = 1 |
| depth_mode_parameters( ) | depth_intra_mode_set_indication_flag | FL | cMax = 1 |
| | depth_intra_mode | TR | cMax = depthIntraModeMaxLen, cRiceParam = 0 |
| | wedge_full_tab_idx | FL | cMax = wedgeFullTabIdxBits[ log2PbSize ] (defined in Table H-29 ) |
| | wedge_predtex_tab_idx | FL | cMax = wedgePredTexTabIdxBits[ log2PbSize ] (defined in Table H-30) |
| | edge_start_left_flag [Ed. (GT) Missing! ] | | |
| | edge_start_position [Ed. (GT) Missing! ] | | |
| | num_edge_codes_minus1 [Ed. (GT) Missing! ] | | |
| | edge_code | TR | cMax = 6, cRiceParam = 0 |
| | depth_dc_flag | FL | cMax = 1 |
| | depth_dc_abs | UEG0 | [Ed. (GT) To be specified] |
| | depth_dc_sign_flag | FL | cMax = 1 |
| | REMOVED: edge_dc_flag | FL | cMax = 1 |
| | REMOVED: edge_dc_abs | FL | cMax = 1 |
| | REMOVED: edge_dc_sign_flag | FL | cMax = 1 |
| | REMOVED: sdc_residual_flag | FL | cMax = 1 |
| | REMOVED: sdc_residual_sign_flag | FL | cMax = 1 |
| | REMOVED: sdc_residual_abs_minus1 | H.9.3.3.10 | |

[REMOVED: "H.9.3.3.10 Binarization Process for sdc_residual_abs_minus1

Input to this process is a request for the a syntax element sdc_residual_abs_minus1.

Output of this process is the binarization of the syntax element.

The bin string is a concatenation of a prefix bin string and, when present, a suffix bin string.

The variable numDepthValues is derived as follows:

numDepthValues=dlt_flag[nuh_layer_id]?num_depth_values_in_dlt[nuh_layer_id]:(1<<BitDepth$_Y$)−1  (H-262)

The variable cMaxPrefix is derived as follows:

cMaxPrefix=(numDepthValues*3)>>2

For the derivation of the prefix bin string, the following applies:
If sdc_residual_abs_minus1 is less than cMaxPrefix, the prefix bin string is a bit string of length sdc_residual_abs_minus1+1 indexed by binIdx. The bins for binIdx less than sdc_residual_abs_minus1 are equal to 1. The bin with binIdx equal to sdc_residual_abs_minus1 is equal to 0.

Otherwise, the prefix bin string is a bit string of length cMaxPrefix with all bins being equal to 1.

When sdc_residual_abs_minus1 is greater than cMaxPrefix, the suffix of the bin string is present and it is derived as follows:

The suffix value suffixVal, is derived as follows:

suffixVal=sdc_residual_abs_minus1−cMaxPrefix  (H-263)

The suffix of the bin string is specified by Fixed-length (FL) binarization process as specified in subclause with suffixVal and cMax equal to (numDepthValues−cMaxPrefix) as the inputs."|

In one alternative, the syntax element depth_dc_flag may be binarized in a way that the only bin has a specific context depending on the number of partitions, as shown below.

H.9.3.4.2 Derivation Process for ctxTable, CtxIdx and bypassFlag

H.9.3.4.2.1 General

The specifications in subclause 9.3.4.2.1 apply with the following modifications:

Table H-31 is appended to the end of Table 9-37.

TABLE H-31

| | | binIdx | | | | | |
|---|---|---|---|---|---|---|---|
| | Syntax element | 0 | 1 | 2 | 3 | 4 | >=5 |
| | wedge_full_tab_idx | 0 | 0 | 0 | 0 | 0 | 0 |
| | depth_dc_flag | [REMOVED: "0"] dcNumSeg-1 | na | na | na | na | na |
| | depth_dc_abs | 0 | 0 | 0 | 0 | 0 | 0 |
| | depth_dc_sign_flag | bypass | 0 | 0 | 0 | 0 | 0 |
| REMOVED: | edge_dc_flag | 0 | na | na | na | na | na |
| REMOVED: | edge_dc_abs | 0 | 0 | 0 | 0 | 0 | 0 |
| REMOVED: | edge_dc_sign_flag | bypass | 0 | 0 | 0 | 0 | 0 |
| | edge_code | 0 | 0 | 0 | 0 | 0 | 0 |
| | res_pred_flag | 0 | na | na | na | na | na |
| | ic_flag | 0 | na | na | na | na | na |
| REMOVED: | sdc_residual_flag | bypass | na | na | na | na | na |
| REMOVED: | sdc_residual_abs_minus1 | prefix: 0 suffix: bypass | prefix: 0 suffix: bypass | prefix: 0 suffix: bypass | prefix: 0 suffix: bypass | prefix: 0 suffix: bypass | prefix: 0 suffix: bypass |
| | inter_sdc_flag | 0 | 0 | 0 | 0 | 0 | 0 |
| | inter_sdc_resi_abs_minus1 | 0 | 0 | 0 | 0 | 0 | 0 |
| | inter_sdc_resi_sign_flag | 0 | 0 | 0 | 0 | 0 | 0 |

Alternatively, the syntax element depth_dc_flag is binarized in a way that different partitions (first or second) share the same context, shown as below.

TABLE H-31

Assignment of ctxInc to syntax elements with context coded bins

| | binIdx | | | | | |
|---|---|---|---|---|---|---|
| Syntax element | 0 | 1 | 2 | 3 | 4 | >=5 |
| wedge_full_tab_idx | 0 | 0 | 0 | 0 | 0 | 0 |
| depth_dc_flag | 0 | na | na | na | na | na |

A fourth example of the techniques of this disclosure is similar to the third example described above. In the fourth example, however, filtering of neighboring reference samples used during intra prediction sample generation is removed for the DMM, the CCM and at least the sub-mode SDCM_DMM_1 of the SDC mode. As described above, the filtering is already disabled for DC intra prediction modes, including the sub-mode SDCM_DC. In some examples, the filtering may also be removed for the sub-mode SDCM_Planar of the SDC mode.

In this example, video encoder 20 generates residual values of depth data for 3D video data based on the original depth values of the video data and neighboring reference samples, without filtering the neighboring reference samples. Similarly, video decoder 30 reconstructs depth values of the video data based on received residual values of the depth data and neighboring reference samples, without filtering the neighboring reference samples.

Additions to the 3D-HEVC standard are italicized below, and deletions from the 3D-HEVC standard are indicated using the preceding term "REMOVED:" followed by the deleted text.

H.8.4.4.2.3 Filtering Process of Neighboring Samples
[REMOVED: "The specifications in subclause 8.4.4.2.3 apply."]
Inputs to this process are as follows.
  the neighboring samples p[x][y], with x=-1, y=-1 . . . nTbS*2-1 and x=0 . . . nTbS*2-1, y=-1
  a variable nTbS specifying the transform block size Outputs of this process are the filtered samples pF[x][y], with x=-1, y=-1 . . . nTbS*2-1 and x=0 . . . nTbS*2-1, y=-1.
  The variable filterFlag is derived as follows.
  If one or more of the following conditions are true, filterFlag is set equal to 0:
    predModeIntra is equal to INTRA_DC.
    predModeIntra is larger than INTRA_ANGULAR34.
    nTbS is equal 4.
  Otherwise, the following applies:
    The variable minDistVerHor is set equal to Min(Abs(predModeIntra−26), Abs(predModeIntra−10)).
    The variable intraHorVerDistThres[nTbS] is specified in Table 8-3.
    The variable filterFlag is derived as follows:
      If minDistVerHor is greater than intraHorVerDistThres[nTbS], filterFlag is set equal to 1.
      Otherwise, filterFlag is set equal to 0.

TABLE 8-3

Specification of intraHorVerDistThres[nTbS] for various transform block sizes

| | nTbS = 8 | nTbS = 16 | nTbS = 32 |
|---|---|---|---|
| intraHorVerDistThres[nTbS] | 7 | 1 | 0 |

When the syntax element filterFlag is equal to 1, the following applies.
  The variable biIntFlag is derived as follows:
    If all of the following conditions are true, biIntFlag is set equal to 1:
      strong_intra_smoothing_enabled_flag is equal to 1
      nTbS is equal to 32
      Abs(p[−1][−1]+p[nTbS*2−1][−1]−2*p[nTbS−1][−1])<(1<<(BitDepth$_Y$−5))
      Abs(p[−1][−1]+p[−1][nTbS*2−1]−2*p[−1][nTbS−1])<(1<<(BitDepth$_Y$−5))
    Otherwise, biIntFlag is set equal to 0.
  The filtering is performed as follows:
    If biIntFlag is equal to 1, the filtered sample values pF[x][y] with x=−1, y=−1 . . . 63 and x=0 . . . 63, y=−1 are derived as follows:

[1] pF[−1][−1]=p[−1][−1]  (8-30)

[2] pF[−1][y]=((63−y)*p[−1][−1]+(y+1)*p[−1][63]+32)>>6 for y=0 . . . 62  (8-31)

[3] pF[−1][63]=p[−1][63]  (8-32)

[4] pF[x][−1]=((63−x)*p[−1][−1]+(x+1)*p[63][−1]+32)>>6 for x=0 . . . 62  (8-33)

pF[63][−1]=p[63][−1]  (8-34)

Otherwise (biIntFlag is equal to 0), the filtered sample values pF[x][y] with x=−1, y=−1 . . . nTbS*2−1 and x=0 . . . nTbS*2−1, y=−1 are derived as follows:

[6] pF[−1][−1]=(p[−1][0]+2*p[−1][−1]+p[0][−1]+2)>>2  (8-35)

[7] pF[−1][y]=(p[−1][y+1]+2*p[−1][y]+p[−1][y−1]+2)>>2 for y=0 . . . nTbS*2−2  (8-36)

[8] pF[−1][nTbS*2−1]=p[−1][nTbS*2−1]  (8-37)

[9] pF[x][−1]=(p[x−1][−1]+2*p[x][−1]+p[x+1][−1]+2)>>2 for x=0 . . . nTbS*2−2  (8-38)

[10] pF[nTbS*2−1][−1]=p[nTbS*2−1][−1]  (8-39)

Figure 10:
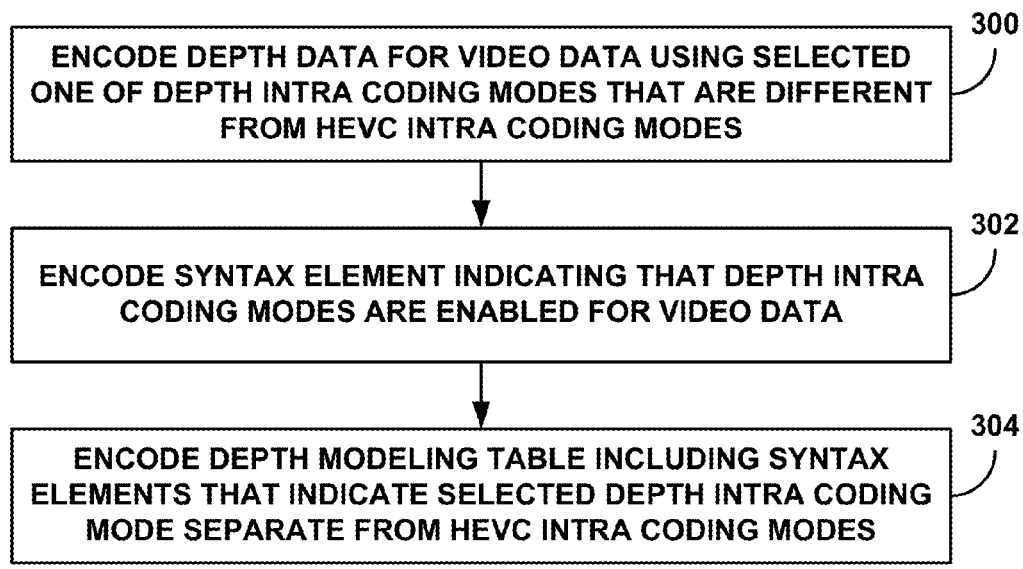
FIG. 10 is a flowchart illustrating an example operation of a video encoder indicating depth intra coding modes used to encode depth data for 3D video data in a depth modeling table.

FIG. 10 is a flowchart illustrating an example operation of a video encoder indicating depth intra modes used to encode depth data for 3D video data in a depth modeling table. The example operation is described with respect to video encoder 20 from FIGS. 1 and 2. Video encoder 20 generates a video bitstream that represents at least a portion of encoded video data. In this example, the video data comprises 3D video data represented in a multiview plus depth format in which texture data and corresponding depth data is coded according to the 3D-HEVC process. The depth data of the video data may be a depth map that represents the depth data for the corresponding texture data of the video data.

According to the techniques of this disclosure, video encoder 20 encodes depth data for the video data using a selected one of a plurality of depth intra coding modes that are different from HEVC intra coding modes (300). The depth intra coding modes may include at least two of a DMM, a SDC mode, and a CCM. Video encoder 20 may generate residual values of the predicted depth data according to the selected depth intra coding mode based on original depth values of the video data and neighboring reference samples. Video encoder 20 then encodes a syntax element indicating that the depth intra modes are enabled for the video data (302). The syntax element may be a depth mode flag in which a first value of the flag indicates that at least one of the depth intra coding modes is enabled, and a second value of the flag indicates that none of the depth intra coding modes are enabled. In other examples, the syntax element may be a depth mode flag in which a first value of the flag indicates that all of the depth intra coding modes are enabled, and a second value of the flag indicates that none of the depth intra coding modes are enabled.

Based on the syntax element indicating that the depth intra coding modes are enabled, video encoder 20 further encodes a depth modeling table including syntax elements that indicate the selected one of the depth intra coding modes separate from syntax elements for the HEVC intra coding modes (304). For example, the depth modeling table may include one or more syntax elements that indicate a specific depth intra coding mode used for encoding the depth data, such as one of the sub-modes of the DMM, one of the sub-modes of the SDC mode, or the CCM. In some examples, the CCM and/or at least one of the DMM sub-modes may be defined as HEVC intra coding modes and, therefore, not included in the depth modeling table.

In addition, the depth modeling table may include a set of syntax elements that indicates residual information of the depth data for the specified depth intra coding mode. The set of syntax elements may include syntax elements that indicate whether residual values of the depth data are present and, if present, an absolute value and a sign of the residual values of the depth data. In some examples, the same set of syntax elements may indicate residual information for any of the plurality of depth intra coding modes.

In the case where the depth data is encoded using one of the HEVC intra coding modes that is different than the depth intra coding modes and the syntax element indicates that none of the depth intra modes are enabled, video encoder 20 does not encode or transmit the depth modeling table. Instead, in that case, video encoder 20 encodes one or more syntax elements that indicate the one of the HEVC intra coding modes. For example, the indicated HEVC intra coding mode may be a HEVC intra coding mode or a HEVC I_PCM mode. In some examples, the indicated HEVC intra coding mode may be a sub-mode of the DDM or the CCM defined as a HEVC intra coding mode. In the case of the CCM being defined as a HEVC intra coding mode, syntax elements for the CCM are not included in the depth modeling table, but instead may be included in a separate chain coding table.

Figure 11:
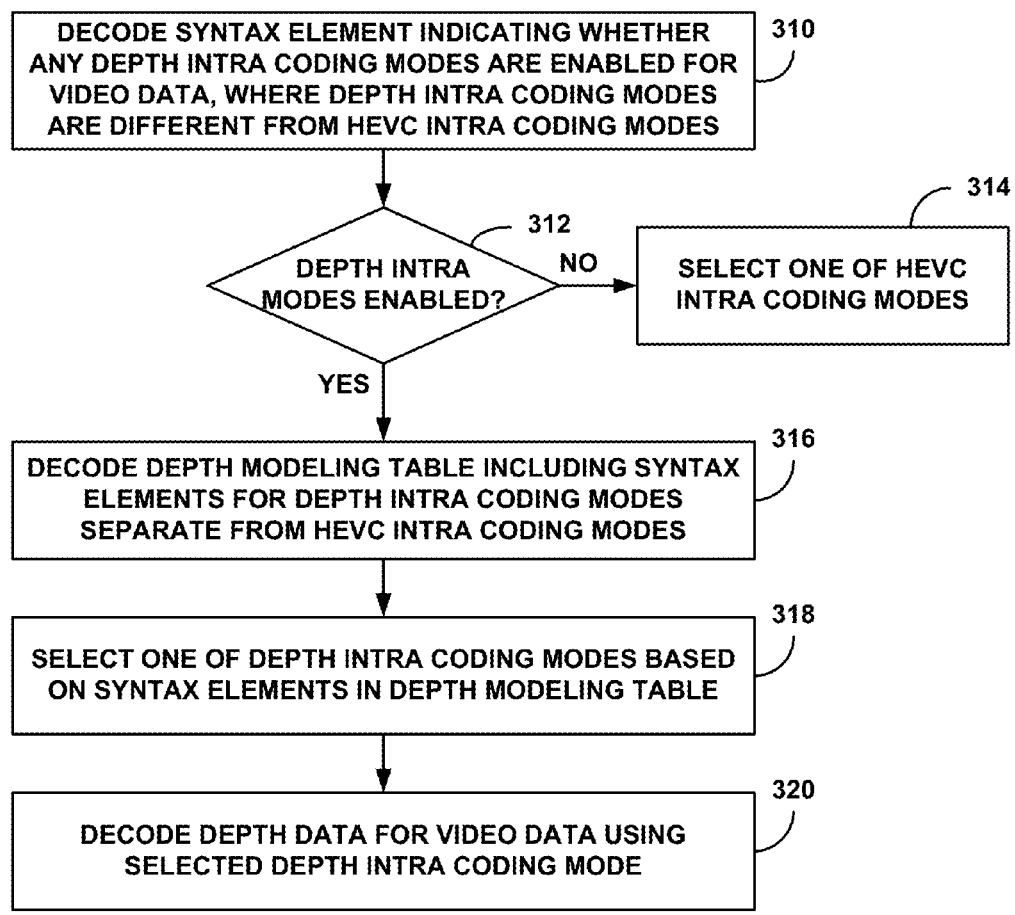
FIG. 11 is a flowchart illustrating an example operation of a video decoder determining depth intra coding modes used to decode depth data for 3D video data from a depth modeling table.

FIG. 11 is a flowchart illustrating an example operation of a video decoder selecting a depth intra coding mode to decode depth data for 3D video data from a depth modeling table. The example operation is described with respect to video decoder 30 from FIGS. 1 and 3. Video decoder 30 receives a video bitstream that represents at least a portion of encoded video data. In this example, the video data comprises 3D video data represented in a multiview plus depth format in which texture data and corresponding depth data is coded according to the 3D-HEVC process. The depth data of the video data may be a depth map that represents the depth data for the corresponding texture data of the video data.

According to the techniques of this disclosure, video decoder 30 decodes a syntax element from the bitstream indicating whether any of a plurality of depth intra coding modes are enabled for the video data, where the depth intra coding modes are different from the HEVC intra coding modes (310). The depth intra coding modes may include at least two of a DMM, a SDC mode, and a CCM. The syntax element may be a depth mode flag in which a first value of the flag indicates that at least one of the depth intra coding modes is enabled, and a second value of the flag indicates that none of the depth intra coding modes are enabled. In other examples, the syntax element may be a depth mode flag in which a first value of the flag indicates that all of the depth intra coding modes are enabled, and a second value of the flag indicates that none of the depth intra coding modes are enabled. After decoding the syntax element indicating that the depth intra coding modes are enabled (YES branch of 312), video decoder 30 also decodes a depth modeling table including syntax elements for the depth intra coding modes separate from syntax elements for the HEVC intra coding modes (316).

In the case where the syntax element indicates that none of the depth intra modes are enabled (NO branch of 312), video decoder 30 does not decode the depth modeling table. Instead, in that case, video decoder 30 selects one of the HEVC intra coding modes that is different than the depth intra coding modes (314). The selected HEVC intra coding mode may be a HEVC intra coding mode or a HEVC I_PCM mode. In some examples, the selected HEVC intra coding mode may be a sub-mode of the DMM or the CCM defined as a HEVC intra coding mode. In the case of the CCM defined as a HEVC intra coding mode, syntax elements for the CCM are not included in the depth modeling table, but instead may be included in a separate chain coding table.

When the depth intra coding modes are enabled for the video data and video decoder 30 decodes the depth modeling table (YES branch of 312, 316), video decoder 30 selects one of the depth intra coding modes based on syntax elements in the depth modeling table (318). For example, the depth modeling table may include one or more syntax elements that indicate a specific depth intra coding mode for decoding the depth data, such as one of the sub-modes of the DMM, one of the sub-modes of the SDC mode, or the CCM. In some examples, the CCM and/or at least one of the DMM sub-modes may be defined as HEVC intra coding modes and, therefore, not included in the depth modeling table.

In addition, the depth modeling table may include a set of syntax elements that indicates residual information of the depth data for the specified depth intra coding mode. The set of syntax elements may include syntax elements that indicate whether residual values of the depth data are present and, if present, an absolute value and a sign of the residual values of the depth data. In some examples, the same set of syntax elements may indicate residual information for any of the plurality of depth intra coding modes.

Video decoder 30 then decodes depth data for the video data using the selected depth intra coding mode (320). For example, video decoder 30 may reconstruct depth values of the video data according to the selected depth intra coding mode based on the residual values of the depth data and neighboring reference samples. The reconstructed depth values of the video data may then be stored or used to present the 3D video data on a display device.

Figure 12:
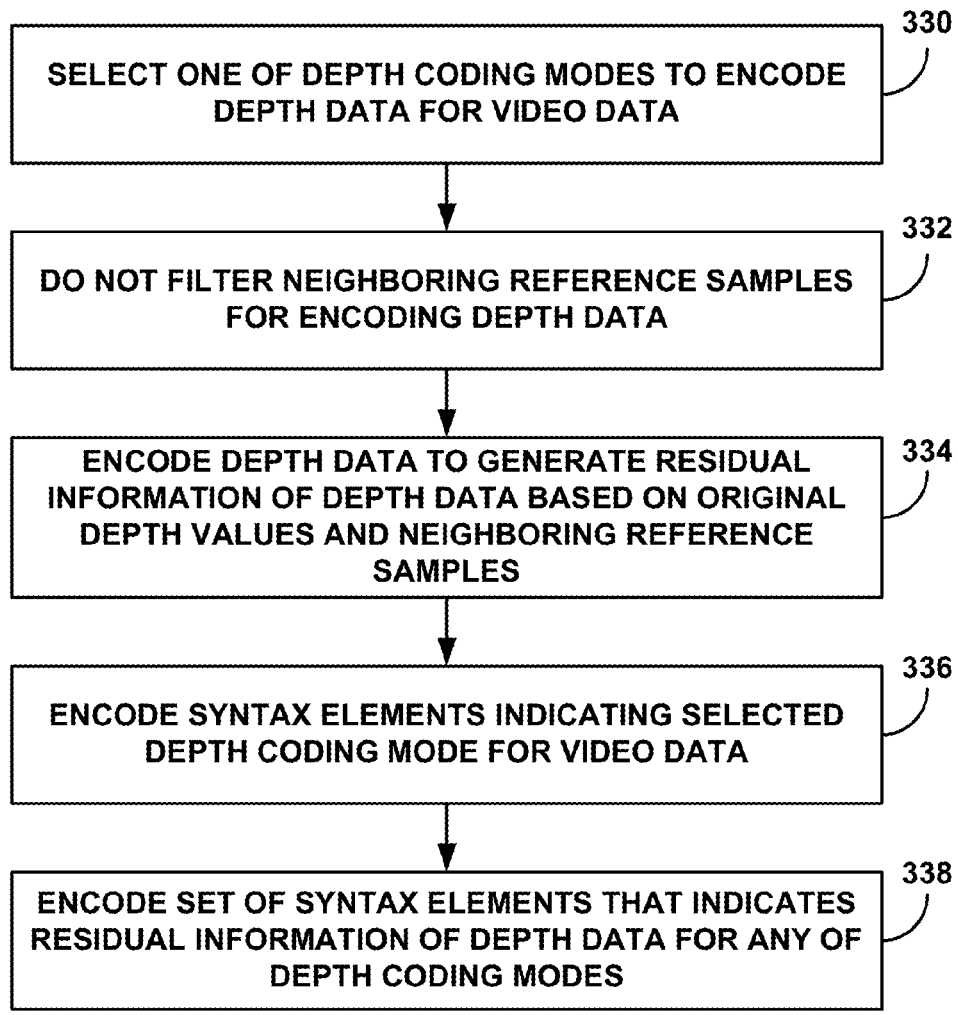
FIG. 12 is a flowchart illustrating an example operation of a video encoder indicating residual information of depth data for 3D video data using mechanisms unified for two or more depth coding modes.

FIG. 12 is a flowchart illustrating an example operation of a video encoder indicating residual information of depth data for 3D video data using mechanisms unified for two or more depth coding modes. The example operation is described with respect to video encoder 20 from FIGS. 1 and 2. Video encoder 20 generates a video bitstream that represents at least a portion of encoded video data. In this example, the video data comprises 3D video data represented in a multiview plus depth format in which texture data and corresponding depth data is coded according to the 3D-HEVC process. The depth data of the video data may be a depth map that represents the depth data for the corresponding texture data of the video data.

Video encoder 20 selects one of a plurality of depth coding modes for encoding depth data for the video data (330). The depth coding modes may be depth intra coding modes including at least two of a DMM, a SDC mode, and a CCM. In other examples, the depth coding modes may include both depth intra coding modes and a depth inter coding mode. In that case, the depth coding modes may include at least two of the DMM, the SDC mode, an Inter SDC mode, and the CCM.

According to the techniques of this disclosure, video decoder 30 may not filter neighboring reference samples prior to encoding the depth data according to the selected depth coding mode (332). In some cases, filtering of the neighboring reference samples may be disabled for any of the depth intra coding modes. In other cases, filtering of the neighboring references samples may be disabled for the DDM, the CCM, and at least the sub-modes SDCM_DC and SDCM_DMM_1 of the SDC mode. Video encoder 20 then encodes the depth data for the video data using the selected depth coding mode to generate residual information of the predicted depth data based on original depth values of the video data and neighboring reference samples (334).

Video encoder 20 encodes one or more syntax elements indicating the selected depth coding mode for the video data (336). In some examples, video encoding 20 may encode different syntax elements to indicate each of the different depth coding modes. In other examples, video encoder 20 may encode a syntax element indicating that the depth intra modes are enabled for the video data. When the syntax element indicates that the depth intra coding modes are enabled, video encoder 20 may further encode a depth modeling table including the one or more syntax elements indicating the selected one of the depth intra coding modes separate from syntax for the HEVC intra coding modes.

According to the techniques of this disclosure, video encoder 20 then encodes a set of syntax elements that indicates the residual information of the depth data for the video data where the same set of syntax elements indicates residual information for any of the plurality of depth coding modes (338). For example, the set of syntax elements may indicate at least one residual value for each coding partition of the depth data for any of the depth coding modes. The set of syntax elements may be shared between as least two of the DMM, the SDC mode, the Inter SDC mode, and the CCM.

Video encoder 20 may select context models for the set of syntax elements that indicates residual information for any of the depth coding modes from a single set of context models using a single context model selection method. For example, only one context model may be required for each of the syntax elements that are shared across two or more of the depth coding modes. In this way, the same set of context models, e.g., one for each of the shared syntax elements, may be applied to any of the depth coding modes.

The set of syntax elements that indicates residual information of the depth data may include a syntax element that indicates whether residual values of the depth data are present for any of the depth coding modes. For example, in cases where the set of syntax elements indicates residual information for any of the depth intra coding modes, video encoder 20 may select a context model for the syntax element that indicates whether residual values of the depth data are present based on a number of coding partitions applied for a current PU of the depth data. In other cases where the set of syntax elements indicates residual information for the Inter SDC mode, video encoder 20 may select the context model for the syntax element that indicates whether residual values of the depth data are present based on a number of coding partitions for a current CU of the depth data.

In addition, the set of syntax elements may include syntax elements that indicate an absolute value and a sign of the residual values of the depth data for any of the depth coding modes. For example, video encoder 20 may binarize the syntax elements that indicate the absolute value and the sign of residual values of the depth data using a single binarization method for any of the depth coding modes, including the depth intra coding modes and the depth inter coding mode. The single binarization method may be one of the binarization methods conventionally used for the DMM, the SDC mode or the CCM.

Figure 13:
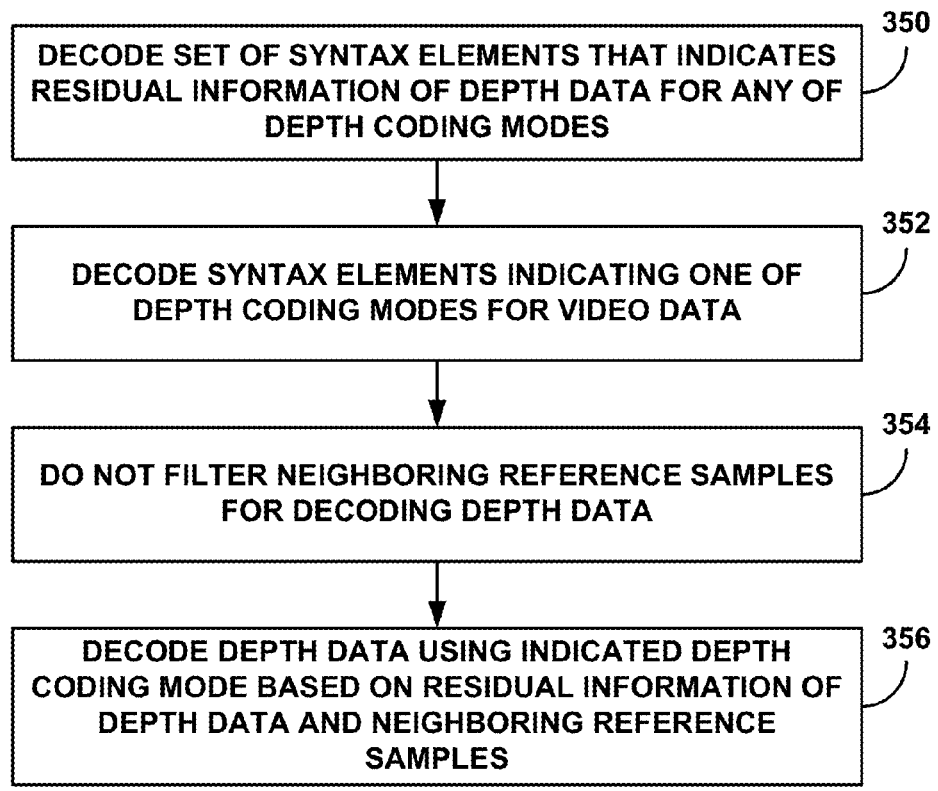
FIG. 13 is a flowchart illustrating an example operation of a video decoder determining residual information of depth data for 3D video data using mechanisms unified for two or more depth coding modes.

FIG. 13 is a flowchart illustrating an example operation of a video decoder determining residual information of depth data for 3D video data using mechanisms unified for two or more depth coding modes. The example operation is described with respect to video decoder 30 from FIGS. 1 and 3. Video decoder 30 receives a video bitstream that represents at least a portion of encoded video data. In this example, the video data comprises 3D video data represented in a multiview plus depth format in which texture data and corresponding depth data is coded according to the 3D-HEVC process. The depth data of the video data may be a depth map that represents the depth data for the corresponding texture data of the video data.

According to the techniques of this disclosure, video decoder 30 decodes a set of syntax elements from the bitstream that indicates residual information of depth data for the video data where the same set of syntax elements indicates residual information for any of a plurality of depth coding modes (350). For example, the set of syntax elements may indicate at least one residual value for each coding partition of the depth data for any of the depth coding modes. The depth coding modes may be depth intra coding modes including at least two of a DMM, a SDC mode, and a CCM. In other examples, the depth coding modes may include both depth intra coding modes and a depth inter coding mode. In that case, the depth coding modes may include at least two of the DMM, the SDC mode, an Inter SDC mode, and the CCM.

Video decoder 30 may select context models for the set of syntax elements that indicates residual information for any of the depth coding modes from a single set of context models using a single context model selection method. For example, only one context model may be required for each of the syntax elements that are shared across two or more of the depth coding modes. In this way, the same set of context models, e.g., one for each of the shared syntax elements, may be applied to any of the depth coding modes.

The set of syntax elements that indicates residual information of the depth data may include a syntax element that indicates whether residual values of the depth data are present for any of the depth coding modes. For example, in cases where the set of syntax elements indicates residual information for any of the depth intra coding modes, video decoder 30 may select a context model for the syntax element that indicates whether residual values of the depth data are present based on a number of coding partitions applied for a current PU of the depth data. In other cases where the set of syntax elements indicates residual information for the Inter SDC mode, video decoder 30 may select the context model for the syntax element that indicates whether residual values of the depth data are present based on a number of coding partitions for a current CU of the depth data.

In addition, the set of syntax elements may include syntax elements that indicate an absolute value and a sign of the residual values of the depth data for any of the depth coding modes. For example, video decoder 30 may debinarize the syntax elements that indicate the absolute value and the sign of residual values of the depth data using a single binarization method for any of the depth coding modes, including the depth intra coding modes and the depth inter coding mode. The single binarization method may be one of the binarization methods conventionally used for the DMM, the SDC mode or the CCM.

Video decoder 30 also decodes one or more syntax elements from the bitstream indicating one of the depth coding modes for the video data (352). In some examples, video decoder 30 may decode different syntax elements to indicate each of the different depth coding modes. In other examples, video decoder 30 may decode a syntax element indicating whether any of the depth intra coding modes are enabled for the video data. After decoding the syntax element indicating that the depth intra coding modes are enabled, video decoder 30 may also decode a depth modeling table including the one or more syntax elements indicating the one of the depth intra coding modes separate from syntax elements for the HEVC intra coding modes.

According to the techniques of this disclosure, video decoder 30 may not filter neighboring reference samples prior to decoding the depth data according to the indicated depth coding mode (354). In some cases, filtering of the neighboring reference samples may be disabled for any of the depth intra coding modes. In other cases, filtering of the neighboring references samples may be disabled for the DDM, the CCM, and at least the sub-modes SDCM_DC and SDCM_DMM_1 of the SDC mode. Video decoder 30 then decodes depth data for the video data using the indicated depth coding mode to reconstruct depth values of the video data based on the residual information of the depth data and the neighboring reference samples (356). The reconstructed depth values of the video data may then be stored or used to present the 3D video data on a display device.

The techniques described above may be performed by video encoder 20 (FIGS. 1 and 2) and/or video decoder 30 (FIGS. 1 and 3), both of which may be generally referred to as a video coder. In addition, video coding may generally refer to video encoding and/or video decoding, as applicable. While the techniques of this disclosure are generally described with respect to 3D-HEVC, the techniques are not limited in this way. The techniques described above may also be applicable to other current standards or future standards not yet developed.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium and packaging materials.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of decoding video data, the method comprising:
   storing the video data in a memory;
   decoding, by one or more processors, a syntax element that indicates whether all or none of a plurality of depth intra coding modes are enabled for the video data, wherein the depth intra coding modes are different from high-efficiency video coding (HEVC) intra coding modes;
   after decoding the syntax element and based on the syntax element indicating that all of the depth intra coding modes are enabled, decoding, by the one or more processors, a depth modeling table that includes syntax elements for the depth intra coding modes, wherein the depth modeling table is separate from a syntax table that includes syntax elements for the HEVC intra coding modes;
   selecting, by the one or more processors, one of the depth intra coding modes based on one or more syntax elements in the depth modeling table; and
   decoding, by one or more processors, depth data for the video data using the selected depth intra coding mode.

2. The method of claim 1, wherein the depth intra coding modes include at least two of a depth modeling mode (DMM), a simplified depth coding (SDC) mode, or a chain coding mode (CCM).

3. The method of claim 2, wherein the depth intra coding modes include at least one sub-mode of the DMM and at least three sub-modes of the SDC mode.

4. The method of claim 1, wherein the one or more syntax elements in the depth modeling table indicate one of a sub-mode of a depth modeling mode (DMM), a sub-mode of a simplified depth coding (SDC) mode, or a chain coding mode (CCM) for decoding the depth data.

5. The method of claim 1, wherein the depth modeling table includes a set of syntax elements that indicates residual information of the depth data for the selected depth intra coding mode, wherein the set of syntax elements includes syntax elements that indicate whether residual values of the depth data are present and, if the residual values of the depth data are present, the set of syntax elements further includes syntax elements that indicate an absolute value and a sign of the residual values of the depth data.

6. The method of claim 5, wherein the same set of syntax elements indicates residual information for any of the depth intra coding modes.

7. The method of claim 5, wherein decoding the depth data comprises reconstructing depth values of the video data according to the selected depth intra coding mode based on the residual values of the depth data and neighboring reference samples, without filtering the neighboring reference samples.

8. The method of claim 1, wherein the HEVC intra coding modes that are different from the depth intra coding modes include one or more of a HEVC intra coding mode, a HEVC intra pulse code modulation (I_PCM) mode, a sub-mode of a depth modeling mode (DMM) defined as a HEVC intra coding mode, or a chain coding mode (CCM) defined as a HEVC intra coding mode.

9. The method of claim 1, wherein the syntax element that indicates whether all or none of the depth intra coding modes are enabled is included in one of a video parameter set (VPS), a sequence parameter set (SPS) or a picture parameter set (PPS) of the video data.

10. The method of claim 1, wherein decoding the depth modeling table comprises decoding the depth modeling table at one of a coding unit (CU) level or a prediction unit (PU) level of the video data.

11. A video decoding device comprising:
   a memory configured to store video data; and
   one or more processors configured to:
      decode a syntax element that indicates whether all or none of a plurality of depth intra coding modes are enabled, wherein the depth intra coding modes are different from high-efficiency video coding (HEVC) intra coding modes, after decoding the syntax element and based on the syntax element indicating that all of the depth intra coding modes are enabled for the video data, decode a depth modeling table that includes syntax elements for the depth intra coding modes, wherein the depth modeling table is separate from a syntax table that includes syntax elements for the HEVC intra coding modes, select one of the depth intra coding modes based on one or more syntax elements in the depth modeling table, and decode depth data for the video data using the selected depth intra coding mode.

12. The device of claim 11, wherein the depth intra coding modes include at least two of a depth modeling mode (DMM), a simplified depth coding (SDC) mode, or a chain coding mode (CCM).

13. The device of claim 12, wherein the depth intra coding modes include at least one sub-mode of the DMM and at least three sub-modes of the SDC mode.

14. The device of claim 11, wherein the one or more syntax elements in the depth modeling table indicate one of a sub-mode of a depth modeling mode (DMM), a sub-mode of a simplified depth coding (SDC) mode, or a chain coding mode (CCM) for decoding the depth data.

15. The device of claim 11, wherein the depth modeling table includes a set of syntax elements that indicates residual information of the depth data for the selected depth intra coding mode, wherein the set of syntax elements includes syntax elements that indicate whether residual values of the depth data are present and, if the residual values of the depth data are present, the set of syntax elements further includes syntax elements that indicate an absolute value and a sign of the residual values of the depth data.

16. The device of claim 15, wherein the same set of syntax elements indicates residual information for any of the depth intra coding modes.

17. The device of claim 15, wherein the one or more processors are further configured to reconstruct depth values of the video data according to the selected depth intra coding mode based on the residual values of the depth data and neighboring reference samples, without filtering the neighboring reference samples.

18. The device of claim 11, wherein the HEVC intra coding modes that are different from the depth intra coding modes include one or more of a HEVC intra coding mode, a HEVC intra pulse code modulation (I_PCM) mode, a sub-mode of a depth modeling mode (DMM) defined as a HEVC intra coding mode, or a chain coding mode (CCM) defined as a HEVC intra coding mode.

19. The device of claim 11, wherein, after decoding the syntax element indicating that none of the depth intra coding modes are enabled for the video data, the one or more processors are further configured to select one of the HEVC intra coding modes that is different from the depth intra coding modes, without decoding the depth modeling table, and decode the depth data for the video data using the selected HEVC intra coding mode.

20. The device of claim 19, wherein the selected HEVC intra coding mode includes a chain coding mode (CCM) defined as a HEVC intra coding mode, and wherein the one or more processors are further configured to decode a chain coding table that includes one or more syntax elements that indicate residual information of the depth data for the CCM.

21. The device of claim 11, wherein the syntax element that indicates whether all or none of the depth intra coding modes are enabled is included in one of a video parameter set (VPS), a sequence parameter set (SPS) or a picture parameter set (PPS) of the video data.

22. The device of claim 11, wherein the one or more processors are further configured to decode the depth modeling table at one of a coding unit (CU) level or a prediction unit (PU) level of the video data.

23. A video decoding device comprising:
means for decoding a syntax element that indicates whether all or none of a plurality of depth intra coding modes are enabled for the video data, wherein the depth intra coding modes are different from high-efficiency video coding (HEVC) intra coding modes;

after decoding the syntax element and based on the syntax element indicating that all of the depth intra coding modes are enabled, means for decoding a depth modeling table that includes syntax elements for the depth intra coding modes, wherein the depth modeling table is separate from a syntax table that includes syntax elements for the HEVC intra coding modes;

means for selecting one of the depth intra coding modes based on one or more syntax elements in the depth modeling table; and means for decoding depth data for the video data using the selected depth intra coding mode.

24. A non-transitory computer-readable medium comprising instructions for decoding video data that when executed cause one or more processors to:

decode a syntax element that indicates whether all or none of a plurality of depth intra coding modes are enabled for the video data, wherein the depth intra coding modes are different from high-efficiency video coding (HEVC) intra coding modes;

after decoding the syntax element and based on the syntax element indicating that all of the depth intra coding modes are enabled, decode a depth modeling table that includes syntax elements for the depth intra coding modes, wherein the depth modeling table is separate from a syntax table that includes syntax elements for the HEVC intra coding modes;

select one of the depth intra coding modes based on one or more syntax elements in the depth modeling table; and decode depth data for the video data using the selected depth intra coding mode.

25. A method of encoding video data, the method comprising:
storing the video data in a memory;
encoding, by one or more processors, depth data for the video data using a selected one of a plurality of depth intra coding modes, wherein the depth intra coding modes are different from high-efficiency video coding (HEVC) intra coding modes;
encoding, by the one or more processors, a syntax element indicating that all of the depth intra coding modes are enabled for the video data; and
encoding, by the one or more processors, a depth modeling table that includes syntax elements for the depth intra coding modes including one or more syntax elements that indicate the selected depth intra coding mode, wherein the depth modeling table is separate from a syntax table that includes syntax elements for the HEVC intra coding modes.

26. The method of claim 25, wherein the depth intra coding modes include at least two of a depth modeling mode (DMM), a simplified depth coding (SDC) mode, or a chain coding mode (CCM).

27. The method of claim 26, wherein the depth intra coding modes include at least one sub-mode of the DMM and at least three sub-modes of the SDC mode.

28. The method of claim 25, wherein the one or more syntax elements in the depth modeling table indicate one of a sub-mode of a depth modeling mode (DMM), a sub-mode of a simplified depth coding (SDC) mode, or a chain coding mode (CCM) used to encode the depth data.

29. The method of claim 25, wherein the depth modeling table includes a set of syntax elements that indicates residual information of the depth data for the selected depth intra coding mode, wherein the set of syntax elements includes syntax elements that indicate whether residual values of the depth data are present and, if the residual values of the depth data are present, the set of syntax elements further includes syntax elements that indicate an absolute value and a sign of the residual values of the depth data.

30. The method of claim 29, wherein the same set of syntax elements is configured to indicate residual information for any of the depth intra coding modes.

31. The method of claim 29, wherein encoding the depth data comprises generating the residual values of the depth data according to the selected depth intra coding mode based on original depth values of the video data and neighboring reference samples, without filtering the neighboring reference sample.

32. The method of claim 25, wherein the syntax element is configured to indicate that all of the depth intra coding modes are enabled for the video data or that none of the depth intra coding modes are enabled for the video data.

33. The method of claim 25, wherein encoding the syntax element indicating that all of the depth intra coding modes are enabled comprises encoding the syntax element in one of a video parameter set (VPS), a sequence parameter set (SPS) or a picture parameter set (PPS) of the video data.

34. The method of claim 25, wherein encoding the depth modeling table comprises encoding the depth modeling table at one of a coding unit (CU) level or a prediction unit (PU) level of the video data.

35. A video encoding device comprising:
a memory configured to store video data; and
one or more processors configured to:
encode depth data for the video data using a selected one of a plurality of depth intra coding modes, wherein the depth intra coding modes are different from high-efficiency video coding (HEVC) intra coding modes;
encode a syntax element indicating that all of the plurality of depth intra coding modes are enabled for the video data; and
encode a depth modeling table that includes syntax elements for the depth intra coding modes including one or more syntax elements that indicate the selected depth intra coding mode, wherein the depth modeling table is separate from a syntax table that includes syntax elements for the HEVC intra coding modes.

36. The device of claim 35, wherein the depth intra coding modes include at least two of a depth modeling mode (DMM), a simplified depth coding (SDC) mode, or a chain coding mode (CCM).

37. The device of claim 36, wherein the depth intra coding modes include at least one sub-mode of the DMM and at least three sub-modes of the SDC mode.

38. The device of claim 35, wherein the one or more syntax elements in the depth modeling table indicate one of a sub-mode of a depth modeling mode (DMM), a sub-mode of a simplified depth coding (SDC) mode, or a chain coding mode (CCM) used to encode the depth data.

39. The device of claim 35, wherein the depth modeling table includes a set of syntax elements that indicates residual information of the depth data for the selected depth intra coding mode, wherein the set of syntax elements includes syntax elements that indicate whether residual values of the depth data are present and, if the residual values of the depth data are present, the set of syntax elements further includes syntax elements that indicate an absolute value and a sign of the residual values of the depth data.

40. The device of claim 39, wherein the same set of syntax elements is configured to indicate residual information for any of the depth intra coding modes.

41. The device of claim 39, wherein the one or more processors are further configured to generate the residual values of the depth data according to the selected depth intra coding mode based on original depth values of the video data and neighboring reference samples, without filtering the neighboring reference sample.

42. The device of claim 35, wherein the syntax element is configured to indicate that all of the depth intra coding modes are enabled for the video data or that none of the depth intra coding modes are enabled for the video data.

43. The device of claim 35, wherein the one or more processors are further configured to encode the syntax element indicating that all of the depth intra coding modes are enabled in one of a video parameter set (VPS), a sequence parameter set (SPS) or a picture parameter set (PPS) of the video data.

44. The device of claim 35, wherein the one or more processors are further configured to encode the depth modeling table at one of a coding unit (CU) level or a prediction unit (PU) level of the video data.

* * * * *